United States Patent [19]
Chenausky

[11] Patent Number: 5,748,663
[45] Date of Patent: May 5, 1998

[54] RETANGULAR DISCHARGE GAS LASER

[75] Inventor: Peter Chenausky, Avon, Conn.

[73] Assignee: QSource, Inc., East Hartford, Conn.

[21] Appl. No.: 870,857

[22] Filed: Jun. 6, 1997

Related U.S. Application Data

[63] Continuation of Ser. No. 562,998, Nov. 27, 1995, abandoned, which is a continuation-in-part of Ser. No. 361,729, Dec. 22, 1994, abandoned, which is a continuation of Ser. No. 255,463, Jun. 8, 1994, abandoned.

[51] Int. Cl.$^6$ ................................................. H01S 3/03
[52] U.S. Cl. ................... 372/64; 372/82; 372/95; 372/92; 372/55
[58] Field of Search .......................... 372/64, 95, 92, 372/55, 82

[56] References Cited

U.S. PATENT DOCUMENTS

| | | | |
|---|---|---|---|
| 4,493,087 | 1/1985 | Laakman et al. | 372/64 |
| 4,719,639 | 1/1988 | Tulip | 372/95 |
| 4,884,282 | 11/1989 | Bridges | 372/64 |
| 5,140,606 | 8/1992 | Yarborough et al. | 372/64 |
| 5,373,528 | 12/1994 | Kuzumoto | 372/64 |
| 5,412,681 | 5/1995 | Eisel et al. | 372/64 |
| 5,513,196 | 4/1996 | Bischel et al. | 372/64 |
| 5,529,619 | 6/1996 | Bochum et al. | 372/95 |

Primary Examiner—Leon Scott, Jr.
Attorney, Agent, or Firm—Alix, Yales & Ristas, LLP

[57] ABSTRACT

A transverse RF pumped gas laser has a large area discharge which is of generally rectangular shape in all plan views. In cross-section the geometry of the discharge has a longer and a shorter dimension, the longer dimension being between the electrodes to which RF power is supplied and the shorter dimension, suitable for guiding intracavity laser light, being defined by ceramic side walls.

78 Claims, 11 Drawing Sheets

RECTANGULAR DISCHARGE GAS LASER

This is a continuation of application Ser. No. 08/562,998 filed on Nov. 27, 1995 now abandoned, which is a continuation-in-part of application Ser. No. 08/361,729 filed Dec. 22, 1994 now abandoned. Application Ser. No. 08/361,729 was a continuation of application Ser. No. 08/255,463 filed Jun. 8, 1994 and now abandoned.

BACKGROUND OF THE INVENTION

1. Field of the Invention

The present invention relates to the generation of coherent light and particularly to increasing the volumetric efficiency of transversely excited gas lasers. More specifically, this invention is directed to novel and improved transversely RF excited gas lasers having a rectangular discharge and especially to such devices wherein the electrodes do not function to guide the intracavity optical radiation. Accordingly, the general objects of the present invention are to provide novel and improved methods and apparatus of such character.

2. Description of the Prior Art

While not limited thereto in its utility, the present invention is particularly well suited for application to sealed-off $CO_2$ lasers. Sealed-off $CO_2$ lasers have utility in a broad range of medical and industrial applications where both light weight and heavy weight materials are processed. A long-standing common desire in these diverse fields of use is to reduce the size per watt while simultaneously reducing the cost per watt of laser power. These common desires to achieve compactness, reasonable manufacturing cost and relatively high discharge efficiency have driven the evolution of $CO_2$ laser technology. Thus $CO_2$ lasers have evolved from low pressure dc excited devices, wherein the discharge was caused to occur in a glass tube, to higher pressure transverse RF excited waveguide or non-waveguide devices. The most recent innovation in transversely RF excited devices are "slab" lasers, i.e., devices having a discharge cavity which comprises an optical waveguide in the one dimension defined between a pair of closely spaced electrodes.

$CO_2$ lasers using longitudinal dc excitation in glass tubes, while cost effective, cannot be optically folded economically and thus such devices can not achieve the desired objectives of having a low manufacturing cost while being compact. Accordingly, because transverse RF excited devices are easily folded optically to obtain increasingly higher output powers in compact packages, RF pumped devices have essentially replaced glass tube devices for many commercial applications. Of the transversely RF excited lasers which have been developed, those devices characterized by a slab-configured discharge achieve high output power using a two mirror optical cavity and thus have an advantage over conventional transversely RF excited devices which require a folded optical resonator. This advantage, in part, is a consequence of the elimination of intravacuum/intracavity optical stations which results in a significant cost reduction. Thus, devices with "slab" discharges are a logical replacement for the earlier devised conventional transverse RF pumped lasers.

To briefly describe the prior art dc glass tube laser technology, a high voltage electrode was located midway along an evacuated, nominal 4 to 10 mm diameter, glass plasma tube. Electrically grounded, or nearly grounded, electrodes were typically located near either end of the tube. The tube was filled with a $CO_2$—$N_2$—He gas laser mixture and, upon application of the excitation voltage, a $CO_2$ gain medium was generated in the plasma. Laser action was achieved by placing a pair of mutually aligned mirrors at opposite ends of the plasma discharge tube. In such devices the excitation is called longitudinal because the excitation was along the axis of the optical resonator defined between the pair of mutually aligned mirrors. Other factors being equal, the output power of such a $CO_2$ laser device is a function of the length of the discharge, i.e., high laser output power and long length are synonymous. As noted above, since glass tubes optically "fold" very poorly, "high" optical output power could be achieved only at the expense of making ever longer glass tubes and hence the utility of these devices suffered because of their long length.

Transverse RF excitation, i.e., excitation of a normally square optical waveguide cross-section discharge region located between a pair of closely spaced extended electrodes, is shown in U.S. Pat. No. 4,169,251. In lasers of the type depicted in this patent, the excitation is transverse to the longitudinal axis of the optical resonator. Transverse RF excitation has generated high laser output powers per unit of discharge length from relatively compact, sealed-off devices. Also, because of the relatively low magnitude of RF voltage that is required to establish a gas discharge across the small transverse dimension of the discharge chamber, the vacuum envelopes of such lasers can be fabricated from metal. For reasons associated with vacuum integrity and low device weight, the vacuum envelope of such lasers is usually made of aluminum. Such transverse RF excited lasers are thus mechanically and thermally robust when compared to longitudinally dc excited glass tube lasers.

Referring to U.S. Pat. No. 4,363,126, a transversely excited RF laser is depicted wherein a pair of extended metal electrodes are separated by a pair of ceramic spacers. When the electrodes and spacers are placed in a vacuum envelope, which is backfilled with an appropriate mixture of $CO_2$—$N_2$—He, and an RF source is connected to the "upper" electrode, a discharge which is transverse to the axis of the optical cavity can be produced in the space between the "upper" RF electrode and the grounded opposed electrode. In use of the device of U.S. Pat. No. 4,363,126, if the gas discharge region is in the range of from 1 to 3 mm square, the RF pump frequency for the highest laser output power must be in the range of 300 to 70 MHz, with the smaller discharge dimensions favoring the use of 150 to 300 MHz excitation.

For $CO_2$ laser light, a round or square discharge with a cross-section dimension in the 1 to 3 mm range forms a hollow bore optical waveguide, and thus the optical resonator for such a device functions in accordance with optical waveguide theory. Larger discharge dimensions, i.e., in the 4 to 10 mm range, can also be transversely RF excited; however, as the transverse discharge dimension is increased, the discharge pressure must be reduced to maintain discharge stability with cw excitation. For these larger transverse discharge dimensions, the optical resonator may be chosen to be either free space stable or unstable depending on the Fresnel number of the optical cavity. One advantage of RF excited $CO_2$ lasers using larger transverse dimensions is that efficient discharge excitation can be obtained with a lower frequency RF source, specifically a frequency that coincides with one of the internationally recognized ISM (Industrial, Scientific or Medical) frequencies at 40.68, 27.12 or 13.56 MHz. These frequencies are harmonically related so as to reduce the possibility of incidental RF leakage from the apparatus causing interference harmful to lawful communications. Thus in addition to being exempt from some low level of incidental radiation, because lower frequency RF sources cost less to manufacture, these laser devices have a cost advantage as well.

Referring to the prior art as exemplified by U.S. Pat. No. 4,169,251, impedance matching between the RF source and the gas discharge becomes difficult as the length, and therefore the capacitance, of the discharge structure is increased. This problem may be overcome by resonating the capacitance of the discharge structure with a shunt inductor as taught by U.S. Pat. No. 4,363,126. The use of a tuned RF circuit rendered the capacitance of the discharge structure basically non-relevant and permitted the output power of small, short, RF pumped $CO_2$ lasers to be increased.

Attempts to increase the obtainable output power by increasing the gain length of the laser precipitated the problem of a longitudinal voltage variation along the discharge structure due to an RF standing wave effect. This longitudinal voltage variation along the length of the ungrounded electrode resulted from the combined effect of the high relative dielectric constant of the ceramic spacers and the high frequency of the RF excitation source. The solution to the problem of longitudinal voltage variation, as may be seen from U.S. Pat. No. 4,443,877, is to place a number of shunt inductors along the discharge structure. This "distributed resonance" concept permitted a very substantial increase in the output power obtainable from metal body $CO_2$ lasers and thus resulted in a very compact and energetic, albeit expensive, $CO_2$ laser package.

An example of such a compact laser embodying the distributed resonance concept may be seen from U.S. Pat. No. 4,787,090.

In addition to the above briefly-described use of parallel and distributed parallel resonance circuits for generating a transverse RF discharge between a pair of exposed extended electrodes, it is also possible to employ a single compound RF circuit to transform the discharge impedance to the source impedance. The latter technique is disclosed in U.S. Pat. No. 4,751,717. Energization of an RF laser via a single compound impedance matching circuit has the advantage of confining the fields produced by the transformer, so as to minimize circuit losses, and also permits overall laser size to be reduced. The technique of U.S. Pat. No. 4,751,717 also allows RF sources up to the microwave region to be systematically employed for excitation purposes. If the microwave frequency is chosen to be that commonly used by microwave ovens, the combination of a metal bodied $CO_2$ laser energized by a microwave oven oscillator magnetron can potentially result in a very cost effective laser device because, while high frequency RF sources using amplifiers are generally quite costly, such oven magnetron oscillators are comparatively simple single electron tube devices that are produced in such large volume they are not costly. U.S. Pat. No. 4,751,717 further teaches that the discharge region between the opposed electrodes of a transversely excited RF laser may be highly non-symmetric, i.e., the patent describes laser discharge structures having different horizontal and vertical Fresnel numbers which encompass all combinations of freespace-waveguide, freespace-unstable and waveguide-unstable optical cavities.

Compact, sealed-off $CO_2$ lasers with output powers up to the level of one kilowatt have been achieved through application of transverse RF excitation to a $CO_2$ laser discharge that is confined between a pair of closely-spaced, large area, water cooled electrodes, i.e., the above-mentioned "slab" discharge. Examples of so-called "slab" lasers may be seen from U.S. Pat. Nos. 4,719,639, 4,939,738 and 5,123,028. In a "slab" $CO_2$ discharge device, the large area metal electrodes, having a length L and a width W, are typically spaced apart by a distance D of only 1 to 3 mm and thus generate a discharge whose transverse cross-section, W×D, is one in which W>>D. The transverse RF discharge electric field in all slab discharge devices is in the short direction D and perpendicular to W. The close electrode spacing combined with the large electrode area promotes effective heat transfer from the laser medium to the cooled electrodes resulting in a laser output power that is much greater than that from a symmetric aperture having the same cross sectional area D×W. At the same time, the close electrode spacing serves as a light guide for the intracavity mode in dimension D. For example, in the preferred embodiments of the above-referenced patents, the Fresnel number of the slab discharge regions, as defined below, are $N_D$=0.4 ('639), 0.088 ('738) and 0.144 ('028).

In practice, large area laser discharge geometries have been either annular discharge regions, generated between concentric cylinders, or planar discharge regions, generated between a pair of highly polished, flat, metallic electrodes. As between the annular and plane-plane $CO_2$ laser geometries, the plane-plane geometry has been demonstrated to be the most successful as can be seen from the results discussed by R. J. Morely et al in their paper "Enhancement of coherent laser radar performance by pre-detection amplification", Appl Opt., Vol 33, No. 18, pp 3951–63, 20 Jun. 1994 and D. R. Hall and H. J. Baker in their paper "Area scaling boosts $CO_2$-laser performance", Laser Focus World, pp 77–80, October 1989.

Since W>>D in a slab laser, the Fresnel numbers $N_D$ and $N_W$ of such a laser are quite different and thus the round trip cavity losses for different types of resonator modes will likewise be quite different. Ultimately, these losses are the basis for determining which type of cavity modes have the possibility of being above the threshold for laser oscillation. Using the standard definition for the Fresnel number of a cavity or region of length L with a linear aperture dimension of W or D, through which light of wavelength lambda is propagating, Fresnel numbers, $N_W$ and $N_D$ can be defined as $W^2/4$ L(lambda) and $D^2/4$ L(lambda), respectively, and since W>>D, $N_W$>>$N_D$.

For a slab $CO_2$ laser operating with a Fresnel number $N_D$ of less than unity, significant waveguiding can take place as discussed in the "Handbook of Molecular Lasers", P. K. Cheo, Editor, Section 302, pg. 169, Copyright Marcel Dekker Inc., 1987. The round trip cavity loss for either a stable freespace Gaussian mode or an unstable resonator mode for $N_D$<1 will generally, but not always in the case of low g value stable cavities, be much higher than that of a waveguide mode. Accordingly, the waveguide mode will be the one that the homogeneously broadened $CO_2$ laser medium will select for oscillation as a result of gain competition effects.

In the larger transverse discharge dimension W of a slab laser, the Fresnel number $N_W$ will be in the range of somewhat greater or much greater than unity. If $N_W$ is about of order unity, i.e., in the range of 1 to 4, an unstable resonator type mode will generally still have more round trip cavity diffraction loss than a stable freespace Gaussian mode, and thus typically the Gaussian type of mode will be the survivor of the mode selection and gain competition process. If $N_W$ is much greater than unity, both unstable resonator or stable freespace Gaussian type modes can have comparably low or modest round trip cavity losses and, depending on the cavity mirror curvatures and cavity length, either mode type can be made to be above threshold for oscillation, as discussed by A. E. Siegman in his paper "Stabilizing output with unstable resonators", Laser Focus, pp 42–47, May 1971.

Unfortunately, for Fresnel numbers much greater than about unity, the round trip cavity losses between lower order and higher order transverse modes in a stable freespace Gaussian resonator are relatively small, in the range of a few percent or less. As a result lasers with round trip gains much greater than one are far above oscillation threshold and any one of a number of higher order modes can oscillate, sometimes simultaneously on differing $CO_2$ transitions. This type of multiline, multimode output cannot be focused to a small spot and therefore is of limited use for certain types of cutting and drilling applications.

The appeal of an unstable resonator for high Fresnel number lasers is that the higher order modes have significant differences in round trip diffraction losses and thus the output of such a laser can be made to oscillate in a single transverse mode. While the lowest loss mode of an unstable resonator is not necessarily the lowest order mode, as it is in a stable resonator, it is possible for the output from an unstable resonator to be relatively uniphase across the aperture if the gain medium itself is not highly spatially inhomogeneous. Accordingly, the output from an unstable resonator is very suitable for focusing to a small spot and therefore is useful for a variety of materials processing or radar applications.

Typically the output from an unstable resonator is diffraction coupled from the cavity by diffraction at the outer edge of the resonator, although both partial transmission and diffraction coupling from a centrally located hole are other possible output coupling schemes as described in U.S. Pat. No. 3,969,685.

The output power obtainable from "slab" lasers of the type depicted in the above-referenced patents has been shown to drop dramatically as the distance between the electrodes, i.e., the waveguide spacing, increases. Thus, as reported in the text "Lateral and Transverse Mode Properties of $CO_2$ Slab Waveguide Lasers", C. J. Shackleton et al, Opt. Comm. 89 (1992), pp. 423–428, using a 125 MHz frequency RF excitation source, an output of 210 watts at an efficiency of 11% was achieved with a 1 mm waveguide height having a 1.8 cm wide water cooled discharge region that was 39 cm in length. However, when the electrode spacing was in the 3 mm range, the output power decreased by a factor of 2 when compared to a 1 to 1.5 mm waveguide dimension. This is generally referred to as 1/D power scaling.

To summarize, those skilled on the art have accepted the premise that a slab laser should have a electrode spacing which is much smaller than the width of the electrode. This very small electrode spacing, in turn, dictates use of very high discharge excitation frequencies if discharge instabilities are to be avoided and if extraction of high laser power with high discharge efficiency is to be achieved.

The use of high frequency excitation for slab lasers has been formalized with a set of similarity and scaling relationships as reported in "Similarity and Scaling in Diffusion-Cooled RF-Excited Carbon Dioxide Lasers" by P. P. Vitruk et al in the IEEE JQE, Vol 30, No.7, July 1994, pp 1623–34. As discussed in this paper, for optimal excitation, the product of the electrode spacing D in mm and the excitation frequency f in MHz, should be near fD=288 mm-MHz. At the same time, the product of discharge pressure p in Torr and electrode spacing D in mm should be in the range of pD=133 Torr-mm for optimal pumping. Thus, these similarity relationships show that p, f and d are coupled, i.e., low frequency excitation requires the use of low discharge pressure for optimal pumping. Restated, p, D and f cannot be decoupled without seriously impairing the discharge pumping process.

This accepted operational constraint is well known to those skilled in the art of square or round RF pumped waveguide $CO_2$ lasers with closely spaced electrodes as discussed in "RF-Discharge-Excited $CO_2$ Lasers", by D. Hall and C. Hill, Handbook of Molecular Lasers, P. K. Cheo, Editor, copyright 1987 by Marcell Dekker, Inc., pp 165–258. High frequency excitation is necessary because the plasma sheaths which are always formed on, or closely adjacent to, electrode surfaces contract as the excitation frequency for a fixed electrode spacing is increased. The operational constraints of transverse "RF" excited $CO_2$ lasers, particularly those with nominally symmetric discharge cross-sections from a few mm squared to 10 mm squared using excitation frequencies from 25 to 2450 MHz, were recognized early as discussed in the abstract of "Radio-frequency and Microwave Excitation of $CO_2$ Lasers", P. Chenausky et al, paper TuKKy, CLEOS 1980, San Diego, Calif. If lower frequency discharge excitation is attempted with a constant electrode spacing, the sheath regions grow until they are a substantial fraction of the interelectrode spacing. The plasma sheaths that form adjacent to the electrodes then necessarily become a larger fraction of the discharge "length" in the direction of the RF field as the frequency of excitation is lowered. When this happens, the combined influence of discharge pressure and mix, electron transit time and electrode spacing prevent the deposition of high discharge input powers while still maintaining a stable alpha type of RF discharge.

As the art has slowly evolved, higher frequency excitation was found to be beneficial. Thus, as the frequency was gradually increased from 21 MHz in the earliest low Fresnel number waveguide $CO_2$ lasers, the power also increased. At the same time, the discharge chambers, cavity Fresnel numbers and mirror curvatures were, nearly without exception, made to exploit waveguide lasers. For example, J. Lachambre et al in their paper "A transversely rf-excited $CO_2$ waveguide laser", Appl Phys Lett, 32 (10), 15 May 1978, pp 652–653, energized a $(2 \text{ mm})^2$, 15 cm long section of flowing $CO_2$ gain medium with a 21 MHz RF source. Their laser cavity and excitation parameters for maximum output were pD=200 T-mm, fD=42 mm-MHz, and $N_D$=0.58. Similarly, Gabai, Hertzberg and Yatsiv in working with 30 MHz excitation of a slab region between a pair of 2.5 cm wide by 73 cm long electrodes spaced by 4.5 mm, as described in their abstract "Radio-frequency excited stripline CO and $CO_2$ lasers", paper TuB4, CLEO 1984, reported "Only the weakly luminous central region is excited efficiently. Its width decreases rapidly when the electrode spacing diminishes." The cavity and excitation parameters used by Gabai et al were pD=270 T-mm, fD=135 mm-MHz, $N_W$=19.1 and $N_D$=0.62. Thus, the "trend" toward excitation of waveguide structures with higher RF frequencies started well before 1980 and, in the process, a transversely RF excited waveguide laser has become institutionalized or synonymous with high frequency excitation. Indeed, as may be seen from the above-referenced work of Vitruk et al, as will be discussed in more detail below, the "trend" toward use of excitation frequencies>>30 MHz has become essentially codified.

At the same time that RF excitation frequencies were increasing, because it was experimentally understood that it was desirous to minimize the thickness of the sheath regions, prior art attention was concentrating on sealed-off operation of higher pressure lasers that were waveguide in the dimension of the electrode spacing. It is well recognized that a property of waveguide cavities necessarily results in a mode size that is identical with the electrode spacing or bore dimension in a RF pumped waveguide $CO_2$ laser. It is also well recognized that a property of transverse RF discharges necessarily results in plasma sheaths on or very near the electrodes, or in close contact with the waveguide bore if metal electrodes were covered with a insulating material. However, it is not well recognized that only a very careful and detailed examination of the output beam structure of RF waveguide lasers can reveal any negative (or positive) effects that sheaths have on output beam quality. Examination of the prior art does not reveal any instances where measurements of sufficient detail have been made to elucidate features of the plasma sheath regions that could have an important effect on slab laser beam quality.

For both transverse symmetric and slab RF excited discharges, as discussed by Vitruk et al in their above-referenced 1994 paper, the plasma sheath thickness grows as 1/f and becomes a greater fraction of the interelectrode spacing as the reciprocal of the excitation frequency. At the same time, the power deposited into the plasma sheaths increases as $1/f^2$. The applicability of the theory is thought to apply to the excitation region from about 40 to 160 MHz, and measurements of discharge properties in lasers operated with excitation in the range of 100 to 160 MHz have confirmed many important elements of the theory. For example, for a slab discharge with a 10 mm electrode spacing, the appropriate RF excitation frequency would be near 28 MHz and the appropriate pressure near 13 Torr to maintain an fD near 288 mm-MHz and pD near 133 Torr-mm. These coupled relationships underscore the fundamental nature of RF excited devices: if a 10 mm bore is used, the optimal pressure will be low, no matter if fD=288 mm-MHz or fD=24,500 mm-MHz. For example, as reported by Chenausky et al in the abstract of their paper TuKK4 (1980), referenced above, "Using conventional resonator geometries and 2450 MHz excitation . . . ", a 34 cm long discharge with multimode output powers of >10 W could be generated with 7% discharge efficiencies; however, "Due to the relatively wide discharge gap of 1 cm, total gas pressures in the range of 10 Torr are preferred . . . ".

Another similarity relationship reported by Vitruk et al describes the thickness of the plasma sheaths as $fD_S$=42 mm-MHz. A conventional slab device excited with 27 MHz RF would thus be predicted to have a sheath thickness of about 1.5 mm, although this frequency is near the frequency limit of theory validity. Vitruk et al's theory also predicts that a slab device with 30 MHz excitation will have over 50% of the discharge input power deposited in the ion sheath as ohmic losses and have a sheath voltage too high to maintain the desirable alpha type RF discharge. A slab laser device excited with low frequency RF would thus have been expected to transition into the undesirable high current gamma type discharge with low specific input powers.

The theoretical analysis of Vitruk et al, referenced above, not only conforms very well with the observations made by Chenausky et al and Gabai et al as also referenced above, but very accurately explains the results of S. Yatsiv as described in his paper "Conductively Cooled Capacitively Coupled RF Excited $CO_2$ Lasers", Proc. 6*th* International Symposium, Gas flow and Chemical Lasers, copyright Springer-Verlag, (February) 1987. In this paper, Yatsiv discussed the generation of a slab $CO_2$ discharge region between a pair of 3 cm wide by 78 cm long polished electrodes spaced by 3 mm with 30 MHz RF excitation. As reported by Yatsiv, the slab region had a Fresnel number in the dimension of the electrode spacing of $N_D$=0.27 and achieved a discharge efficiency of 6.2% with commonly used aluminum electrodes. Thus, the above-referenced 1994 theory of Vitruk et al effectively codifies what has been well appreciated by those skilled in the art of conventional symmetric and slab RF excited $CO_2$ discharge lasers: a) wide electrode spacings necessitate using low pressure even if the excitation frequency is high and b) if high pressure operation is desired, close electrode spacing and high frequency excitation are both necessitated. Conversely, the choice of a low excitation frequency, moderate to close electrode spacing and high medium pressure can yield basically undesirable discharge properties such as low output power and low discharge efficiency. As will be discussed below, as the apertures and pressures increase, some sort of deliberate or significant "sophistication" must be introduced to augment simple electrical excitation of $CO_2$ laser devices to keep the discharge region free of undesirable instabilities which, if they become dominant, render the discharge unsuitable for the generation of $CO_2$ laser output.

The above discussion demonstrates that the operation of compact, sealed-off, area cooled, conventional close spaced electrode, slab discharge $CO_2$ lasers with low frequency excitation would, by those skilled in the art, be predicted theoretically to have low efficiency and be restricted to low discharge pressures. The data compiled by various researchers worldwide conforms, without exception, to this theory. Thus, the benefits of area cooling, wherein high average powers can be obtained from compact, close spaced electrode devices operating with moderate or higher discharge pressures and discharge efficiencies and the benefits of low frequency excitation are mutually incompatible. According to the most comprehensive and best theory of slab discharge physics published, the combined use of a low RF excitation frequency with a pD product that is >133 Torr-mm and further with the use of a dc to augment the pumping of a $CO_2$ laser would be a very poor combination because the power deposition in the sheaths would be very high and the voltage across one or both of the sheaths could be increased by the external dc field to force the discharge to be unstable and switch irreversibly into the undesirable high current gamma type RF discharge mode.

Also, since the plasma sheath region is known to be the place where deleterious plasma reactions cause disassociation of the $CO_2$ lasing specie, increasing the fraction of discharge volume that the sheaths occupy can be expected to have a negative effect on the operational lifetime of sealed-off lasers.

It is to be noted that it has been suggested that a discharge driven gold catalyst material may be employed to increase laser output and improve laser service life. Such a catalyst is disclosed in U.S. Pat. No. 4,756,000. To avoid sputtering of this material at the electrode surfaces, however, such catalytic material is best applied only to the ceramic spacers which define the side walls of the discharge chamber and the use of ceramic materials for this purpose is minimized in prior art rectangular lasers because of the large area of the closely spaced electrodes.

The slab laser of above-referenced U.S. Pat. No. 4,939,738 is characterized by a positive branch unstable resonator in the wide discharge dimension and a waveguide resonator in the narrow dimension. The device depicted in this patent, outside the cavity, converts the rectangular beam to a square beam through the use of a lens.

To summarize, previously reported, efficiently excited, "slab" discharge geometries are characterized by an electrode spacing ranging between 0.7 to 2.25 mm, an electrode width in the range of 1.35 cm to 4.5 cm, an excitation frequency in the range of at least 100 to 225 MHz for optimal discharge excitation, electrode lengths that range from about 30 to 77 cm, and Fresnel numbers $N_D<1$, and $N_W>>1$. Thus, common characteristics of prior slab lasers are that the electrode widths are much greater than the electrode spacing and the waveguide mode is always supported in the small discharge dimension which extends between two closely spaced, polished, planar electrodes.

As mentioned above, in order to achieve the output power required for many medical and light industrial applications, while at the same time having an acceptable level of laser discharge efficiency, presently available slab $CO_2$ lasers employ a high excitation frequency, i.e., a frequency which is typically in the 80–200 MHz range. Since high frequency RF sources are more costly than lower frequency sources, these lasers have a significant cost disadvantage.

Furthermore, the use of such a high excitation frequency complicates the intravacuum construction and cost of the laser since such devices have a high discharge capacitance which typically requires between ten and twenty intravacuum RF circuit inductors across the discharge chamber to negate the standing wave induced voltage variation along the discharge electrode structure as taught by, for example, U.S. Pat. Nos. 4,352,188, 4,443,877 and 4,751,717. Without these inductive elements, the requisite uniform voltage distribution along the length of the discharge chamber can not be maintained, due to the standing wave effects of the RF excitation, and low laser output power and low laser discharge efficiency will result. While it may be desirable from a manufacturing standpoint to have these inductive elements outside of the laser vacuum envelope, the generation of an efficient high power $CO_2$ laser output requires that these elements be placed electrically as close to the electrode structure as possible. Such placement increases the cost of the device.

It must be noted that operation of a slab laser at a pumping frequency other than one of the ISM frequencies at 13.56, 27.12 or 40.68 MHz raises the issue of unlawful and harmful interference with emergency, aircraft communication or public broadcast services if such devices have any incidental RF leakage. In the U.S., these FCC licensed services are located throughout the entire RF spectrum from 40 to 200 MHz. Accordingly, presently proposed slab lasers, for commercial applicability, will require expensive and complicated RF shielding.

As a further disadvantage of prior art rectangular discharge lasers, the electrodes must be formed to be exactingly flat for waveguiding purposes. This prevents the co-application of DC power and RF excitation to augment laser output as taught in U.S. Pat. No. 5,097,472, since it is well known in the art that flat surfaces are undesirable for generating or maintaining a uniform dc discharge electric field.

It must also be observed that, since the large area electrodes of previously proposed slab lasers serve to waveguide the intracavity mode in the dimension normal to the electrodes, the ungrounded electrode itself cannot be easily segmented without introducing optical waveguide loss into the cavity resonator. Thus, as higher laser output powers are sought by increasing the electrode area and increasing the discharge input power, the single electrode discharge input impedance will fall according to Ohm's law to a level where impedance matching between the commonly employed 50 ohm high power RF source and the laser itself becomes more and more difficult.

For example, as discussed by A. Lapucci et al, in "On the Longitudinal Voltage Distribution in RF-Discharged $CO_2$ Lasers with Large-Area Electrodes" IEEE JQE Vol. QE31, No.8, August 1995, pp 1537–42, a 70 cm long by 10 cm wide, 700 $cm^2$ slab laser device with a 2 mm electrode spacing is predicted to have a positive column discharge impedance of only 0.4 Ohms and a capacitive sheath impedance of negative 2 j Ohms when energized with 10 kW of RF input power at a frequency of 100 MHz. Clearly, driving an impedance of 0.4 −2 j Ohms with a 10 kW, 100 MHz source having a 50 Ohm output impedance is not a trivial task if low circuit losses are to be maintained. To confirm that discharge input impedances this low are actually encountered, Lapucci et al fabricated a slab laser having a pair of 70 cm long by 2.5 cm wide electrodes spaced apart by 2 mm and verified their predictions with experimental impedance measurements.

Moreover, in addition to confirming the low driving impedance of the 70 cm by 2.5 cm slab above, Lapucci et al observed that the capacitance of their structure increased from 400 pF without a discharge to 620 pF with a discharge, i.e., the plasma sheath capacitance increased from 0 pF without a discharge to 220 pF with a discharge. Obviously, such an increase in laser discharge chamber capacitance by a factor of 1.55 will cause a shift in the resonant frequency of the laser head by $1/[1.55]^{1/2}$ or a shift in frequency from 100 MHz to 80.3 MHz. This makes the design of the discharge matching network very difficult, because not only must the network efficiently transform 100 MHz RF source impedance of 50 Ohms to approximately 2 −8 j Ohms, the network must somehow accommodate this 20 MHz change in the resonant frequency of the laser in the few microseconds that it takes for the laser discharge to initiate. This problem becomes much more acute in the frequency range above 50 MHz where compact, lumped element high transformation ratio matching circuits with low loss are difficult to design and fabricate.

The above discussion of the prior art of RF excited devices was approached on an incremental basis starting with the first RF transversely excited waveguide-waveguide $CO_2$ lasers. A more global, but equally valid, discussion of prior art small symmetric aperture or slab devices can be started from the perspective of very large aperture devices.

Generally speaking, high specific average power, simple electric discharge excitation of large symmetric aperture $CO_2$ gas laser media confined to completely sealed-off, high pressure, non-flowing discharge chambers is unknown in the prior art. The reason such devices cannot be made to operate is elementary: gas is a very poor conductor of heat and without some means to remove the heat, the gas discharge degrades into an excitation process not suitable for the generation of laser output. If either some type of additional "sophistication" or "compromise" to the basic large symmetric aperture confined discharge chamber is introduced, high specific electrical excitation of large aperture devices is realizable. Thus, for example, fast pulsed discharge pumping using UV or e-beam assisted electric excitation of large aperture devices is possible. In these types of devices, the sophistication employed is the initial generation of sufficient electrons in the gas volume by UV or e-beam means to prevent subsequent discharge arcing, combined with the transient nature of a fast main discharge excitation pulse. Large apertures may thus be energized because, ultimately, the excitation is turned off before an unwanted discharge instability results. If the additional sophistication or compromise that is introduced to the confined chamber is either longitudinal or transverse gas flow, large aperture, high average power (i.e., high PRF) UV or e-beam electrically excited devices become a reality. In such devices, the discharge heat is convected away between successive discharge pulses so that the temperature of the gas medium does not become so high that discharge stability is destroyed.

If a significant compromise to electrically excited large symmetric aperture devices is made, high specific average power excitation in sealed-off, non-flowing discharge chambers also can become a reality using relatively subtle types of sophistication. For example, the symmetric aperture can be made small, in which case high pressure, high specific power excitation can be realized using only longitudinal dc excitation of slender waveguide regions. In this case the "sophistication" is the cooling provided by the few mm distant bore of the discharge tube and the use of waveguide cavities rather than higher loss stable Gaussian freespace cavities. Clearly, however, a very significant compromise to general high power excitation in the form of small aperture must be made to achieve this "limited", but very desirable, result. While the small aperture compromise yields desirable benefits, the above small bore compromise will alone not be sufficient to support transverse dc rather than longitudinal dc excitation. Going further, within the scope of the small symmetric aperture compromise, if an additional sophistication such as RF excitation is employed, not only can transverse excitation of high pressure waveguide regions be realized, but, as discussed earlier relative to RF excited slab gas laser devices, the aperture can be made large in the direction of the electrode width, i.e., perpendicular to the discharge electric field. In this case, it is the cooling of the discharge by the close spaced electrodes that is the additional sophistication provided over and above that of the transient nature of the transverse RF excitation field between the close spaced electrodes that permits realization of high input, and thus high laser output, power. Thus, the sophistication provided by RF is both subtle and very robust. At the same time, however, the sophistication provided by cw transverse RF excitation is not so robust that it can be applied to large symmetric aperture devices without accepting a low pressure, pD=constant type of compromise.

In the context of exploring the basic limits and robustness of the sophistication provided by transverse RF excitation, the theory of RF excited slab and symmetric discharges, as developed by Vitruk et al and referenced above, can be used to great advantage. Fundamentally, the theory indicates for electrodes spaced by D, two relationships fD=constant $C_1$ (=288 mm-MHz) and pD=constant $C_2$ (=133 mm-Torr) are applicable and, if followed, significant improvements over large symmetric aperture, low pressure dc excited gas discharge lasers may be realized. The improvements include the ability to maintain very stable discharges between close spaced, water cooled electrodes with specific volumetric input powers of 75 W/cm$^3$, corresponding to a specific input power on an area basis of 22.5 W/cm$^2$.

From the view of recent theory, above-referenced U.S. Pat. No. 4,169,251 to K. Laakmann teaches that a substantial benefit can be gained over dc excited, large bore, low pressure gas lasers if a transverse RF field is used to energize a round, square or rectangular discharge chamber, but only if the chamber is suitable for guiding laser light. The benefits gained are: improved output powers from high pressure, compact, rugged and simple devices. Such benefits are realizable because the waveguide cavity does not rely on conventional stable freespace Gaussian resonator theory but rather hollow bore waveguide resonator theory, and thus low loss cavities can be combined with an improved discharge device. Laakmann teaches that if D is decreased, p can be increased if f is chosen appropriately, and in so doing, improvements in size, laser oscillation gain-bandwidth and laser output power result. Applying the teachings of Vitruk et al to the embodiment disclosed in U.S. Pat. No. 4,169,251 we find that fD=200 mm-MHz and pD was 200 T-mm. Thus, the optimization process Laakmann used sixteen years before the availability of any theory turned out to be near theoretical optimum. Although U.S. Pat. No. 4,169,251 teaches that the benefits accrue only if the discharge chamber itself is suitable for guiding laser light, ultimately, after a number of levels of added innovation by many researchers are included, the trend in the sealed-off power levels which Laakmann initiated has risen from watts to kilowatts. For example, as taught by Chenausky et al in U.S. Pat. No. 4,363,126, if improvements in the excitation of the waveguide region of the device disclosed in U.S. Pat. No. 4,169,251 are made, and if further means as taught by Chenausky and Newman in U.S. Pat. No. 4,443,877 for uniformly exciting the waveguide region of '251 are made, 31 W of power in a single waveguide mode can be extracted from a (2.25 mm)$^2$ by 37 cm long sealed-off discharge chamber operating at a pressure of 90 T and energized at 148 MHz. The relevant discharge operating parameters of these devices are fD=333 mm-MHz, pD=203 T-mm, $P_v$/vol=160 W/cm$^3$, $P_v$/L=84 W/m and $N_D$=0.31 as reported by Chenausky and Newman, "RF Excited Waveguide $CO_2$ Laser Technology, Invited Paper, Lasers 1982, New Orleans, La. and Newman and Hart, "Recent R&D Advances in Sealed-off $CO_2$ Lasers", Laser Focus/Electro-Optics, pp 80–91, June 1987. It is noteworthy that the above specific input power, pD and fD products can be somewhat higher than those of slab devices because of the very effective cooling provided by the four sided discharge chamber, as discussed by Vitruk et al.

Armed with the analysis of Vitruk et al, many of the prior art results are more readily understandable and classifiable. For example, as discussed by J. Xin et al in their paper "rf-excited all-metal waveguide $CO_2$ laser", Appl Phy Lett, 59, (26), 23 Dec. 1991, pp 3363–65, the merit of a given alteration of the discharge chamber in an RF excited laser can be made. Xin et al teach that one can transversely RF excite 30 cm long regions that are 2.5×2.3 mm$^2$, 3.5×3.3 mm$^2$ or 4.5×4.3 mm$^2$, where in each case the aluminum electrode spacing D is the larger of the two transverse dimensions and in each case the anodized aluminum sidewalls are spaced so that there is a 0.1 mm gap between the anodized "metal" sidewalls and the metal electrodes. Thus, the maximum D/W=1.09. When the excitation for the three chambers discussed by Xin et al was, in terms of fD's and pD's, 248 mm-MHz, 228 T-mm; 375 mm-MHz, 214 T-mm; and 374 mm-MHz, 215 T-mm respectively, then, for input powers of about 43 W/cm$^3$ a single waveguide $EH_{11}$ mode maximum output of about 47 W/m can be extracted from such a sealed-off laser. In the context of Vitruk et al, the fD and pD products are somewhat above optimum, while the power output is only about 55% of the highest power achieved with square waveguide chambers similarly pumped. The teaching is clear: all metal RF discharge chambers, operating with a waveguide mode in D and W, having a D/W<1.09 electrode to sidewall spacing yields a 50% loss in output power compared to that extracted from optimally RF excited D/W=1 symmetric waveguide aperture lasers, and thus employing a D/W>1 would not be beneficial.

S. Lovold and G. Wang, "Ten-atmospheres high repetition rate rf-excited $CO_2$ waveguide laser", Appl Phy Lett 40, (1)

1 Jan. 1982, pp13–15, and C. Christensen et al. "Transverse Electrodeless RF Discharge Excitation of High-pressure Laser Gas Mixtures", IEEE JQE, QE-16 (9), September 1980, pp949–954 report the use of transverse RF excitation of discharge chambers with electrodes spaced to form waveguides with no sidewalls, and both devices use transverse gas flow as the "sophistication" to achieve high specific input excitation at high pressures. In the case of Lovold and Wang, 40.68 MHz excitation between electrodes spaced by 1.5 mm ($N_D$=0.35) could be used up to 3800 Torr with 1 kHz PRF's while in the case of Christensen et al, 30 MHz excitation between electrodes spaced by 2 mm ($N_D$= 0.59) could be used up to a pressure of 900 Torr at 500 Hz PRF's. In the device of Lovold and Wang, a 2 kW RF pulse generated fD's and pD's of 61 mm-MHz and 5700 T-mm using 1.5 mm electrode spacings while in the device of Christensen et al a 9 kW RF pulse generated fD's and pD's of 60 mm-MHz and 1800 T-mm using 2 mm spacings. Christensen realized a conversion efficiency of about 7.4%, pumping his 0.9 cm$^2$ discharge volume with a specific input of 71 J/LA. In both devices, since the discharge chamber had no sidewalls, waveguiding could only take place between the two electrodes. In both devices the optical cavity was stable freespace Gaussian in discharge dimension perpendicular to the RF discharge electric field, and in both devices, the discharge generated was roughly defined by a pair of metal electrodes placed behind thin $Al_2O_3$ strips. Also in both devices, the fD's were far lower than the 288 mm-MHz required for optimal pumping while the pD's were far higher than the 133 T-mm identified with optimal slab excitation.

In view of Vitruk et al, Laakmann U.S. Pat. No. 4,169,251, and the small aperture compromise attendant to achieving high specific average inputs with non-optimal pumping conditions, those skilled in the art would understand the teaching of Lovold and Wang and Christensen et al to be that high specific inputs are realizable even if RF excitation is employed at fD's and pD's that are far from optimum. However, to maintain a stable discharge under these high level excitation, highly unoptimum conditions, two powerful and substantial sophistications to the excitation scheme must be introduced beyond transverse RF excitation between a pair of waveguide spaced electrodes. First, gas flow must be introduced, preferably transverse gas flow. This limits waveguiding to one dimension, although the basic discharge itself is still essentially symmetric in cross section with the discharge dimension between the electrodes being somewhat smaller than its width (W>D). Second, the excitation must be pulsed so that the discharge can be turned off before a discharge instability erupts. Overall, the sophistication provided by transverse RF excitation, while both subtle and robust, is still not so robust that high level pumping with a very unoptimal fD and pD can be tolerated without the introduction of substantial transverse gas flow to stabilize the discharge and compensate for the unoptimal pumping.

If low frequency excitation of waveguide regions wherein the fD product is far from the optimum predicted by Vitruk et al can limit the realizable output obtainable with transverse RF excitation, more optimal excitation should yield beneficial results. Indeed, as reported by R. Brown et al in their paper "Large-Volume Pulsed-RF Excited Waveguide $CO_2$ Lasers", IEEE JQE QE 28, No.2, pp404–407, February 1992, high specific input pumping of symmetric transverse RF excited waveguide discharge regions can yield good conversion efficiencies and high output powers in non-flowing discharge chambers if discharge pulse widths are made short enough to prevent discharge instabilities from forming. Using a nominal 3.9 kW, 152 MHz excitation source to pump a 5 mm round bore waveguide laser with a specific input of 180 J/LA at a pressure of 114 Torr, 12% discharge efficiencies were realized with 50 us, 3% duty cycle pumping. In this case the discharge fD was 760 mm-MHz, the pD was 570 T-mm and the cavity Fresnel number N=1.28. For the near planar cavity optics used, the round trip loss to stable freespace Gaussian $TEM_{00}$ mode due to diffraction would be in the range of 10%, i.e., higher than that of a guided wave EH mode, and thus while the cavity operated with a Fresnel number of somewhat over unity, the 5 mm bore device operated as a waveguide laser. Using a completely sealed-off device the maximum average output power of the 5 mm bore, 37 cm long gain length laser was achieved at a PRF of 600 Hz corresponding to an output of 39.2 W/m of discharge length. Compared to the work reported by Christensen et al, as discussed above, the device of Brown et al used an fD product over twelve times higher in a discharge chamber with a significantly larger aperture operating at a more moderate, but still higher than optimal, pD product. Under these conditions the destabilizing properties of the sheath regions due to the high specific input pumping was much less severe and improved conversion efficiencies from RF power to laser power were realized without resorting to gas flow. Brown et al thus teach that a symmetric waveguide discharge chamber can be operated at higher than optimal pD products with high specific inputs if the type of sophistication introduced into the excitation process is that of limiting the length of the discharge pulse to prevent the formation of a discharge instability and keep the discharge from transitioning from the desired alpha type discharge into a undesirable gamma type of RF discharge.

A. Hongo et al, "Thin film-Coated Waveguide $CO_2$ Laser" IEEE JQE, QE22, (9), September 1986, pp1604–1608, developed a theory that an RF excited rectangular waveguide discharge chamber formed between a pair of metal electrodes spaced 3 mm apart with sidewalls that were 2 mm apart (D/W=1.5) would have less loss if the electrodes were coated with germanium than if the electrodes were uncoated. Hongo et al built a 40 cm long transversely RF excited gain medium with Fresnel numbers $N_D$=0.53 and $N_W$=0.24 and used a discharge fD=150 mm-MHz and pD=114 T-mm to obtain an output power of 1 W at 2.5% efficiency with the uncoated electrodes and 2 W at 5% efficiency with the coated electrodes, i.e., $P_o/L$=5 W/m. Hongo et al verified that more laser power can be extracted from a discharge chamber cross-section elongated 50% in the electrode spacing with coated electrodes than with uncoated electrodes. However, since the output power both theoretically and experimentally in the D/W=1.5 chamber falls so far below that which is realizable with optimal pumping in a D/W=1 chamber, the teaching of Hongo et al is that excitation at fD's even a little low in a waveguide-waveguide $CO_2$ laser with electrode spacings greater than sidewall spacing is not beneficial.

Like Hongo et al, Wang et al in U.S. Pat. No. 4,651,325, Wang et al in "Radio Frequency Pumped Mid-Infrared Waveguide Lasers", IEEE JQE, QE-20, (3) March 1984, pp276–283, and Wang et alias in "RF-Pumped Infrared Laser Using Transverse Gas Flow", IEEE JQE QE-20, (3) March 1984, pp284–28 employed transverse RF excitation to a waveguide discharge chamber with electrodes that were 2 mm wide but spaced by 3 mm. In the device of U.S. Pat. No. 4,651,325 and in device described in the Wang et al paper, $N_D$=1.02, and since transverse gas flow was used no waveguide walls were present. In Wang et alias, longitudinal gas flow through the 3 mm by 2 mm waveguide ($N_D$=1.02, $N_W$=0.43) structure was used, however, no $CO_2$ data was reported. The experimentation thus involved the use of Wang et al transverse excitation of 2 mm wide by 20 cm long electrodes spaced by 3 mm to generate a discharge with a fD=480 mm-MHz and pD=150 T-mm. With an RF input power of 200 W (167 W/cm$^3$), 16 W (80 W/m) of $CO_2$ laser output was extracted from the 20 cm gain length with a efficiency 8%, in very good agreement with an Output Power vs. Outcoupling Transmission Analysis (Rigrod Analysis) performed for the device assuming it was operating as a waveguide laser in the 3 mm electrode spacing and depicted in FIG. 3 of U.S. Pat. No. 4,651,325. In terms of the Vitruk et al analysis, the excitation resulted in an fD higher than optimum and a pD that was about optimal. With an input power of 167 W/cm$^3$, the Wang et al laser operates with a specific input power significantly above the 75 W/cm$^3$ used by Vitruk et al in their sealed-off, non-flowing, water cooled slab electrode device where W/D>>1. At the same time, an RF input of 167 W/cm$^3$ into a transverse flow discharge region where D/W<1.5 is only insignificantly greater than the 160 W/CM$^3$ realized by Hart and Newman, in a D/W=1 completely sealed-off (2.25 mm)$^2$ discharge chamber. Moreover, even with the assistance of transverse gas flow, to maintain discharge stability with an input of 167 W/cm$^3$, an output power of only 80 W/m of discharge length is clearly lower than the 84 W/m realized from the sealed-off (2.25 mm)$^2$ symmetric bore waveguide laser reported by Hart and Newman using fD and pD products somewhat similar to Wang et al. Wang et al teach that a stable RF alpha discharge can be maintained with inputs of 167 W/cm$^3$ in a D/W<1.5 device if transverse gas flow is used to convectively cool the laser medium to keep it from degenerating into a gamma type discharge. In the teachings of Wang et at, transverse gas flow in a transverse D/W<1.5 RF excited $CO_2$ laser can be used to maintain input powers slightly higher than those achievable with a sealed-off D/W=1 laser. However, under these conditions, the output power from the asymmetric cross-section discharge will be lower than a (2.25 mm)$^2$ symmetric aperture device, indicating that D/W<1.5 type discharge regions, even using gas flow and favorable pD and fD excitation parameters, are not beneficial.

U.S. Pat. No. 4,755,999, to J. Machen teaches that a rectangular cross section $CO_2$ dc discharge can be established between a series of ballasted pin electrodes separated by 15 cm in a chamber 1 cm wide by 15 cm high by 45 cm long if a magnetic field of sufficient strength is applied perpendicular to the 15 by 45 cm$^2$ discharge surface. This $CO_2$ gain region is disclosed as having a 150 mm electrode spacing, operating in a pressure range of 14 to 18 Torr and having an input power $P_i$=1800 W and thus its various operating parameters are $P_i$/vol=2.7 W/cm$^3$, $P_i$/A=2.7 W/cm$^2$, pD=2100 to 2700 T-mm, Fresnel numbers $N_D$=1180 in the direction of the electrode spacing and $N_W$=5.4 in the sidewall spacing. Due to the large sidewall spacing and Fresnel number of 5.4, it is clear that there would be no benefit to using a waveguide cavity since the discharge would be highly multimode in this dimension. Likewise, the benefit of area cooling of the discharge is impaired because of the large sidewall spacing. Notably, no performance levels are disclosed.

The theory of Vitruk et al does not apply to the dc excitation geometry of the device of U.S. Pat. No. 4,755,999 because W/D<1 and f=0. However, when the high Fresnel numbers and the high operating pD product of this device are taken into account, the device has at least some attributes of a $CO_2$ laser aperture that is large enough to mandate some type of sophistication to keep the overall discharge stable. For example, while its input power on a volumetric and area basis are very much lower than that used by Vitruk et al, the operating pD product is so high that the devices of both Lovold et alias and Christensen et al, both of which used transverse gas flow as the means to maintain discharge stability, are recalled. On this basis, the magnetic field is clearly identified as the means of sophistication to promote homogenizing the discrete dc discharge(s) and keep them from coalescing and collapsing into a series of arcs. In this regard, the interaction of dc discharges and magnetic fields in a flowing $CO_2$ laser dc discharge geometry as taught in "Magnetic Stabilization of the Plasma Column in flowing Molecular Lasers", by Buczek, Freiberg, Chenausky and Wayne, Proc. IEEE on Atomic and Molecular Plasmas, Vol 59, N. 4, April 1971, pp 659–667, is relevant. As taught in U.S. Pat. No. 4,755,999, (column 4, lines 33–38) "If one were to attempt to make a laser utilizing flat plates with no additional sophistication in the discharge, the laser output power would actually be less per meter of length than is achieved by a discharge in a cooled tube.", and (column 12, lines 60–64) "It is important to understand that several elements must cooperate to achieve a sweeping discharge. These elements are the cavity shape, the gas, the magnetic field and the electric field associated with a discharge.". Accordingly, the externally applied magnetic field is specifically taught as a critically essential element of this dc discharge scheme where both $N_W$>>1 and D/W>>1.

The net effect on those skilled in the art of the teachings of Hongo et al with a 1.5:1 ratio of the electrode to sidewall spacing, the teachings of Wang et al with a 1.5:1 electrode to sidewall spacing and the teachings of Machen, which disclosed a 15:1 electrode to sidewall spacing ratio, would be that a discharge geometry elongated in the electrode dimension looks to be an unfavorable, and quite possibly a pathologically undesirable, candidate for high specific power excitation unless some form of robust sophistication is introduced to keep the discharge stable.

Lauderslager et alias, in U.S. Pat. No 4,088,965, teaches that high pressure pulsed discharge operation of a 427.8 nm $N_2^+$ charge transfer gas laser is realizable if a high voltage pulsed preionizing source and a pulsed main discharge source are arranged in a mutually perpendicular transverse fashion in a chamber 1.9 cm high by 0.6 cm wide by 64 cm long. In the disclosed embodiment of Lauderslager et alias, the main discharge electrodes are spaced by 1.9 cm and energized with a 30 kV, 25 ns, 1.1 Joule pulse while the preionizing electrodes are spaced by 0.6 cm and energized with a 100 kV pulsed source of undisclosed energy. At an operating pressure of 4 atmospheres and an operating wavelength $\frac{1}{25}$ that of $CO_2$, the discharge chamber parameters were pD=57,760 T-mm, $N_{D1}$=330, $ND_{D2}$=32.9 for 428 nm light. As a classic, high pressure, very large aperture laser system, the means of sophistication required to keep the discharge stable are the orthogonally oriented discharge sources with pulse widths of 50 ns or less. An equivalent wavelength and pressure scaled $CO_2$ laser would have an electrode spacing of 47.5 cm, a sidewall spacing of 15 cm, operate at a pressure of 121.6 T and have pD product of 2310 T-mm and would be a candidate for e-beam or some other type of pulsed excitation. Optically, the apertures are so large that area cooling and waveguide resonators would not have any effect or application. There is no indication that the laser device disclosed in U.S. Pat. No 4,088,965 would operate as a $CO_2$ laser and no teaching is thus inferred.

To summarize, two different pictures of useful $CO_2$ laser discharges emerge from the prior art with respect to whether there is any equivalence between increasing the size of a small discharge aperture by increasing the width of the electrodes or increasing the spacing of the electrodes. Increasing the discharge width to create a slab discharge wherein W/D is large has been shown to be very effective in improving the utility of $CO_2$ lasers. Because the Fresnel numbers in W are typically $N_W \gg 1$ and in D are $N_D < 1$, the choice of cavity must be one that accommodates high aperture losses in small Fresnel numbers and provides mode discrimination for large Fresnel numbers. Contrary to the existence of prior art for RF discharge chambers wherein $W/D \gg 1$, no prior art exists for $D/W \gg 1$, although for $D/W < 1.5$, such spacing has only been shown to be significantly non-beneficial. Accordingly, no prior art for optical resonators in $CO_2$ lasers in the $D/W \gg 1$ discharge aperture regime exists.

If a small symmetric discharge aperture is made larger in the direction of the width of the electrodes, so that $W/D \gg 1$, prior art transverse RF excitation can be applied to the discharge aperture to permit the realization of high specific power discharge regions that have Fresnel numbers $N_W \gg 1$ in the direction of the electrode width, but only if the Fresnel number of the transverse discharge region in the electrode spacing $N_D < 1$, or, about unity or less. Since the Fresnel number in W is $N_W \gg 1$, unstable optical resonators are the only choice of cavity having significant differences in diffraction losses for higher order modes, and these resonator types, when combined with a waveguide resonator to accommodate the aperture losses due to the unity or less Fresnel number in the electrode spacing, have been shown to be an effective combination resonator for realizing outputs that are not multimode. The benefits of this type of prior art excitation geometry and cavity system are that very desirable high specific input powers per unit volume can be achieved while still maintaining highly stable discharges because of the cooling provided by the closely spaced, large area water cooled RF electrodes. The output power for $W/D > 1$ has been shown to exceed the 84 W/m of a $W/D=1$ device because of the beneficial area cooling. With aspect ratios of discharge width to electrode spacing W/D of 20 or more, output powers over 1000 W/m of gain length have been realized in sealed-off devices, again because of area cooling. A recently developed theory of RF discharges for the close electrode spaced, rectangular cross section geometry reveals that for a given gas mix, electrodes of width W, spacing D and aspect ratio $W/D \gg 1$, the discharge region should be pumped with fD and pD products in the range of 288 mm-MHz and 133 T-mm.

If a small symmetric aperture is made larger in the direction of the electrode spacing, transverse RF excitation of a $CO_2$ laser has been shown to be not beneficial. When a square RF excited waveguide, 2 mm to 3 mm on a side, is elongated in the direction of the electrode spacing to even $D/W=1.5$, the prior art shows that, without exception, the laser power output from these $D/W < 1.5$ RF excited waveguide devices is notably less than that obtained from $D/W=1$ RF excited waveguide devices. In some cases, the $D/W < 1.5$ RF excited waveguide devices required transverse gas flow to maintain discharge stability with specific input powers that were only marginally greater than in $D/W=1$ devices that were completely sealed-off. In the regime of non-symmetric RF excited discharge apertures for which there is any prior art, namely $D/W < 1.5$ and $N_D$ and $N_W$ both of order unity or less, the prior art optical resonators have all been waveguide in both D and W, and accordingly, no prior art exists for an RF excited aperture where $D/W \gg 1$ and where $N_W < 1$ and $N_D \gg 1$, or where $N_W > 1$ and $N_D > 1$.

For much larger rectangular apertures with dc excitation, wherein electrode to sidewall spacing ratios of $D/W=15$ and Fresnel numbers $N_D=1180$ and $N_W > 5$ are used, stable $CO_2$ discharge operation, even in the presence of slow longitudinal gas flow, can only be achieved with the use of launcher electrodes, an array of ballasted pin electrodes and a powerful transverse magnetic field all positioned interior to the discharge chamber. This prior art teaches that there is a delicate interplay between the pressure, chamber aspect ratio and magnetic field strength. Operation with ac in this geometry in place of the dc is taught to result in a stable discharge only if additional launcher electrodes are added and the magnetic field is maintained.

Rectangular cross section RF excited discharge regions, elongated by a factor of D/W 1.5 in the direction of the electrodes spacing but still being waveguide in both dimensions, appear from the prior art to be an inherently undesirable excitation scheme. Also, dc excited rectangular cross section discharge regions $D/W=15$, highly elongated in the direction of the electrode spacing and operating with Fresnel numbers of $N_W > 5$ in sidewall spacing and $N_D > 1100$ in the electrode spacing, are taught by the prior art to require longitudinal gas flow, a powerful transverse magnetic field, multiple ballasted electrodes and complicated launcher electrodes in order to maintain discharge stability with ac or dc excitation. No prior art optical schemes for this type of discharge aperture are either specifically described or suggested.

The preceding discussion of the prior art, viewed from a number of different technological perspectives, has elucidated the general advances in the field of transverse RF excited $CO_2$ lasers that have come from combining different elements known in the prior art. All of the above-discussed applicable prior transverse RF excited $CO_2$ laser art deals with waveguide resonators in the electrode separation distance D, and with discharge chambers that have $D \ll W$ or D's no greater than 1.5 W. No prior art exists for confined transverse RF excited devices wherein $D \gg W$ and have either a freespace Gaussian resonator or unstable resonator in dimension D. Likewise, no prior art exists for use of one dimensional waveguide resonators in a high aspect ratio, confined transverse RF discharge chamber wherein the removal of discharge heat and guiding is done in the dimension W where plasma sheaths are not present, i.e., in a direction perpendicular to the discharge electric field. Rather, all prior art high aspect ratio transverse RF discharge geometries deliberately use a waveguide cavity in the direction of the discharge electric field.

The prior art teaches that RF excitation applied to sealed-off $D/W \ll 1$ $CO_2$ lasers is beneficial. The prior art also teaches, however, that RF excitation applied to $1.09 < D/W < 1.5$ $CO_2$ lasers wherein the optical resonator is waveguide in dimension D is not beneficial, and may even require gas flow to maintain discharge stability. The prior art additionally teaches $D/W=15$ with ac or dc excitation requires multipin ballasted electrodes, powerful transverse magnetic fields, launcher electrodes and gas flow to maintain discharge stability. Thus, the prior art would teach those of ordinary skill that RF excitation of a chamber where $D/W > 1.5$ and where the dimension D is waveguide would not provide a beneficial result.

SUMMARY OF THE INVENTION

The present invention overcomes the above-described and other deficiencies and disadvantages of the prior art and, in so doing, provides a novel and improved RF pumped gas laser, particularly a device employing the lasing gas mixture which includes $CO_2$, characterized by low weight, few intravacuum parts, low fabrication cost, relatively high discharge and volumetric efficiency, use of low discharge excitation frequencies, decoupling of the fD, pD product relationship into a fD, pW product relationship that permits the independent selection and optimization of discharge pressure and excitation frequency, use of a one dimensional unstable resonator whose transverse axis is parallel to the discharge electric field, and use of discharge sidewalls that run parallel to the discharge electric field to remove discharge heat. A laser in accordance with the invention has the capability of combined use of RF and dc discharge excitation, permits the use of transversely contoured electrodes to promote the use of dc augmented RF excitation, permits the use of longitudinally contoured electrodes to promote longitudinal discharge uniformity without use of any intravacuum or extravacuum inductive elements, allows the generation of high discharge impedances in a low capacitance structure, allows the combined use of RF/RF or RF/dc excitation to achieve aperture diversity, can accommodate use of catalytic materials on the ceramic sidewalls to extend laser lifetime, and can make use of effective extravacuum forced air cooling.

In addition to the aforementioned characteristics, the electrode geometry of the present invention is unexpectedly found to inherently suppress the transition from the desirable alpha type RF discharge to the undesirable gamma type discharge. Also, operation of a laser in accordance with the present invention, which uses a unique one dimensional unstable resonator whose transverse axis is parallel to the discharge electric field, has unexpectedly revealed that the plasma sheaths in prior art slab devices can be a source of substantial medium inhomogeneity thereby significantly degrading output beam quality, in some cases by 50% to 100%.

In accordance with the invention, a large area discharge, which is substantially rectangular in all plane views, may be generated using a low ISM excitation frequency, and particularly the 27.12 MHz or 13.56 MHz ISM frequency. In cross-section, this discharge geometry has a longer and a shorter dimension, the longer dimension being between electrodes separated by a distance D and the shorter dimension, suitable for both guiding intracavity laser light and providing area cooling to the discharge, being between a pair of ceramic sidewalls separated by a distance W. In this discharge chamber, the RF discharge electric field is maintained in the long transverse dimension, perpendicular to W. A pair of mirrors situated at or near the ends of the rectangular cross-section discharge chamber, the chamber being bounded by the widely spaced electrodes and the closely spaced side walls, comprise the optical resonator of this asymmetric cross-section RF excited $CO_2$ medium. The laser cavity so formed has two very different Fresnel Numbers which are respectively associated with the dimension D and dimension W, the larger of the two Fresnel numbers being commensurate with a stable freespace Gaussian or an unstable resonator mode and the smaller of the two Fresnel numbers being commensurate with the guidance of intracavity laser light. Accordingly, if the cavity Fresnel numbers associated with transverse discharge dimensions D and W of the present invention are defined as before, then $N_D \gg N_W$ since $D \gg W$ and the cavity is preferably either stable freespace Gaussian or unstable in the larger cross section dimension defined by D, and guided wave or freespace Gaussian in the shorter dimension W, perpendicular to the discharge electric field.

The present invention generates a stable RF discharge in a rectangular cross-section discharge chamber without using a transverse magnetic field for discharge stability. The invention also uses, when operated as a laser oscillator, optical cavities that have waveguide modes in the sidewall spacing and unstable modes in the electrode spacing or that have waveguide modes in the sidewall spacing and freespace Gaussian modes in the electrode spacing or that have freespace Gaussian modes in the sidewall spacing and unstable modes in the electrode spacing.

The present invention generates a rectangular cross-section RF discharge whose ratio of electrode to sidewall spacing is D/W>1 and is area cooled.

The present invention also has the discharge area or wall cooled by a surface that runs parallel to the discharge electric field The present invention generates a substantially rectangular cross-section RF discharge whose ratio of electrode to sidewall spacing is D/W>1 and whose sidewall cooling is in the ratio of D/W.

The present invention further generates a rectangular cross-section RF discharge whose plasma sheaths extend over substantially less than the full length of the long transverse discharge dimension.

The present invention additionally generates a rectangular cross-section RF discharge in a chamber wherein D/W>1 and is suitable for supporting a unstable resonator mode in only one dimension.

The present invention may also generate an RF discharge in a chamber wherein W is not constant, D/W>1, and the chamber is suitable for supporting a unstable resonator mode in only one dimension.

The present invention may also generate a rectangular cross-section RF discharge in a area cooled chamber wherein D/W>1 and is suitable for supporting a one dimensional stable freespace Gaussian mode in either D or W.

The present invention may also generate a rectangular cross-section RF discharge whose discharge electric field is parallel to the transverse axis of a one dimensional unstable resonator mode.

The present invention may also generate a rectangular cross-section RF discharge whose discharge electric field is parallel to the longitudinal axis of a one dimensional unstable resonator.

The present invention may also generate a rectangular cross-section RF discharge for use with a one dimensional unstable resonator where the power output is coupled from an edge located only near one electrode.

The present invention may also generate a rectangular cross-section RF discharge for use with a one dimensional unstable resonator where the power output is coupled from only near one sheath region or less.

A laser in accordance with the present invention is characterized by a rectangular cross-section discharge region whose plasma sheath regions do not couple to substantial portions of either the intracavity mode or the output coupled mode of the cavity.

In accordance with the present invention, an unstable resonator in the dimension of the electrode separation is employed and the fraction of diffraction coupled output that passes through regions where plasma sheaths are predominant is minimized by coupling from the edge of the mode to minimize interaction with the sheath region at the electrodes.

The present invention may employ an unstable resonator in the dimension of the electrode separation and minimize the fraction of diffraction coupled output that passes through regions where plasma sheaths form by coupling from the central portion of the aperture.

The present invention may also use either edge or central aperture coupling from a one dimensional unstable resonator to extract power from a rectangular discharge region that substantially avoids passage of the output beam through the sheath regions.

The present invention may additionally utilize a one dimensional, low magnification partially transmitting unstable resonator to extract a high aspect ratio output beam shape that is single mode in the dimension of the electrodes and single mode in the sidewall spacing.

The present invention may also use a negative or positive branch unstable resonator only in the direction of the electrode spacing.

The present invention may also use a one dimensional negative or positive branch unstable resonator wherein the plasma sheaths run only substantially perpendicular to the transverse axis of the unstable resonator.

The present invention may further use a one dimensional negative or positive branch unstable resonator in a medium wherein the plasma sheaths run substantially only in the direction of the longitudinal axis of the unstable resonator.

The present invention also has the ability to use a negative or positive branch unstable resonator in a RF excited gas medium wherein the plasma sheaths run substantially only in the transverse axis of the unstable resonator.

The present invention has the capability of exploiting area cooled rectangular cross-section $CO_2$ discharges wherein the electrode spacing is greater than 4.5 mm.

The present invention may also use a negative or positive branch unstable resonator only in the direction of the electrode spacing to generate a single mode output from a aperture wherein the $CO_2$ plasma sheaths are less than 6 mm wide.

The present invention generates a substantially rectangular cross-section RF discharge in a discharge chamber having a ratio of electrode to sidewall spacing is D/W>1.5.

The present invention generates an RF discharge whose ratio of electrode to sidewall spacing is at least D/W>1 even when the sidewall spacing is not constant.

The present invention, in an alternative embodiment, generates a substantially rectangular cross-section RF discharge whose ratio of electrode to sidewall spacing is D/W>1 and wherein an odd number of electrodes are employed.

The present invention may generate a rectangular cross-section RF discharge whose Fresnel number in the electrode spacing $N_D$>1.6.

The present invention may generate a rectangular cross-section RF discharge between electrodes separated by more than 4.5 mm.

The present invention, in one embodiment, employs curved electrodes to promote discharge uniformity. Since the optical cavity of the a laser in accordance with invention is not waveguide in the dimension D, the electrodes do not have to be cartesian planar, and preferably can be contoured along their length L. This permits the spacing between the electrodes to be greater at either discharge endpoint to compensate for standing wave effects which cause the RF voltage across the electrode endpoints to be greater than at the electrode center.

The present invention may employ a curved contour across an electrode of width W. A curved contour in the direction W permits the co-application of dc to the RF discharge without causing the discharge to be unstable.

The present invention has the ability to exploit the use of low cost, low frequency RF sources, particularly those for the 13.56 and 27.12 MHz ISM bands. This can be achieved with the instant invention because the waveguiding function of the cavity is provided by the small sidewall spacing W, not the electrode spacing. Thus, there is no requirement to use high frequency excitation for a laser fabricated in accordance with the invention even though very effective wall or area cooling is being exploited.

The present invention may also simultaneously exploit the benefits of area cooling, moderate to high pressure operation and low frequency excitation. This can be achieved because, even though the electrode spacing D is large, there is no requirement to use low discharge pressure. Thus the frequency of excitation can be chosen without regard to pressure effects and a electrode spacing D appropriate to the choice of frequency is easily made. Once the frequency and electrode spacing are chosen, a discharge pressure can be independently chosen by adjusting the separation of the sidewall spacers to provide the cooling necessary to maintain a stable discharge for the desired excitation conditions. For example, if an fD product of 288 mm-MHz is used as an approximate guide, a 21 mm electrode spacing would be appropriate for use with 13.56 MHz excitation while a 29 cm electrode spacing would be appropriate for 1 MHz excitation. With 1 MHz excitation, the "RF" discharge electric field reversal occurs every 500 nsec, not significantly different from the build-up time for a plasma instability in the typically employed $CO_2$ mixtures. Obviously, the close spaced sidewalls can have a very large stabilizing effect on the discharge destabilization process.

The present invention may additionally exploit rectangular cross-section discharges wherein the product of the excitation frequency and the waveguide dimension is <100 mm-MHz.

The present invention may additionally exploit area cooled rectangular cross-section discharges wherein the product of the excitation frequency and electrode spacing are >288 mm-MHz, but where the frequency is less than 41 MHz.

The present invention, in one embodiment, exploits separate but switchable operation of different transverse discharge segments to create aperture diversity to angle scan the laser output.

In accordance with another aspect of the present invention, a split discharge exploits low frequency excitation. Use of low frequency excitation is particularly relevant to low laser system cost because the cost of producing high power 13.56 MHz RF sources itself is low.

In accordance with yet another aspect of the present invention, employment of a split discharge allows the discharge impedance to fall into the 200 Ohm region where discharge impedance matching from a 50 Ohm RF source impedance can be accomplished with efficient, compact and broadband toroidal transformer circuits.

The present invention also enables the use of split discharge operation to adjust the laser discharge impedance to fall at a desirable value such as 50 Ohms.

The present invention in exploiting split discharge operation, also achieves sidewall cooling that can be effectively maintained with extravacuum forced air convection cooling.

The present invention generates a rectangular cross-section discharge that minimizes the establishment plasma sheath capacitance and thereby facilitates the initiation of the discharge and the design of discharge matching networks since such networks do not have to compensate for large discharge circuit capacitance changes when the discharge is initiated.

The present invention is also characterized by generating an area cooled discharge in a structure with a low electrode capacitance. A low electrode capacitance facilitates the attainment of high fD products to provide for a more stable discharge with high peak RF inputs when metal electrodes are used.

A laser in accordance with a first embodiment of the present invention consists of a first, i.e., an ungrounded or "upper", RF electrode and an oppositely disposed "lower" grounded electrode. These electrodes are separated by a pair of spatially displaced, non-conductive spacers which, in the preferred embodiment, are comprised of a ceramic. Also in this first embodiment, the spacers are elongated and overlie the electrodes. This geometry results in two long and slender electrodes which comprise two walls of the discharge chamber. The upper electrode is isolated from ground potential by a third non-conductive spacer. These five components, i.e., the two electrodes and three spacers, are situated inside a metal vacuum envelope. For sealed-off devices, to gain a significant advantage of area cooling of the discharge, the discharge chamber must depart significantly from a symmetric cross-section, i.e., the distance between the electrodes must be larger than the separation between the two ceramic spacers which cooperate with said electrodes to define the cross-section of the discharge chamber. Also, to exploit area cooling of the laser to achieve high output powers in a single transverse stable freespace Gaussian or unstable resonator mode, the dimensions of the discharge chamber defined between the electrodes must either be at least 4 mm for 10P20 $CO_2$ laser light or have a Fresnel number larger than unity in a chamber no longer than 35 cm.

When RF power is applied to the ungrounded upper electrode of the first embodiment, a uniform transverse RF discharge is established between the electrodes and confined to the region between the ceramic spacers. The electrodes have no function related to the guiding of the intracavity optical radiation generated by this discharge and specifically may be non-cartesian planar and define a gap having a curve across its width and along its length to promote a uniformly excited discharge.

In a laser in accordance with the invention, the confined RF discharge is established between a pair of widely spaced electrodes but is stabilized by collisions with nearby non-conductive walls. In contrast to some prior art devices with wide electrode spacings, no additional sophistication such as magnetic fields and launcher electrodes or mutually perpendicular pulsed discharge sources are necessary to generate stable, medium to large aperture, high aspect ratio discharges. Also, in contradistinction to other previous devices where the discharge is collisionally cooled by closely spaced electrodes on whose surfaces plasma sheets are always observed, in the present invention the cooling effect provided by the electrodes is minimized and the cooling function is provided by walls on which plasma sheaths do not form. In one aspect of the disclosed embodiments, pD products as high as 954 T-mm and fD products as high as 455 mm-MHz may be used in a 32 cm gain length device to produce >10% efficient discharge operation under a variety of pulsed and cw discharge conditions using 27.12 MHz excitation, no inductive elements across the discharge structure and with guidewall spacings as low as 1.8 mm. A comparable slab device would require 250 MHz excitation at a pressure of 530 Torr, a pressure where discharge operation can be unstable unless numerous inductive elements along the discharge structure are used. In another aspect of the disclosed embodiments, uniform high specific discharge inputs with guidewall spacings as small as 1.3 mm and transverse discharge aspect ratios of over 12:1 were used to obtain single transverse mode operation in both discharge dimensions with 27.12 MHz excitation. Such operation would be impossible using prior art discharge technology.

Additionally, the present invention provides a sealed-off discharge geometry wherein stable alpha type RF discharges can be generated in an operating regime where the product of discharge pressure and electrode spacing is high even though the excitation frequency is relatively low.

The present invention also provides a gas laser discharge geometry that can generate high output powers per unit of discharge area from a compact and uncomplicated structure using the 27.12 MHz ISM RF excitation frequency without compromising laser performance and cost.

Further, in a laser in accordance with the invention, the geometry of the discharge inherently reduces standing wave effects along the electrode structure because the excitation frequency is low. Further, the capacitance of the electrode structure can also be low and thus the number of inductive elements required to overcome the effects of a standing wave voltage variation can be minimized and even eliminated if a sufficiently low excitation frequency is used.

Since the electrodes of a laser in accordance with the invention are not required for waveguiding, these electrodes do not have to be cartesian planar. In fact, the present invention encompasses discharge geometries that can accommodate electrodes with non-cartesian planar shapes to promote discharge stability at high peak power pulsed and cw RF-DC inputs.

As a further advantage of not employing the electrodes for waveguiding, the discharge geometry of the present invention permits the length of the electrodes to be independent of the length of the structure that guides the resonator mode and provides the discharge with area cooling. In this way, grounded cavity mirrors can be placed close to the end of the discharge chamber without diverting any discharge energy to the mirror mount itself.

A further benefit of the present invention, precipitated by not employing the RF electrodes as a waveguiding structure, is that discharge medium inhomogeneities near the guide walls are not observed since no plasma sheaths are formed on these waveguiding side walls. Also, the plasma sheaths that form on the slender, low area electrodes, have been manipulated to have minimal interaction with either the output diffracted from the resonator or the mode circulating within the resonator. Thus, since the intracavity mode in a device in accordance with the present invention does not have to pass through the high optically inhomogeneous sheath regions as does the intracavity mode in prior art devices, a significant improvement in the beam quality of the laser can be realized. For example, at the transverse extremities of the discharge in the present invention, the output of an unstable resonator mode with edge diffraction coupling can be easily arranged to not pass through any of the sheath region on the side of the discharge where the output beam is taken. As a result of using a waveguide-unstable resonator, the present invention provides the unexpected benefit of waveguiding being realized between surfaces on which plasma sheaths do not form. These unexpected benefits, which were revealed in an embodiment of the instant invention by observing the intracavity circulating mode of a waveguide-unstable resonator with a partially reflecting cavity optic, can be uniquely exploited in RF excited, rectangular cross-section discharge gas lasers with waveguide-unstable cavities made in accordance with the teachings herein to obtain a laser output with superior diffraction properties.

Yet another advantage of the present invention is the ability to exploit enhanced area cooling with closely spaced sidewalls wherein the plasma sheath discharge volume is minimized. For example, if a 2 mm by 44 mm cross section region with a two electrode geometry is excited at 40.68 MHz, the total sheath thickness would be about 1 mm with the present invention and thus the sheath volume would be only about 2% of the discharge volume. If the same 2 by 44 mm region were energized with 40.68 MHz using prior art technology, the total sheath thickness would be about 1 mm and thus the sheath volume would be about 50% of the discharge volume.

Still another advantage of the present invention is the ability to apply dc through the same electrodes as the RF electrodes to adjust the total discharge E/p to be optimum for excitation of a given gas mixture and pressure.

Still another advantage of the present invention is the ability to apply dc through electrodes that only change the discharge E/p of the positive column of the RF discharge without affecting the plasma sheath regions.

Unexpectedly, using the teachings of the present invention, average input powers as high as 60 W/cm$^3$ can be maintained without generating a gamma discharge with uncooled electrodes and with discharge sidewalls that had relatively ineffective heat transfer characteristics as shown in the embodiment in FIG. 1. This beneficial type of RF discharge behavior, which has not been previously observed, is believed due to a combination of the high aspect ratio of the transverse discharge cross-section in the direction of the RF discharge electric field, the shape of the plasma sheaths near the electrodes, the reduction of secondary emission due to the low area electrodes, the collisional stability provided by the insulating sidewalls that contain the RF discharge and the alignment of the discharge electric field to minimize the emissive properties of the sidewalls.

Also, unexpectedly, the plasma sheath regions of discharges generated in accordance with the teachings herein have been found to be only partially contributing to the laser output in the direction of the single mode unstable resonator dimension and thus "tapering" of the intracavity intensity profile in a RF excited waveguide $CO_2$ laser with an unstable resonator was observed for the first time. This tapering of the intensity profile by the sheath regions is believed to be the reason that prior art RF excited slab devices using hybrid waveguide unstable resonators have outputs that depart by 40% to 100% from diffraction limited operation. Due to the fundamental and complete overlap between the plasma sheath regions and the intracavity mode in prior art devices this observation was not possible.

BRIEF DESCRIPTION OF THE DRAWINGS

The present invention may be better understood, and its numerous objects and advantages will become apparent to those skilled in the art, by reference to the accompanying drawings wherein like reference numerals refer to like elements in the several FIGURES and in which.

DESCRIPTION OF THE DISCLOSED EMBODIMENTS

Figure 1:
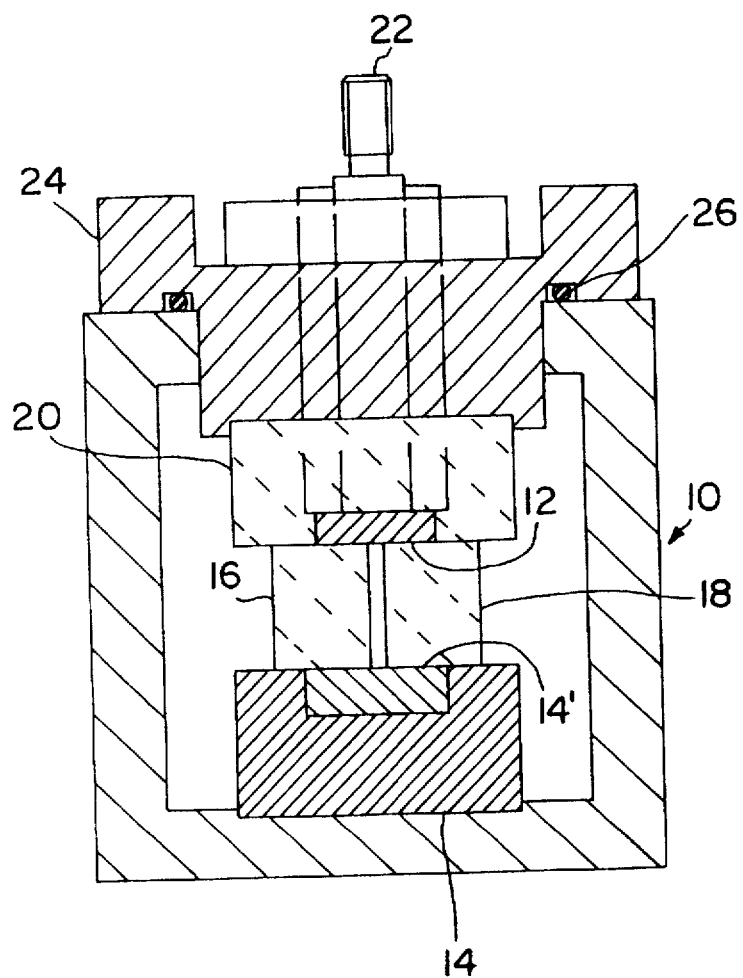
FIG. 1 is a schematic, cross-sectional, end elevation view of a rectangular discharge laser in accordance with a first embodiment the invention.

Referring to FIG. 1, the discharge geometry of a laser in accordance with a first embodiment of this invention is defined by five individual ceramic and metal components which are located within a vacuum envelope indicated generally at 10. In one reduction to practice, vacuum envelope 10 was comprised of aluminum with ⅛" thick walls. The components located within envelope 10 include an ungrounded, upper RF electrode 12. Upper electrode 12 is spaced from a grounded, lower electrode 14 by left and right ceramic spacer pieces 16 and 18. In the disclosed embodiment, the ceramic spacers 16 and 18 were comprised of $Al_2O_3$. The spacers, at least in part, overlap the electrodes and cooperate with the electrodes to define an elongated cavity which is of rectangular shape. Because of the overlap of the electrodes by the ceramic spacers, the oppositely disposed sides of the cavity, which are comprised of conductive material, are elongated and narrow. Viewed along the optical axis of the laser as shown in FIG. 1, this spaced narrow electrode arrangement confines the laser medium to a vertically oriented rectangular region, i.e., the distance D between the electrodes measured across the cavity in a first direction is greater than the width W of the cavity. Restated, the spacing between the ceramic spacers 16 and 18, measured in a second direction which is transverse to the first direction, is smaller than the electrode spacing. The electrode spacing D should be at least both greater than the said transverse direction and also be at least large enough to support a freespace Gaussian resonator mode.

To those skilled in the art of transverse RF excited gas lasers, the laser embodiment of FIG. 1 has a longitudinal optical axis with a discharge space excited by an RF electric field. The discharge space has a cross-section to which the longitudinal optical axis is perpendicular. The discharge space is defined by a pair of spaced apart non-conductive sidewalls having the electric field established substantially parallel to said non-conductive sidewalls, said discharge space having a cross-section characterized by an average shorter dimension and an average longer dimension which is transverse to said shorter dimension. In addition, the shorter dimension, being between the said sidewalls and the said longer dimension being in a direction parallel to the transverse axis of either an unstable resonator mode or a transverse axis of a Gaussian freespace resonator mode. The shorter dimension is further described as being in a direction parallel to a transverse axis of a waveguide mode or a freespace Gaussian mode. Accordingly, the types of resonators preferred for the rectangular cross-section discharge space taught herein, a designated first in the longer cross-section dimension and second in the shorter cross-section dimension are: unstable, waveguide; unstable, freespace Gaussian; freespace Gaussian, waveguide; and freespace Gaussian, freespace Gaussian.

The upper electrode 12 is received in an elongated cavity provided therefor in a first surface of a third ceramic spacer 20. Radio frequency power, desirably at an ISM frequency, is delivered to electrode 12 via a conductor 22 which extends through an aperture in envelope 10 and a corresponding hole in the ceramic spacer 20. Impedance matching is preferably accomplished in the manner disclosed in above-referenced U.S. Pat. No 4,751,717 using a single series inductor, not shown. The application of RF energy to ungrounded electrode 12 will energize the gas in the rectangular discharge chamber defined by electrodes 12 and 14 and spacers 16 and 18. The separation between spacers 16 and 18 serves to confine the $CO_2$ laser discharge and may also guide the intracavity optical mode in the short horizontal dimension if a one dimensional waveguide laser is desired.

All of the five intravacuum components shown in FIG. 1 can be held under compression via a removable cover piece 24 as shown or, alternatively, by a metal wedge arrangement built into the lower grounded electrode 14. The cover 24 of vacuum chamber 10 is sealed to the chamber by means of a suitable seal, for example a Viton O-ring 26, as shown. A similar sealing arrangement is provided for the end plates, not shown, that hold the cavity mirrors which are disposed adjacent the opposite ends of the rectangular discharge cavity.

In the following discussions relative to the operation of a laser in accordance with the present invention, the longitudinal extent of the discharge determined by the length of the electrodes is $L_E$, the dimension of the discharge region measured between the non-conductive sidewall spacers is denoted W, the dimension of the discharge region measured between the electrodes is denoted D, the Fresnel number of the discharge aperture in the direction of D is $N_D$, the Fresnel number of the discharge aperture in the direction W is $N_W$, the separation of the cavity mirrors is L, the frequency of excitation is denoted f, the pressure of operation is denoted p, the discharge electric field is defined as the ratio of the discharge voltage to the electrode spacing and is denoted as E, and the electric field to pressure ratio is denoted E/p.

In one reduction to practice of the embodiment of the present invention shown in FIG. 1, the overall length of each of the ceramic spacers 16 and 18 was 37.7 cm while the length of the upper electrode 12 was varied between 32.6 and 35 cm in a series of reductions to practice. Also, in this reduction to practice, an electrode separation of D=15.9 mm was found to yield $CO_2$ laser discharge efficiencies over 10% at a pressure of 60 T, giving a pD product of nearly 1000 T-mm, far from the optimum pD product taught by the above-referenced work of Vitruk et al. No discharge initiation difficulties were observed to pressures of at least 80 Torr. The pD products of a laser in accordance with the present invention can be appreciated to be many times greater than the typically reported pD=133 T-mm product using the teachings of prior art.

In contradistinction to prior art slab lasers, the electrodes 12 and 14 of a laser in accordance with the present invention need not be highly polished. While the electrodes 10 and 12 are shown as being cartesian planar, they may be formed from half round cylindrical shapes or other more complicated shapes that are known to those skilled in the art as uniform field electrodes. In order to explore various types of grounded electrodes, the lower electrode of FIG. 1 included a smaller metal insert 14' that could be removed from one end of the laser after taking off one end mirror mount. In its place a new metal insert having the shape desired could be reinserted into the lower electrode assembly block. In a series of reductions to practice, with the embodiment shown in FIG. 1, one electrode surface was partially covered with a ceramic material; another employed a 35 cm length of threaded 6-32 brass rod as the grounded electrode; another used a 3 mm diameter ceramic rod. In yet another prototype the grounded electrode was made into a re-entrant structure while still another model used a simple planar surface. For RF only excitation, planar electrodes appear to provide the best performance. However, transversely curved ceramic electrodes have also been shown to be very effective in producing longitudinally and transversely uniform discharges with high specific average and pulsed inputs.

The apparatus shown in FIG. 1 will function as a transversely RF excited, rectangular discharge, gas laser. This area cooled laser may be distinguished from prior art large electrode area $CO_2$ laser devices by virtue of the fact that the discharge is generated by a pair of spaced apart electrodes that are long and slender and have no function related to the guiding of the intracavity optical radiation. Also in contradiction to the prior art RF excited devices, the spacing between the RF discharge electrodes is much greater than the width of the discharge and thus, viewed along the laser's optical axis, the discharge cross-section is rectangular with the RF discharge electric being aligned with the long transverse dimension D and perpendicular to the short dimension W.

Restated, the large area discharge created in operation of a laser in accordance with the present invention has a longer and a shorter side, the longer side being between the electrodes and being at least 1.5×the transverse dimension of the shorter side. In the case of a $CO_2$ laser in accordance with the invention as shown in FIG. 1, the distance W between the ceramic spacers 16 and 18, i.e., the dimension of the shorter, light guiding side of the discharge cavity, is in the range of 1 to 4 mm.

In the embodiment shown in FIG. 1, for a given desired cavity length and design, the width of the discharge medium can be controlled by adjusting the spacing between the ceramic spacers 16 and 18. Before a final width of the discharge is chosen, minor adjustments in the discharge dimension can be made, without a change being made in the width of the upper electrode itself, simply by changing the separation between the spacers 16 and 18. The height of the spacers 16 and 18 may be used to set the Fresnel number of the cavity in the vertical dimension in conjunction with the shapes of the upper and lower electrodes 12 and 14.

If the cavity Fresnel numbers associated with transverse discharge dimensions D and W of the present invention are defined as discussed relative to the prior art, then a laser made in accordance with the present invention will have $N_D \gg N_W$, since D>W, and the cavity is preferably either stable freespace Gaussian or unstable in the larger cross section dimension D, and guided wave or freespace Gaussian in the shorter dimension W. The present invention, as a result of not having a waveguide resonator defined in dimension D, permits the diffraction coupled output to be extracted from an unstable resonator through a region not containing any of the highly inhomogeneous sheaths. Accordingly, the invention achieves a significant improvement in the output beam quality of a laser when compared to the prior art. Also, in contradistinction to prior art slab devices, a freespace Gaussian mode can be established in the dimension D whereby the plasma sheath regions can be made to have minimal interaction with the intracavity mode and thus have higher output beam quality. This is particularly important in devices with long cavities where $N_D$ may be about 2 but D is as large as 25 mm.

If a waveguide optical cavity design in the dimension W is desired, and again presuming the lasing specie to be $CO_2$, the separation between spacers 16 and 18 should preferably be in the range of 1 to 3 mm. As is well known to those skilled in the art of $CO_2$ waveguide lasers, if a one dimensional guided wave resonator structure is desired, the ceramic surfaces adjacent to the discharge must be ground flat with a diamond loaded grinding wheel to tolerances that are appreciated and well known to those so skilled. The separation between the ends of the ceramic spacers 16 and 18 and the cavity end mirrors will likewise be set for either a Case I, II or III type waveguide cavity in the dimension W according to the theory and practice well known to those skilled in the art of waveguide $CO_2$ lasers.

In a series of reductions to practice with the embodiment of FIG. 1, a 10M concave (cc) high reflectivity mirror and a planar, 95% reflecting ZnSe output coupler were separated by 38.5 cm and respectively positioned at opposite ends of a discharge chamber with an electrode separation of 15.9 mm, a sidewall spacing of 2.3 mm and a electrode length of 32.55 cm. For 10P20 light, the Fresnel numbers $N_D$ and $N_W$ so generated were 15.48 and 0.33 respectively. As expected, because $N_D$ was much greater than unity and because the resonator was stable freespace Gaussian in dimension D, a higher order mode output in dimension D was obtained. Also as expected, the output was observed to be single mode in the dimension W and therefore significant intracavity waveguiding was occurring since (a) $N_W$ was much less than 1, (b) the cavity mirrors were near planar, and (c) the losses for a $TEM_{00}$ would be far too high to support a freespace Gaussian mode in the dimension W.

In another reduction to practice of the embodiment in FIG. 1, a low magnification, partially transmitting, negative branch unstable resonator using a pair of spherical curvature mirrors was used to couple to the entire 2.5 by 15.9 mm discharge aperture from which a single uniform intensity output beam was extracted. In yet another reduction to practice of the embodiment of FIG. 1, a low magnification, negative branch unstable resonator, formed with a 503 mm concave mirror and a 497 mm concave spherical curvature mirror using axial diffraction coupling as taught in U.S. Pat. No 3,969,685, was used to produce a single mode output in a symmetric output beam using Fresnel numbers $N_D$=11.9 and $N_W$=0.26, corresponding to D=15.9 mm and W=2.35 mm. In this reduction to practice, the sidewall spacers were 37.7 cm in length, the diameter of the output aperture was 2.28 mm and the aperture was located in the center of the mirror with the smaller radius of curvature. It will be appreciated from the length of the unstable resonator in this embodiment that the spherical cavity mirrors were conveniently located 6 cm from each end of the ceramic sidewall spacers.

It is well appreciated by those skilled in the art of RF excited $CO_2$ lasers that the RF excited, rectangular cross-section slab gain medium is anything but an empty region of space. For example, it is well known and appreciated that the excitation frequency and electrode spacing are not completely independent, that the plasma sheath regions which form are a manifestation of the complicated nature of the discharge kinetics near the electrodes, and that a plasma sheath region is one in which the medium gain, medium temperature and medium homogeneity exhibit their largest gradients. It is also well appreciated that a sizeable fraction, perhaps 25%–50%, of the output from the preferred waveguide-unstable slab optical resonators of the prior art pass through 100% of the sheath region. This may be the reason the beam divergence from such prior art slab devices departs by 40% to 100% from diffraction limited operation. Therefore, it will be appreciated by those skilled in the art that no unstable resonator for a prior art slab laser has ever been devised wherein either the intracavity mode or the diffraction coupled output can be arranged to not couple to 100% of the undesirable and optically inhomogeneous sheath region.

For example, if a prior art slab laser using a single-sided, 26% magnification (M=1.26) negative branch unstable resonator were chosen to be the cavity for a 82 MHz RF excited slab discharge region defined between a pair of 44 mm wide, 62 cm long electrodes spaced by 2 mm, the edge coupled output beam would have a shape that is 2 mm by 9.08 mm, as described in the prior art as exemplified by U.S. Pat. No. 5,123,028. According to the theory of slab discharges formulated by Vitruk et al referenced earlier, the plasma sheath thickness is given by $fD_S$=42 mm-MHz, indicating that with 82 MHz RF excitation, the total thickness of the plasma sheaths would occupy about 0.5 mm of the 2 mm interelectrode space or 25% of the cavity mode in the 2 mm dimension. Thus, 25% of the 2 mm by 34.92 mm intracavity circulating mode and 25% of the 2 mm by 9.08 mm output beam also passes through 100% of the sheath region in the waveguide dimension defined by the electrode spacing. Slab $CO_2$ lasers pumped with fD products in the 160–280 mm-MHz range have optimized efficiencies of about 12–15% and have output beam quality that ranges from 50% to 100% in excess of diffraction limit.

By way of comparison, in reductions to practice of the embodiment of FIG. 1, the sheath thickness is seen to be about 1.4 mm with 27.12 MHz excitation. Accordingly, if a 2 mm by 44 mm by 62 cm discharge region was energized according to the teachings herein using an electrode spacing of 44 mm, this region could be expected to have a plasma sheath thickness of about 1.4 mm with 27.12 MHz excitation. If a 26% magnification negative branch unstable resonator were applied to this type of discharge region, only about half of the 1.4 mm/9.08 mm or 8% of the edge coupled diffracted output beam would pass through the plasma sheath area even with 27 MHz excitation. Thus, with a rectangular cross-section discharge laser in accordance with the present invention, only 8% of the 2 mm by 9.08 mm output beam would pass through 100% of the sheath region near one electrode. Clearly, therefore, a rectangular cross-section discharge generated in accordance with the instant invention reduces by over a factor of three (3) that portion of the output beam that passes through the least desirable, most inhomogeneous region of a prior art slab discharge gain medium. Plasma sheath regions absorb $CO_2$ laser light and any means by which they can be substantially tailored and avoided will reduce the fraction of unproductively pumped discharge volume, and promote an intracavity mode profile that has less rather than more tapering.

As can be appreciated, with the present invention it is not necessary for even any portion of the output beam of a one-sided waveguide unstable resonator to pass through any of the sheath region if the mirror at which the output of the laser is extracted (i.e., mirror of shortest curvature) is made to be smaller than dimension W by the resonator magnification and also by the thickness of the plasma sheath near one electrode. Thus, to the extent that no power amplification is added to the output by passing through the sheath region and the sheath regions are undesirable from a medium optical homogeneity standpoint, a rectangular cross-section discharge laser in accordance with the present invention exhibits an improvement in output beam quality when compared to prior art slab devices.

Compared to the measured, very nearly diffraction limited operation of $CO_2$ lasers with unstable resonators that had a uniform gain profile across a large Fresnel number, symmetric, dc excited aperture, as reported by R.

Freiberg, P. Chenausky and C. Buczek in their paper "An Experimental Study of Confocal $CO_2$ Resonators", IEEE JQE Vol QE8, No.12, pp 882–892, December 1972, the inhomogeneous nature of the gain medium in the electrode-sheath region of prior art slab lasers using a one dimensional unstable resonator is reason for concern. For example, experiments performed with a prior art slab unstable resonator of the type disclosed in U.S. Pat. No 5,123,028 indicate that the output from a one dimensional negative branch unstable resonator is at least 40% poorer than the diffraction limit; likewise, Jackson et al referenced earlier indicates their output departed from diffraction limit by 40 to 75%. In both of these cases, the $1/e^2$ point of a burn pattern in plexiglas was used to measure the relative departure of the slab laser output from diffraction limited operation. In contrast, Freiberg et al used 30 separate data points in the output intensity profile to explore the diffraction properties of a unstable resonator. The detailed measurements on a symmetric aperture unstable resonator, including the intensity profile of the circulating flux in the resonator, revealed that a radially tapered intracavity intensity profile can have an undesirable effect on output beam quality compared to a uniform or nonradially tapered intracavity intensity profile. In this regard, Colley et al, referenced earlier, performed a more detailed measurement of the output profile of the 1 kW slab $CO_2$ laser by essentially scanning the output across a pinhole and viewing the result with a sensitive IR detector. This scanner measurement produced an oscilloscope trace corresponding to the profile of the laser output in the transverse axis of the waveguide mode and the transverse axis of the positive branch unstable resonator. This more detailed measurement of the output profile revealed that the departure from diffraction limit in the waveguide dimension is 30%, while the departure from diffraction limit in the unstable resonator dimension is at least 100%. Clearly, the $CO_2$ gain in the RF plasma sheaths is not the same as it is in the positive column and a spatial gain profile near the electrodes is generated. At a very minimum, the degree to which the plasma sheaths, the circulating flux, the diffracted output beam and the mode shapes overlap in a prior art RF excited slab laser underscores the departure of the slab medium from ideal free space.

Using the embodiment of FIG. 1, the basic nature of the intensity profile of the intracavity circulating mode in a laser made in accordance with the instant invention was explored using a partially transmitting, very low magnification, negative branch unstable resonator. The discharge region explored was excited by a 27.12 MHz RF source and used an electrode spacing D=15.9 mm. Three separate values of W, W=2.57, 1.8 and 1.35 mm were used with the fixed D. The resonator was comprised of a 503 mm CC spherical total reflector and a 497 mm CC spherical, 95% reflecting ZnSe mirror spaced from each other by 500 mm. Accordingly, to within the mirror curvature tolerances, the cavity was an M=1.012 confocal, negative branch unstable resonator as generally discussed by Freiberg et al above. In each case of W, the output mode was observed 1 cm directly in front of the 497 mm CC ZnSe output mirror, the rear surface of which had a 497 mm CX surface AR coated for 10.6 um use. The spherical mirrors were spaced 6 cm from the end of the left and right ceramic spacer pieces. For all cases of W, the modal intensity as seen on a UV illuminated infrared viewing plate was uniform over the entire output mode shape. At both edges of the mode near the 15.9 mm electrode spacing, the output intensity was observed to be the same as it was midway between the electrodes. For all cases of W, the size of the mode in W was observed to correspond to the sidewall spacing and was observed to be uniform across W. However, while the mode was observed to be quite uniform in D, as expected, the mode pattern was consistently observed to be shorter than the electrode spacing by about 1.4 mm. This was unexpected. The same departure in mode size in the dimension D was observed with single mode waveguide, multimode stable freespace Gaussian resonators formed with near planar optics. In all cases, no aperturing at the mirror mounts or by the mirror mounts was taking place. Based on these results, a subsequent analysis of the different cavities that were reduced to practice with the embodiment of FIG. 1 indicated that the lack of output from the laser at or near the electrode surfaces was not due to using a stable cavity having a small mode size in the electrode dimension. Thus, based on the measured shape of the output beam in the dimension of the electrode spacing, and the known properties of unstable resonators, the plasma sheath regions are observed to only partially contribute to the output power of the laser. This observation and conclusion is quite important, since heretofore the sheath regions were not known to be partially absorbing. Also, since the plasma sheath regions are absorbing, it is clear that a discharge geometry in which D/W>>1 can be made to generate a large length of positive column to thereby reduce the relative amount of total discharge power lost in the sheath regions and improve the overall discharge efficiency and beam quality.

The intracavity mode in a waveguide-unstable cavity in prior art RF slab lasers is in direct contact with the surfaces on, or adjacent to which, the optical perturbation caused by the plasma sheaths resides. Clearly, then, there is no way to eliminate or otherwise remove the sheaths from the guided wave dimension of a prior art slab device. In like fashion, no way exists to concentrate the sheath regions near the edges or extremities of W with prior art geometries. To accurately determine the degree to which the plasma sheaths are effecting the modal properties of a prior art laser would require comparing the intracavity intensity profile of a waveguide unstable mode propagating parallel to and perpendicular to the plasma sheaths. Since there is no simple analytical operation that can accomplish this task, and since there is no simple experimental rearrangement or rotation of an optical axis that can model the desired type of comparative propagation, the desired comparison has not been made in prior art devices. The use of a partially transmitting waveguide unstable resonator with a device made in accordance with the instant invention appears to be the only way to reveal that the hitherto unexpected feature of RF excited discharges could be realized since, uniquely, only in a $D/W>>1$ geometry is the transverse axis of the unstable resonator preferentially perpendicular to the electrode surfaces and not parallel to the electrode surfaces as in prior art $W/D>>1$ slab devices. This arrangement, combined with the property of unstable resonators to generate a mode whose size in the transverse axis extends to the limiting aperture of the optical system, permits the optical properties of the sheath regions near the electrodes to be probed by the intracavity flux. That plasma sheaths are anything but operationally benign has not been discussed or observed in prior art slab devices since the circulating mode must contact the surface on which the sheaths exist thereby emitting a mode size dictated by the electrode spacing. Since there is no prior evidence that plasma sheaths are not benign, it has not been the practice, for example, to avoid extracting the output from an edge coupled unstable resonator near the extremities of a prior art slab region, even though it is well appreciated this region is where the upper and lower plasma sheaths coalesce, and also where four wall cooling to two wall cooling is still in transition.

Preliminary use of a partially transmitting waveguide unstable resonator with a device made in accordance with the present invention has revealed that an unexpected benefit can be realized if the waveguiding surface of waveguide unstable resonators with totally reflecting optics is preferentially a surface on which either there are no plasma sheaths or if there are regions with plasma sheaths, the sheaths are preferentially avoided. Thus, since it is now unequivocally clear that plasma sheaths can taper the intensity profile of a unstable resonator mode, it is clear that the sheaths can taper the intensity profile of a waveguide mode. Since the plasma sheaths can force a tapered intensity profile on the output beam in a prior art slab laser, the divergence of the laser output will increase as pointed out by Freiberg et al referenced earlier, and thus the source of departure from diffraction limit in prior art devices may have been identified. If so, the output beam quality of waveguide unstable cavities could be improved by 40% to 100%, the range which conventional slab $CO_2$ laser devices have been observed to depart from diffraction limited operation.

U.S. Pat. No. 5,048,048 teaches the use of a 10% magnification negative branch unstable, waveguide resonator with microwave excitation to produce a slab $CO_2$ laser. In this prior art device, the discharge electric field, generated in a ridge waveguide circuit by a microwave RF source, is perpendicular to the optical waveguiding surface W, and, as usual, $W/D>>1$. An output power of 85 W and a discharge efficiency of 12% was realized by edge coupling the resonator. To realize an output of 85 W, 700 W was used to energize a water cooled discharge region 40 cm long, wherein D=2 mm and W=20 mm with an unspecified discharge pD. For the commonly used S-band microwave oven magnetrons, the ISM frequency is 2450 MHz and thus a discharge fD for the device of U.S. Pat. No. 5,048,048 is calculated to be 4900 mm-MHz. Based on the 43 cm cavity length, the discharge length and aperture, the microwave slab laser operated with $N_D$=0.219, $N_W$=21.9, $P_i$=43.8 W/cm$^3$ and $P_o$=1.06 W/cm$^2$.

As taught by Jackson et al, "$CO_2$ large-area discharge laser using an unstable-waveguide hybrid resonator", Appl Phy Lett, 54 (20), 15 May 1989, pp 1950–52, a 2000 W RF input from a 125 MHz source into a discharge region between a pair of water cooled electrodes 38 cm long, 4.5 cm wide spaced by 2.25 mm can generate a laser output of 240 W at a discharge efficiency of 12%. In this device, which used a 18.5% magnification, positive branch unstable waveguide cavity, pD was 135 T-mm, fD was 281 mm-MHz, $N_D$ was 0.31, $N_W$ was 123.7, $P_i$ was 51.9 W/cm$^3$ and $P_o$ was 1.4 W/cm$^2$.

As taught by Shackleton et al referenced earlier, 133 W multimode output at a discharge efficiency of 14% can be extracted from 125 MHz excited slab discharge region between a pair of water cooled electrodes 38.6 cm long, 1.8 cm wide spaced by 2.25 mm. In this device, pD was 170 T-mm, fD was 281 mm-MHz, $N_D$ was 0.306, $N_W$ was 19.6, $P_i$/vol was 61 W/cm$^3$ and $P_o$ was 1.9 W/cm$^2$.

U.S. Pat. No. 5,123,028 teaches that a 26% magnification negative branch unstable resonator can be used to extract an output of 220 W at a discharge efficiency of 12% from a slab discharge region between a pair of 4.4 cm wide by 61.5 cm long water cooled electrodes spaced by 2 mm long using 81.4 MHz excitation. In this device, pD was 160 T-mm, fD was 163 mm-MHz, $N_D$ was 0.144, $N_W$ was 69.7, $P_i$ was 33.3 W/cm$^3$ and $P_o$ was 0.8 W/cm$^2$.

The output of the negative branch unstable, waveguide resonator from the microwave excited slab laser of U.S. Pat. No. 5,048,048, the output of the Jackson et al device with a positive branch unstable, waveguide resonator, the output of the device of U.S. Pat. No. 5,123,028 with a negative branch unstable, waveguide cavity and the Shackleton et al device are all seen to have comparable output efficiencies. Taken together, this data teaches that by using fD's of 163 mm-MHz, 281 mm-MHz or even fD's as high as 4900 mm-MHz, the discharge efficiency of a conventional slab $CO_2$ laser remains relatively unchanged.

Vitruk et al teaches that over the frequency range from about 80 MHz to over 400 MHz, the power losses in the plasma sheath regions fall as $1/f^2$ from about 12% to about 3%. The efficiencies of the devices of U.S. Pat. Nos. 5,048,048 and 5,123,028, the Jackson et al device and the Shackleton et al device are explainable by the theory of Vitruk et al, i.e., since the sheath losses are not high over the above frequency range, the discharge efficiencies should not be very different.

Vitruk et al also teaches that as the frequency of excitation of similar alpha type RF discharge parameters is lowered from 80 to 25 MHz, the sheath losses will increase to over 50% of the discharge input power. Concurrently, the sheath voltage can be expected to increase to about 685 V, which for 25 MHz similar alpha type RF discharges with electrode spacings in the 10 to 20 mm range, is predicted to be in excess of the alpha to gamma transition voltage. Thus, by decreasing the RF frequency from 80 MHz to 25 MHz, the theory predicts an over fourfold increase in plasma sheath losses and therefore a precipitous decrease in laser discharge efficiency should occur. Likewise, a 25 MHz transverse RF discharge will have a sheath voltage that is so high that a transition to a gamma type discharge will be basically unavoidable.

Based on the predictions of Vitruk et al for nominal 25 MHz excitation, it is not expected that a series of reductions to practice with the embodiment of FIG. 1 should yield multimode discharge efficiencies in the range of 12 to 15% using electrodes that were not water cooled. This level of discharge efficiency is consistent with sheath losses in the range of 10%, but not explainable when sheath losses increase to over 50%. Likewise, the expectation that 25 MHz excitation will generate plasma sheath voltages too high to maintain discharge stability cannot explain why a transition from the alpha to gamma type discharge was not observed even with $P_i=60$ W/cm$^3$ to a discharge region with uncooled electrodes. In view of the conventional slab discharge theory, the robust nature of the alpha discharge using the teachings of the present invention is unexplainable and unexpected.

Since the theory of conventional slab discharges predicts that a high sheath voltage and very low discharge efficiency will accompany the use of low excitation frequencies, it is clear that at least some of prior art slab theory does not apply to discharge geometries where D/W>>1. The fact that a discharge using the present invention is observed to be clearly very stable with 27 MHz excitation indicates that a further increase in the length of the positive column of a D/W>>1 discharge will result in a higher discharge efficiency. This result follows from the fact that the sheath voltage will remain unchanged while the voltage across the positive column will increase as the length of the positive column increases.

No prior art slab $CO_2$ laser with a waveguide-unstable resonator has ever been demonstrated with a guidewidth-frequency product nearly as low as the 36.6 mm-MHz embodiment disclosed herein. Indeed, because such a prior art device would correspond to a device with a 3 mm electrode spacing excited at 12.2 MHz, it is exceedingly doubtful that such a prior art device would lase. Therefore, the fundamental range of operation demonstrated with the teachings herein underscores the basic differences between a discharge region with D/W>>1 and that of prior art where D/W<<1. The combination of low fW products and low frequency operation of the instant invention are particularly relevant to a new emerging class of infrared lasers that favor the use of low frequency excitation as described by P. Vitruk et al, "High power continuous wave atomic Xe laser with radio frequency excitation", Appl Phys Lett, 67 (10), 4 Sep. 1995, pp1366–68.

Based on the experimental measurements and observations with lasers designed in accordance with the present invention that combine area cooling of the discharge with unstable-waveguide resonators, a very basic property concerning the nature of plasma sheaths in prior art laser devices has been found to be significantly different than formerly assumed. Previously it was assumed that the sheath region in W/D>>1 devices was essentially benign. However, the operation of a laser such as depicted in FIG. 1, wherein D/W>>1, unexpectedly and unequivocally revealed that the sheath regions are not benign. Because the sheath regions are not benign and do not fully contribute to the laser output in rectangular cross-section RF discharge chambers with electrode to guidewidth spacings of D/W>>1, a tapering of the intensity profile in prior art devices with W/D>>1 is presumed to be occurring. This tapering of the intensity profile has not been observed by prior investigators because the waveguiding takes place through the sheath region and thus the properties of the sheath region are masked. Based on the above-discussed unexpected findings attained by using the teachings of the present invention, a purposeful benefit of RF excited discharge geometries with D/W>>1 can be derived by simply manipulating the location of the plasma sheath regions within the discharge aperture so that the intracavity circulating mode and the edge coupled output mode from unstable-waveguide cavities will have minimal interaction with the sheath regions. A more sophisticated strategy for modification of the sheath region could involve applying a dc bias to the RF field to elongate or contract a given sheath region. If the sheath regions can be substantially avoided, less tapering of the circulating flux will occur and a potential improvement of up to 100% in diffraction beam quality over that of prior art devices could be realized.

It will be readily appreciated by those skilled in the prior art of transverse RF excited symmetric waveguide and RF excited slab waveguide discharge lasers that the beneficial aspects of a laser made in accordance with the present invention are not realizable in devices that have the discharge electric field established perpendicular to the optical waveguide walls. In all these types of prior art discharge chambers, the average drift velocity provided to the electrons in the positive column of the discharge is in the direction of the short dimension of the discharge chamber. On a plasma kinetics basis, having the average drift velocity and drift direction perpendicular to the broad walls of the RF discharge chamber is characteristic of high current, low impedance plasmas and maximizes rather than minimizes the emissive contributions of the broad walls. Because close electrode spacing and high frequency excitation in prior art devices are coupled, no benefit of low frequency excitation can be received. For example, the cycle reversal time for an optimally excited prior art slab laser is in the few $10^{-9}$ sec range, two to three orders of magnitude faster than the buildup time for a plasma instability. Thus a great reduction in excitation frequency may be possible in a D/W>>1 discharge geometry while at the same time a long length of positive column relative to the plasma sheath thickness is generated to exploit improved laser beam quality and discharge efficiency.

Therefore, with a rectangular cross section discharge laser in accordance with the present invention, an embodiment wherein part of the discharge aperture operates with a discharge E/p different from an adjacent part of the aperture may be desirable. One possibility would be to augment discharge excitation at one RF frequency with excitation at another, for example lower, RF frequency to determine if the sheath regions are different in a self-sustained RF discharge, using a single excitation source, than in a discharge that has a combined ionizer-sustainer type of discharge using two separately controlled excitation sources.

It will be appreciated by those skilled in the art of pulsed RF excited lasers that, in accordance with the teachings of the present invention, the spacing W between the ceramic guidewalls may be made somewhat larger, while still maintaining a high aspect ratio rectangular cross-section, to accommodate a larger discharge volume for a given discharge length and aperture. If a larger discharge volume is required to be achieved with these constraints, the optical cavity may be designed to be stable freespace Gaussian in the dimension W and unstable in dimension D. For example, W may be made to be in the range of 6 mm which, for a cavity length of 50 cm, would yield a $N_W$ in the range of 1.7, and have a discharge volume that is three times that of a device with W=2 mm for an identical dimension D. It will be recognized by those skilled in the art of area cooled $CO_2$ lasers that the average power capability of such a device will be reduced relative to a 2 mm guidewall spacing, since area cooling provided by the sidewalls has a 1/W dependence. Using a specific output of 0.5 W/cm$^2$, a 50 cm long laser with D=2.5 cm, W=0.6 cm and D/W=4.17 would have a sealed-off average output capability of 62.5 W, operate with $CO_2$ Fresnel numbers of $N_D$=29.5 and $N_W$=1.7 and would be ideally suited to a stable freespace Gaussian cavity in W and a one dimensional unstable resonator in D. Operating at a pressure of 50 T and pumped at 600 J/LA with a 30 kW 13.56 MHz RF source, a 10% efficient laser would be capable of emitting 300 mJ/pulse to a PRF of about 200 Hz. Therefore, while 0.5 W/cm$^2$ of specific area cooling is not very high, the high peak output power and the high per pulse output energy capability of such a device may prove to be very advantageous in such diverse applications as marking or laser radar where pulse energy and PRF can be optimized for a given marking process or sensor mission. Thus, in a device in accordance with the present invention an unstable resonator mode in the electrode spacing and a freespace Gaussian mode in the sidewall spacing could be operated with high specific peak and average inputs if the interpulse period were increased to fall within the area cooling capabilities of the wider sidewall spacing.

In a series of reductions to practice using the embodiment shown in FIG. 1, electrode spacings D of 12.7 mm and 15.9 mm were used with sidewall spacings W of 1.8 to over 4 mm in different combinations. In particular, a common electrode spacing of 12.7 mm was used with discharge widths respectively of 3.2 mm and 4 mm. The length of the left and right ceramic spacers was held fixed at 37.7 cm and the cavity end mirrors were each located an additional 1.5 cm outwardly from the ends of the ceramic spacers. Accordingly, the discharge cavity had a 40.7 cm overall length. In the case of the 3.2 mm discharge width, the Fresnel number $N_W$ of the cavity was 0.59 while the Fresnel number $N_D$ of the cavity was 9.3. The cavity resonator was bounded on a first end by a 95% reflecting ZnSe mirror having a 2 meter concave spherical surface with an AR coated rear surface for 10P20 $CO_2$ laser light. The opposite end of the cavity resonator was defined by a maximum reflectivity silicon mirror with a 4 meter spherical concave surface. Accordingly, the stable optical resonator g values, defined as 1 minus the ratio of the mirror spacing to the mirror curvature, corresponding to the cavity mirrors were 0.8 and 0.9 respectively, and the laser output was multimode stable in the direction of D. In another series of reductions using only 27.12 MHz excitation, the output power using a electrode to width spacing of D/W=1, i.e. using a symmetric cross section discharge where fD=179 mm-MHz was increased by 43% to 33 W when the discharge electrodes and sidewall were such that D/W=7.3 and fD=431 mm-MHz. The output was observed to be single mode waveguide in W and had approximately 9 individual modal spots in the dimension D. This reduction to practice required use of a set of mirror mounts that permitted the cavity optics to be placed close to the ends of the ceramic spacer pieces defining W. At an average power output of 33 W from 32.5 cm of discharge length using near plane-plane resonator optics placed about 2 mm from the ends of the ceramic sidewall spacers, the unoptimized specific output was >101 W/m. This output power was realized in an output beam that was multimode only in the dimension D, i.e., in a waveguide-freespace Gaussian cavity.

Tests on the above-described reductions to practice demonstrated that with a gas mixture of He—$N_2$—$CO_2$ in a 6-1-1 ratio with 5% Xenon added, and an energization frequency of 27.12 MHz, the pressure for maximum output power increased from 37.5 Torr when using a 4 mm discharge width, to 50 Torr when using the 3.2 mm discharge width. The tests were performed employing a variable output power RF source with the output of the source being gated into nominal 1.1 msec discharge pulses at a PRF of 500 Hz. A single series inductor RF transformer, as taught by U.S. Pat. No. 4,908,585, was used to impedance match the discharge impedance to a 50 Ohm output impedance solid state or power grid RF source.

In the above-discussed tests, higher output power was observed with the 3.2 mm separation of spacers 16 and 18 compared to 4 mm separation. This result may be attributed to the fact that the narrower discharge could be operated at a somewhat higher pressure with a higher average input power. However, the overall efficiency of the laser with a 3.2 mm discharge width was lower than that with the 4 mm discharge width because of the optical loss associated with poorer matching of the wavefront curvature of the intracavity radiation to the cavity mirrors, i.e., the mirrors were spaced too far from the endpoints of the ceramic sidewall spacers.

With the embodiment of the present invention shown in FIG. 1, a series of experiments with low duty cycle, high duty cycle and cw pumping were performed to determine the output power under a variety of excitation conditions. For each data run the laser was evacuated to under $<1\times10^{-6}$ Torr and backfilled with a gas of premixed composition. The data from the completely sealed-off, non-flowing experiments is compiled in FIG. 2. With average input powers under about 100 W, discharge efficiencies of 10 to 12% were readily achieved. This is due to the higher than cw small signal gain and saturation properties of the medium generated by pumping the discharge with high peak input powers while lowering the duty cycle of the pulsed input to keep the average input power, and thus the medium temperature, low. Beyond about 280 W average input, however, a discharge efficiency greater than 10% was not achieved even though various combinations of gas pressure (35 to 60 Torr), gas composition (usually the mix was a 1-1-6:$CO_2$—$N_2$—He plus 5% Xe added), output mirror reflectivity and curvature (90 to 95%, near planar), guide widths (2.3 or 2.6 mm) were used. For average input powers from about 280 W to over 715 W, the limit of the RF power amplifier used, the discharge efficiency declined, ultimately reaching 4.5%. In these tests, only air cooling of the OD of the vacuum envelope was used. With this cooling, temperature measurements on the OD of the laser's vacuum envelope revealed that the OD surface temperatures would reach 46° C. in 10 to 15 minutes of operation. For the highest average input power of 715 W in FIG. 2, the size of the discharge chamber was D=15.9 mm by W=2.3 mm, with a discharge length $L_{dis}$=32.6 cm, resulting in a discharge volume of 11.9 cm$^3$ and a discharge cooling area of 51.8 cm$^2$. Under the above conditions, the specific volumetric input power to the discharge was 59.7 W/cm$^3$ and the specific input power on a cooling area basis was 13.8 W/cm$^2$. For these excitation conditions, the specific multimode output power of the laser was 0.64 W/cm$^2$.

Using the embodiment of FIG. 1, the specific output power from the 32.6 cm discharge length was >101 W/m, significantly higher than the 84 W/m maximum that has ever been observed from a nominal room temperature, square bore transversely excited RF discharge laser. On this point, reference may be had to the above-discussed work of Newman and Hart. Therefore, it is clear that area cooling has been unequivocally demonstrated for the first time in any transverse RF excited discharge chamber whose electrode spacing exceeds that of the sidewall spacing, i.e., a discharge chamber having D/W>1. Moreover, compared to prior art lasers as exemplified by the disclosure of U.S. Pat. No 4,755,990, high quality discharges at ratios of D/W of nearly 9 have been observed using a simple two electrode structure without benefit of any sophistication means such as complicated ballasted electrode structures and powerful transverse magnetic fields to keep the discharge stable.

Figure 2:
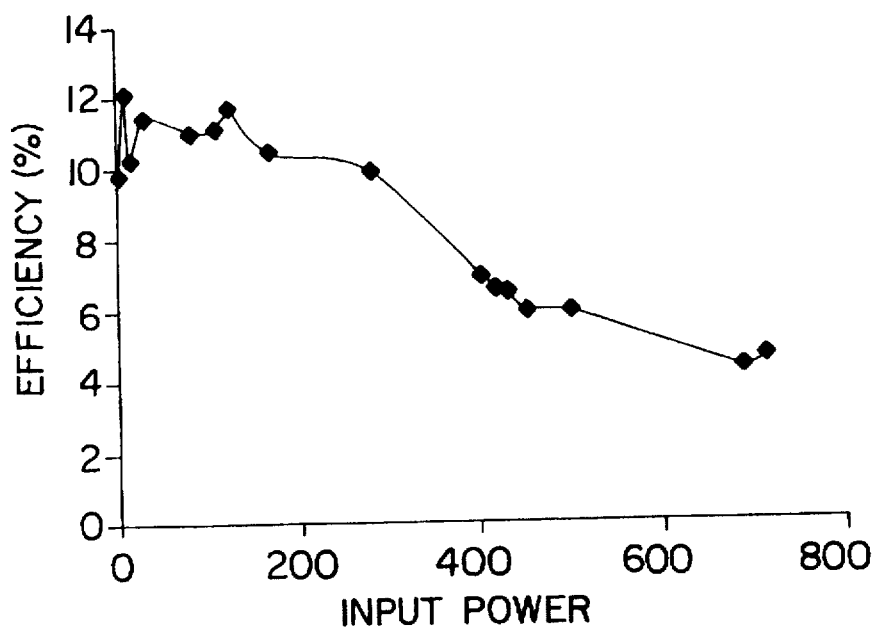
FIG. 2 is a plot of the peak laser output power with various excitation pulse widths of a laser constructed in accordance with the present invention.

Since a dramatic drop in laser discharge efficiency is not observed in the data of FIG. 2, and a gamma discharge could not be generated in the above experiments, the temperature of the medium is suspected as being too high to sustain more efficient laser operation, particularly as the input is increased beyond about 280 W. In a sense, the embodiment of FIG. 1 is thermally saturated with input powers much beyond 250 W. In view of the fact that no water cooling of any kind was used for the laser, and in view of the very poor thermal transmission across the wide, nominal 14.5 mm, space between the outside surfaces of the ceramic sidewall spacers and the interior of the laser's metal vacuum envelope 10, the embodiment of FIG. 1 lacks an effective heat transport means for moderating the temperature of the rectangular cross section discharge region. Furthermore, since the discharge, as viewed when plexiglas endwalls were substituted for cavity mirror mounts, is observed to completely fill the cross-section of the confined discharge chamber, if a gamma discharge were to form it would completely obscure the discharge aperture. This high loss region would, as it does in symmetric RF excited waveguide lasers which have similar sidewall spacings, be fatal to $CO_2$ laser action. That no such abrupt drop in laser output occurs up to average input powers of 715 W indicates that the transition to the high current gamma discharge mode is being suppressed. In the region near the electrodes in the embodiment of the present invention of FIG. 1, the plasma sheaths are cooled by the electrodes themselves and by both ceramic sidewalls. The close proximity of the sidewalls visually appears to alter the shape of the sheath region at high specific input powers and thus appears to provide additional collisional stabilization and cooling that effectively forestalls the transition from the desirable alpha type discharge to the undesirable gamma type discharge. This result was unexpected and is not believed to have been previously observed or published. Compared to the water cooled device described in the above-reference paper of Yatsiv et al, which achieved a 0.4 $W/cm^2$ output power with a 21.4 $W/cm^3$ input, an output power of 0.64 $W/cm^2$ with an input power of 60 $W/cm^3$ is more than competitive, particularly in view of the fact that the 27.12 MHz excitation frequency employed in tests conducted on the embodiment of FIG. 1 is actually lower than that used by Yatsiv et al.

In prior art slab devices, essentially no area cooling is provided by thre side walls. In the discharge geometry of the present invention, because of the side wall cooling, the fD product is completely decoupled from the conventional pD product. For example, stable discharge regions with high volumetric input and output powers can be realized with fW=36.7 mm-MHz; this fW product is lower than the $fD_S$ product of 42 mm-MHz for the sheath region alone in prior art slab lasers. It is thus clear that the close spacing of the sidewalls, within a distance W=few mm, is playing a major role in providing collisional or wall stabilization of the discharge. With a nominal 6.6 mm symmetric discharge chamber, stable discharge operation cannot be maintained with inputs anywhere near the 60 $W/cm^3$ realizable with the rectangular cross-section geometry. Furthermore, with these high specific input levels, pD products in the 800 to 1000 T-mm are readily realized with the rectangular discharge chamber where D/W>>1. These pD products are far higher than those suggested by theory for optimal pumping in prior art slab devices; indeed, prior art would predict an unstable discharge under these conditions. The highest specific inputs of the above-referenced Vitruk et al device were 75 $W/cm^3$ and 22.5 $W/cm^2$ and were achieved with a comparatively mature device technology using water cooled electrodes; devices made in accordance with the teachings and embodiments disclosed herein can be expected to enable specific inputs to the level reported by Vitruk et al and beyond to be achieved.

Since the theory of Vitruk et al cannot be applied with confidence to the geometry of the instant invention because of the independent roles of D and W, and the arrangement of the plasma sheaths, no prior art guidance is available for the use of excitation frequencies that are much lower than 27.12 MHz. For example, with an electrode spacing of D=50 mm, an excitation frequency of 5 MHz would result in an fD product of 250 mm-MHz. Likewise for a sidewall spacing of W=2 mm, a pressure of 60 T would yield a pW product of 120 T-mm. Thus, while a fD and pD of 250 mm-MHz and 120 T-mm would be desirable and near optimal parameters for a conventional W/D=25 slab discharge device, the operating characteristics of such a D/W=25 device are completely unknown. However, based on the unexpected results with 27 MHz excitation, it is believed that the independent nature of the fD, pW products can be exploited to optimize the excitation process in such a low frequency, high aspect ratio D/W device.

Figure 3:
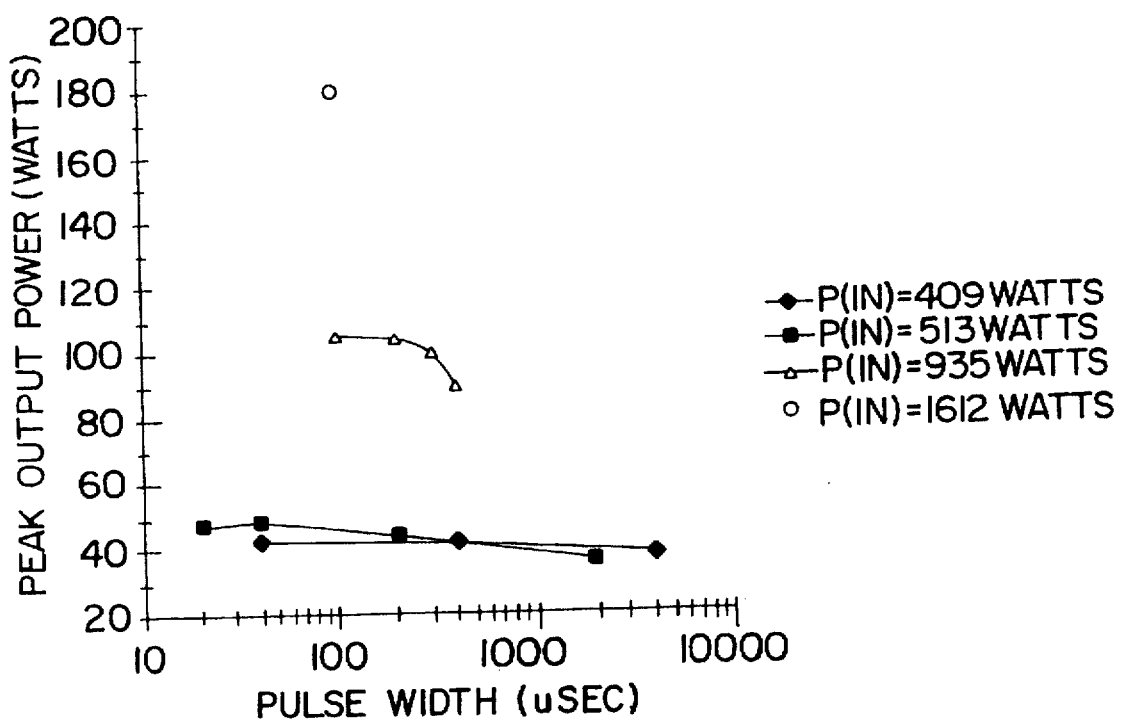
FIG. 3 is a plot of the average laser output power as a function of average RF input power of a laser constructed in accordance with the present invention.

Referring to the data shown in FIG. 3, with high level peak power RF pumping, a rectangular discharge region established in accordance with the embodiment disclosed in FIG. 1 can generally achieve discharge efficiencies of over 10% with discharge pulse widths that range from 20 usec to 4000 usec. For the lowest two curves in FIG. 3, the discharge duty cycle was held constant at 20% and the peak input power to the laser was held constant at 409 and 513 W respectively while the discharge pulse width was increased and the discharge PRF was decreased to maintain a constant duty cycle. As shown with an average input power of 0.2(409)=81.8 W, a conversion efficiency of RF to $CO_2$ light of about 10% held constant while the discharge pulse width was increased by a factor of 100. As one might expect, since 81.8 W is much less than the nominal 275 W thermal saturation level discussed in reference with FIG. 2, the slight drop in laser output indicates that some heating within a given discharge pulse is occurring with long discharge pulse widths. With an average input of 0.2(513)=102.6 W, the trend shown using a 409 W peak input power is only slightly more pronounced. Pulsed laser output with a peak input power of 935 W was measured by holding the PRF constant at 100 Hz and increasing the pulse width from 100 usec to 400 usec, a range of pulse widths that are of interest for a number of medical and dental laser applications. Over this range the discharge efficiency declined somewhat from over 11% to about 10% as the discharge duty cycle increased from 1% to 4%. At this level, the peak specific input and output power was 17.6 $W/cm^2$ and nearly 2 $W/cm^2$ respectively. A further extension of these operating conditions with cw excitation can be realized if the sidewall cooling means is made more effective. The data with peak inputs of 409, 513 and 935 W were taken with discharge pD's of about 715 T-mm, significantly higher than the optimum discussed by Vitruk et al. That highly uniform discharges could be generated with excitation frequency, guidewidth products of <49 mm-MHz underscores the novelty and utility of the present invention. The single data point taken with a peak input power of 1612 W at a PRF of 100 Hz (1% duty cycle) indicates that discharge efficiencies of 11% are achievable with very high level pumping and little effect on output was observed as the PRF was increased to 500 Hz (5% duty). Using a peak input power somewhat under 1600 W, a peak discharge efficiency of 14.4% was observed, while with a somewhat higher input power a peak output of 180 W was achieved at a discharge efficiency of over 10%. This latter data with inputs >1600 W indicates that the rectangular discharge cross-section with an electrode to sidewall ratio of 6.1:1 or 6.9:1 is being very uniformly pumped over the discharge gain length. With D/W ratios of 6.9:1, a specific input of 620 J/LA was realized at a PRF of 500 Hz; much higher than that reported with conventional slab discharge geometries using excitation frequencies in the 150 MHz region. The Fresnel numbers for the data in FIG. 3 were $N_D=15.7$ and $N_W=0.33$ or 0.42 and all outputs were multi-mode stable freespace Gaussian in D and single waveguide mode in W. It is to be noted that the peak input power of about 1800 W was limited not by a gamma discharge but rather a parasitic discharge that occurred from the upper RF electrode in FIG. 1 to the mirror mounts which were spaced only 2 mm from the end of the ceramic sidewall spacers. The highest average output power from the 6.1:1 ratio D/W device realized with a pumping level of 65 J/LA was 56.7 W/m at a PRF of 5000 Hz using 40 usec discharge pulse widths. Therefore, while the pumping level was lower than that of Brown et al referenced above, the PRF achieved was over 8 times higher. Since the 56.7 W/m output of the D/W=6.1 rectangular cross-section discharge device is higher than highest output level of 39.2 W/m ever reported from a symmetric aperture waveguide with high level pulsed excitation, area cooling by the ceramic sidewalls in a device made according to the teachings of this invention is again unequivocally demonstrated with this type of excitation.

It should be noted that the wider separation between the ceramic spacers does not provide the discharge with wall cooling that is as effective as with the narrower discharge, and the trend in going from a symmetric bore to a chamber with an electrode spacing of 15.9 mm and a sidewall spacing 2.3 mm was increased laser output power. It should also be noted that in the FIG. 1 configuration, the ceramic sidewall spacers 16 and 18 do not have any contact with the interior of the laser's metal vacuum envelope 10. Area cooling in the geometry shown in FIG. 1 can easily, as will be discussed below, be vastly improved. Additionally, in the regions between the outside of the ceramic sidewall spacers and the interior to the laser's vacuum envelope, there was observed to be an unwanted or parasitic discharge. Since this discharge region is outside the mode volume of the resonator, the measured laser discharge efficiency is clearly lower than it would be if these discharge regions were filled with a non-conducting material to prevent the formation of these unwanted discharges. Thus, even though the cavity losses are less with the wider discharge and the laser efficiency realized somewhat greater, the maximum input power that can be tolerated with larger W's is lower and therefore the maximum output power is also lower. In part these results were attributable to the subsequent observation that some regions of parasitic discharges were inadvertently being generated.

In summary, the level of discharge efficiency of an area cooled laser in accordance with the invention is at least as good as can be achieved with prior art devices and this comparable volumetric efficiency is obtainable employing a relatively low frequency of discharge excitation and with a much less complicated, and thus less costly, device.

The obtainable output power from an area cooled laser in accordance with the embodiment of the present invention shown in FIG. 1 can be increased by decreasing the distance between the ceramic spacers 16 and 18 to thereby provide a narrower discharge width, by using a laser pressure medium in the range of 50 to 80 Torr, by using a discharge driven gold catalyst on the ceramic walls adjacent to the discharge, by increasing the discharge input power, by providing a high thermal conductivity path between the sidewall spacers which confine the discharge and the metal vacuum envelope, by using 99.5% purity rather than the 94% purity alumina for the sidewall material to improve the thermal conductivity of the sidewalls and lower the discharge temperature, and by increasing both the separation and the length of the discharge electrodes.

Figure 4:
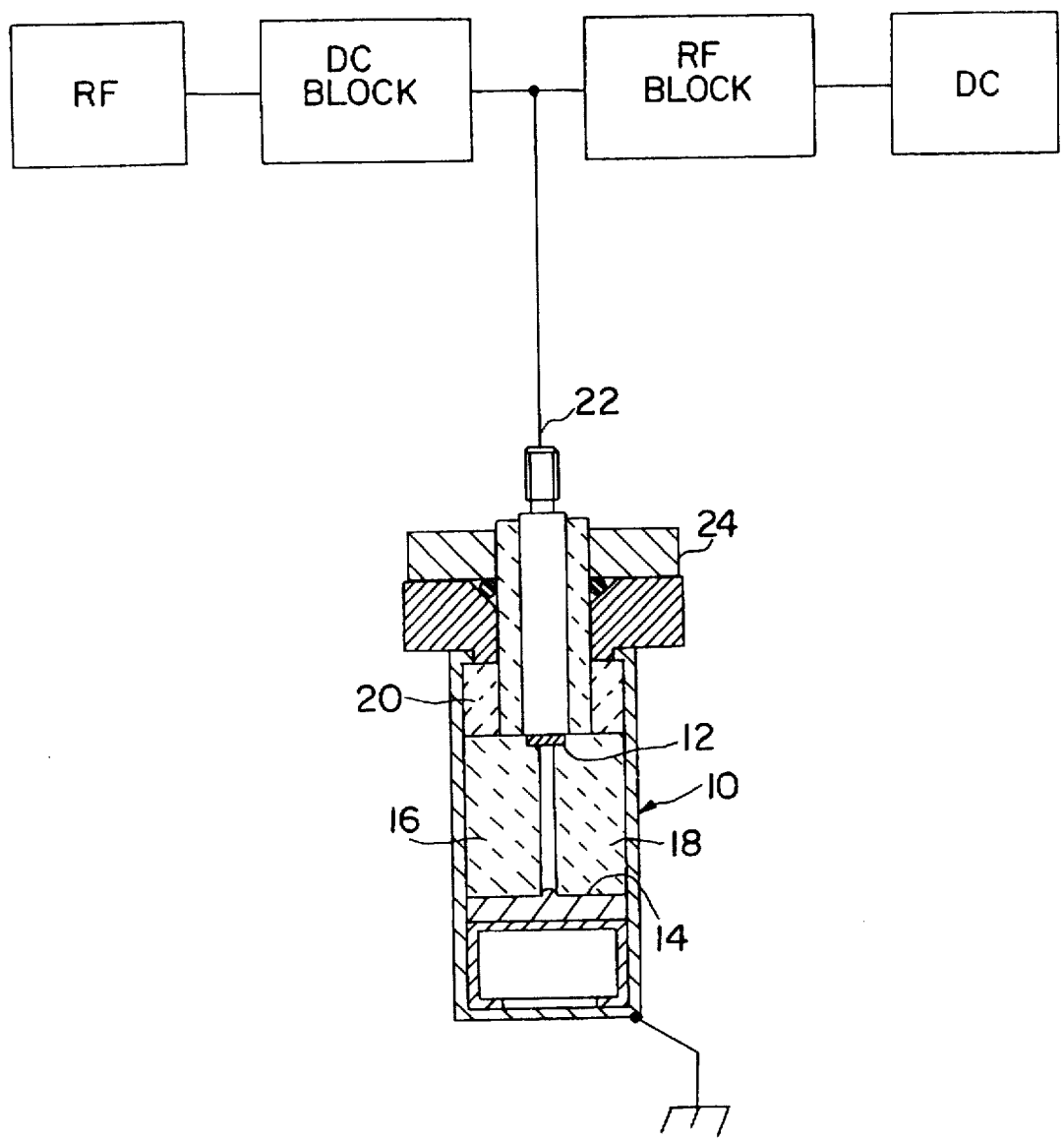
FIG. 4 is a schematic, cross-sectional, end elevation view of a rectangular discharge laser in accordance with a second embodiment of the invention showing a transversely contoured lower electrode, RF-DC excitation and enhanced conduction cooling to a thin wall vacuum envelope.

Referring to FIG. 4, the rectangular cross-section RF discharge having a shorter side and a longer side is established between a pair of ceramic sidewalls 16,18, having a spacing of W, and a pair of electrodes 12,14 whose spacing D is maintained by the sidewalls so that D/W>>1 and W is preferably in the range of 1–4 mm. As before, the discharge electric field is parallel to the waveguiding walls, and the electrodes are deployed to minimize the contribution of wall or area cooling to the discharge by the electrodes. The upper RF electrode is isolated from ground by a third ceramic spacer 20. In this embodiment, the three basic ceramic blocks, i.e., the upper spacer 20 and the two sidewall spacers 16,18 are essentially identical in cross section. The upper piece differs from the two sidewall pieces by virtue of the hole through which the RF feedthru is inserted. The two sidewall pieces are identical to each other but differ from the upper piece by virtue of a small notch in which the low area upper electrode 12 sits. The commonality of the alumina spacers allows volume cost reduction for the ceramic pieces to be achieved with relatively low laser production volumes. The outside vacuum envelope 10 of the embodiment shown in FIG. 4 is made from commonly available, oxygen free, high conductivity (OFHC) WR 187 copper microwave waveguide having an outside dimension of 1.00" by 2.00" with a wall thickness of 0.065". This type of vacuum envelope is relatively inexpensive and is readily torch or oven brazed to stainless steel end flanges from which, or to which, cavity mirror mounts for various types of optical resonators can be affixed. When a device made according to the embodiment of FIG. 4 is evacuated the thin copper waveguide wall will deflect slightly (about 0.010") and thereby force a low thermal loss contact between the sidewall spacers 16,18 and the vacuum envelope 10 itself. As is known to those skilled in the art, care must be taken to not completely lose the temper in the copper if oven brazing is used. A detailed helium leak check of the structure disclosed in FIG. 4 reveals that integrated helium leak rates of less than $5 \times 10^{-10}$ atmospheric $cm^3$/sec are realizable, sufficient to assure laser lifetimes of years or longer if gas catalysis is used to prevent the disassociation of $CO_2$ in the discharge.

In the embodiment shown in FIG. 4, the WR 187 waveguide can easily accommodate an electrode separation of 19 mm if the three ceramic pieces are made with nearly identical cross sections. This electrode spacing is appropriate for use with the clear aperture of a 1" diameter cavity mirror. It will be appreciated by those skilled in the art that the discharge can be maintained at a relatively low temperature using commonly available 99.5% density $Al_2O_3$ ceramic sidewalls. Using the known thermal conductivity of 0.995 alumina as 0.36 [$W/cm^2$][°C./cm], one can readily determine that a thermal rise of only 11.9° C. across the alumina sidewall will accompany a power transmission of 4.5 W/cm² of discharge cooling area. The value of 4.5 W/cm² of discharge cooling area represents a total input power to the discharge of 10 W/cm², which for a discharge efficiency of only 10%, corresponds to a laser output power of 1 W/cm². Using the new MOSFET RF source technology described by Dierberger et al, "Low Cost 1000 W. 300 Volt RF Power Amplifier for 13.56 MHz", Advanced Power Technology, RF Design, August 1995, pp46–52, the cost of a complete kW average power output RF source, including the cost of the 300 V dc power source, is expected to cost less than $500, i.e., less than 0.5 $/W. The typical 1995 cost of prior art slab $CO_2$ lasers is 275 $/W and the cost of the 82 MHz RF source is 5$/W. Thus, the comparative economies enjoyed by a simple RF excited, area cooled $CO_2$ laser made in accordance with the instant invention are obvious.

With respect to the embodiment shown in FIG. 4, it will be appreciated by those skilled in the art of multiple parallel RF excited symmetric waveguide $CO_2$ laser oscillators and amplifiers, that a number of discharge apertures such as that of FIG. 4 may be advantageously placed electrically in parallel. For example, if twenty-five (25) regions with w=2.5 mm, D=2.5 cm, each 25 cm long were separated by ceramic sidewalls 7.5 mm in width by 2.5 cm high by about 25 cm in length, a very compact area cooled device with twenty-five (25) discharge regions each having D/W=10 could be made. The total cooling area enjoyed by these discharges would be 1562.5 cm². As the regions are placed side by side, the entire twenty-five (25) regions of rectangular cross-section discharge could be readily energized from a single elevated RF potential electrode with a nominal size of 25 cm by 25 cm and the whole laser device could be appropriately housed in a vacuum envelope not much larger than about 3" by 12" by 12" (7.6 cm by 30 cm by 30 cm). As will be recognized by those skilled in folding optical cavities, the fold mirrors at either ends of the individual 25 cm long lengths of discharge could be made in the form of corner reflectors optically connecting adjacent 2.5 mm wide by 2.5 cm high discharge regions to form an equivalent discharge region that is 2.5 mm wide by 2.5 cm high by 625 cm long, having a Fresnel number $N_D$ of somewhat less than 2.4. Thus, even though the ratio of D/W is recognized to be 10.1, the Fresnel number of such a device would not be large because of the long length of medium. Configured as a $CO_2$ laser oscillator with a freespace Gaussian cavity in D and a waveguide cavity in W, such a device could have the potential for being very energetic and compact. For example, with a specific output of even 0.5 W/cm² of discharge cooling area, a total output in the 750 W range might be expected for an input power of 5000 W. A preliminary estimation of the discharge impedance with a total 13.56 MHz input power of 5000 W at a pressure of 40 T would be about 145 Ohms. The combined cost of the dc and RF portions of the 13.56 MHz RF supply would be in the range of $1500. Such a device could also be configured as a laser power amplifier with gain length of 625 cm. In such an amplifier configuration, the small signal gain could be substantially saturated with a $CO_2$ optical input in the range of 50 W to produce an output in the 350 W range, ideal for applications where high laser output power and line tunability are required. It should be appreciated by those skilled in the art of high power $CO_2$ lasers that while such a compact laser structure will require cooling from a liquid to air heat exchanger system, such compact high power, line tunable $CO_2$ laser amplifier would not be possible using prior art slab technology.

Figure 5:
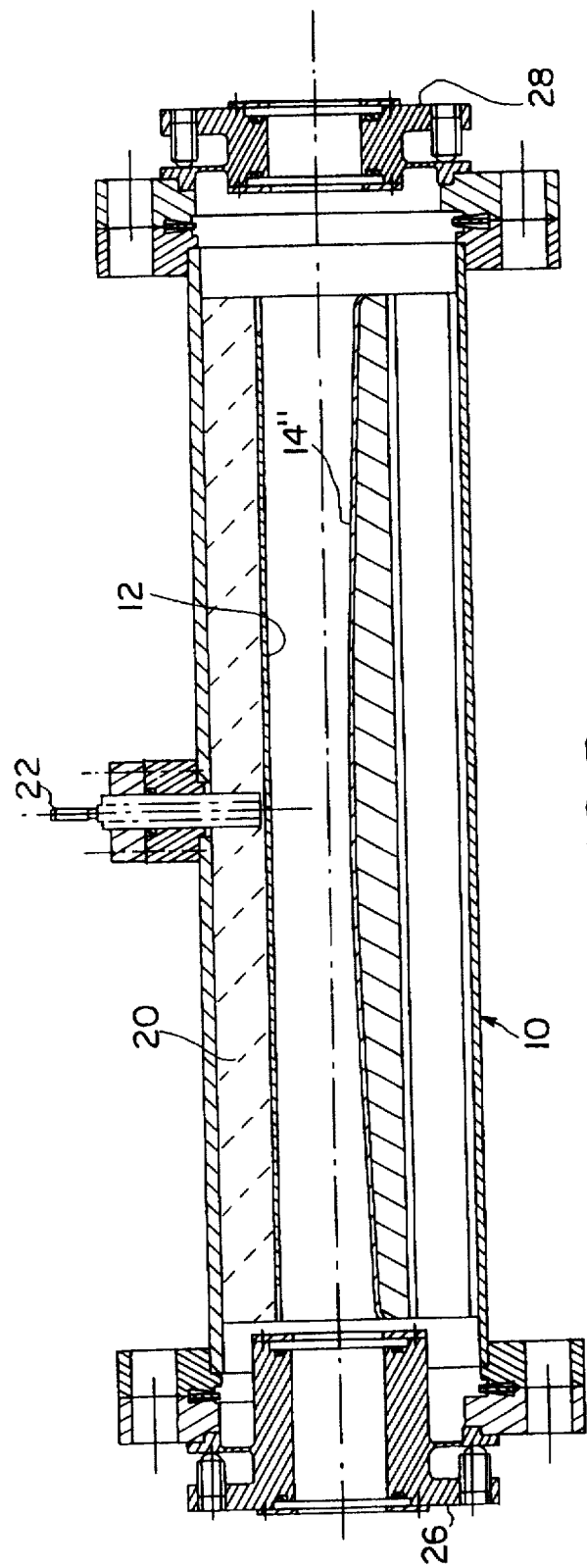
FIG. 5 is a cross-sectional, side view, taken transverse to FIG. 4 of the rectangular discharge laser shown in FIG. 4, FIG. 5 schematically showing the cavity mirrors and an exaggerated longitudinally contoured lower electrode.
Figure 6:
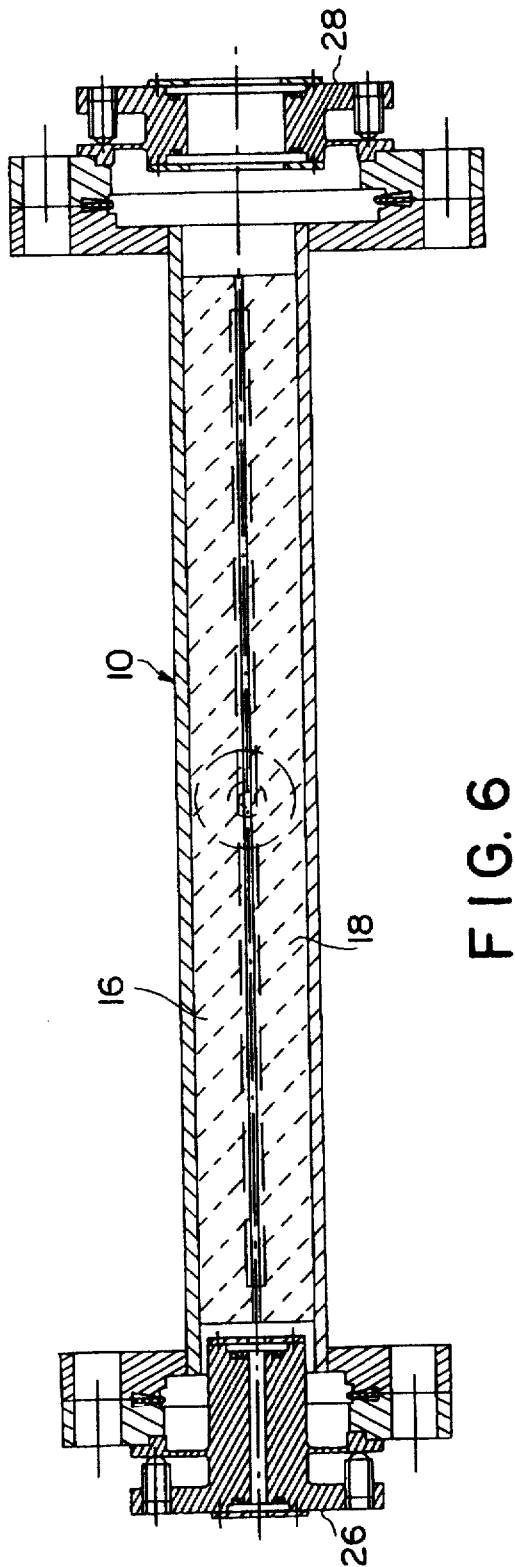
FIG. 6 is a top longitudinal sectional view of the rectangular discharge laser of FIGS. 4 and 5 schematically illustrating the use of a rectangular shaped cavity mirror.

Referring to FIGS. 5 and 6, which depict various views of the FIG. 4 embodiment, a number of features not attainable using prior art slab technology are seen. For example, 1–3 mm guided wave structures and 13.56 MHz excitation are seen to be compatible with fD products of 258 mm-MHz and, based on experiments with the embodiment of FIG. 1 at 27 Mhz, the thickness of the plasma sheaths are not expected be so great as to result in a low discharge efficiency. With the electrodes and spacers shown in FIG. 4, an electrode structure capacitance of 50 pF has been measured. Based on this measurement of electrode capacitance, the capacitance of a discharge region with 175 cm² of cooling area made with a 3.5 cm electrode spacing in a 50 cm long WR-187 microwave waveguide body would be about 70 pF as compared to 400 pF for the comparably large slab device discussed by Lapucci et al as referenced above. The sheath capacitance in a 50 cm long version of the FIG. 4 embodiment, computationally adjusted for the much lower electrode area and lower frequency, is very small. Accordingly, little accommodation for an increase in laser circuit capacitance due to the creation of discharge sheaths has to be made through use of a matching network (not shown) for the embodiment of FIG. 4. With the improvements in heat removal provided by the embodiment of FIGS. 4 to 6, forced air convective cooling of the copper laser body is an effective and inexpensive cooling means, thereby eliminating the need for a liquid to air heat exchanger, typically required when prior art slab technology is employed. It will be appreciated that the interior ceramic pieces 16, 18 and 20 also serve to act as a low thermal expansion "backbone" to keep the cavity resonator aligned when the laser is energized and begins to heat up. Also, it will be appreciated that the low discharge capacitance, combined with use of 13.56 MHz excitation, permits operation without the numerous shunt resonating inductors required by prior art slab devices. Indeed, use of a longitudinally contoured lower electrode 14", best seen from FIG. 5, permits the length of the laser discharge to be further increased without need for shunt inductors. It should be further appreciated that the discharge chamber may be made to have a trapezoidal cross-section, if desired. It should also be appreciated that the mirror mounts 26,28 and mirror mount locations, as shown in FIGS. 5 and 6, accommodate all combinations of Case I, II, or III one dimensional waveguide cavities, defined in the sidewall spacing W, with either unstable or stable freespace Gaussian resonators, defined in the electrode spacing D.

Figure 7:
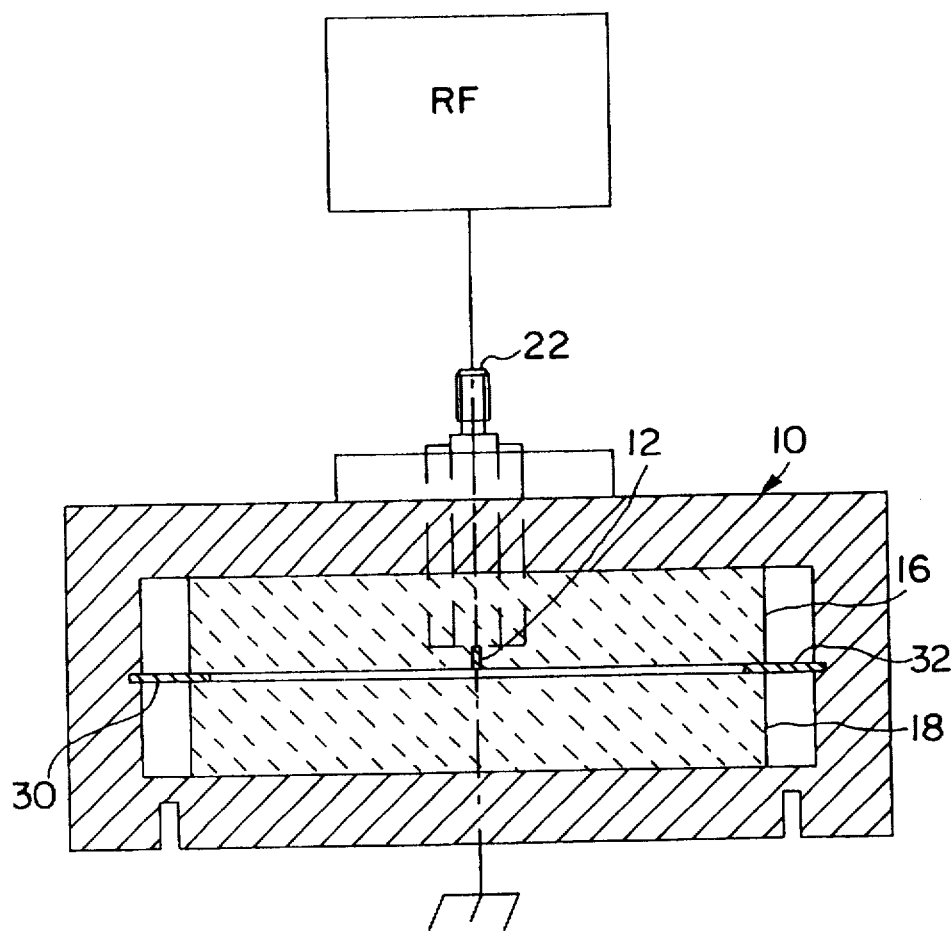
FIG. 7 is a schematic, cross-sectional end elevation view of a rectangular discharge laser in accordance with a third embodiment of the invention incorporating a split discharge, a vacuum flexing slot, enhanced conduction cooling to a thick wall vacuum envelope and the use of RF only excitation.

Referring to FIG. 7, the salient features of an embodiment of the present invention using an electrode arrangement for producing a split RF discharge laser is shown. The discharge so generated is rectangular in cross section and has a longer and a shorter side. As before, the shorter side of the discharge is determined by the spacing of a pair of sidewalls, whose spacing W is preferably is in the range of 1 to 4 mm, that maintain the spacing D between electrodes 12, 30 and 32, wherein D>>W. The longer side of the rectangular cross section discharge is mutually perpendicular to the sidewall spacing W and the cavity optical axis, but parallel to the discharge electric field. The ceramic sidewall spacers 16, 18 serve as both the large area discharge cooling means and as the means by which the intracavity waveguide mode is supported. The cavity mode is preferably waveguide in dimension W and either stable freespace Gaussian or unstable in the dimension nD where n is the number of transverse discharge segments. As can be appreciated, this type of arrangement incorporates improvements related to low thermal loss contact between the ceramic sidewalls 16, 18 and the thick wall vacuum envelope 10 as well as the use of low capacitance strip electrodes 12, 30 and 32. Numerous means by which the pair of grounded electrodes 30, 32 may be connected to the interior of the vacuum envelope 10 will be obvious to those skilled in the art and are not shown. However, it should be pointed out that the grounded electrodes could be made by coating a sub-millimeter thickness of metal on a ceramic substrate to effectively act as a ballast means which would limit the current flow in a given region by the RF skin effect, which is appreciated by those so skilled as being inversely proportional to the square root of the RF frequency. As can also be appreciated, the ceramic sidewall spacers 16, 18 can be inserted into the vacuum envelope via the ends of the envelope, before the mirrors are affixed to either end of the laser body. The details of how the mirror mounts can be sealed to the laser body with o-ring grooves that are suitable for sealing by compressing an indium wire are well appreciated and known to those skilled in the art of sealed-off gas lasers with metal vacuum envelopes. Once the intravacuum pieces are inserted into the metal body, the metal web created by machining a deep continuous groove or moat into the exterior of the vacuum envelope will be able to flex when the laser is evacuated and the resulting force provided by atmospheric pressure will both keep the intravacuum elements firmly in place and also ensure a low thermal loss contact between the ceramic sidewalls and the metal envelope wall. For a sufficiently large interelectrode spacing D, AM broadcast type RF amplifier technology could be employed to energize lasers made in accordance to the teachings herein. As will be appreciated by those skilled in the art of RF discharge technology, the time required for a plasma instability to build up can be in the microsecond range for the pressures, gas mixtures and sidewall spacings of interest for area cooled $CO_2$ lasers. Accordingly, 1.5 MHz sources, having a cycle reversal time of about 300 nsec, could represent a RF source technology than can be readily adapted for use in high power lasers. It should also be appreciated that the embodiment of FIG. 7 has only two, essentially identical, intra-vacuum elements interior to the vacuum envelope that have any meaningful cost impact on the laser device. Based on the previous discussions of plasma sheaths, it should be appreciated by those skilled in the art of transverse RF discharge devices that the central RF electrode 12 in the split discharge embodiment of FIG. 7 can be made to be recessed into the surface of one ceramic sidewall by 1 mm to 2 mm. By recessing electrode 12, the plasma sheath region can be removed from the active resonator volume to thereby effect an improvement in the intracavity circulating flux in this region.

Figure 8:
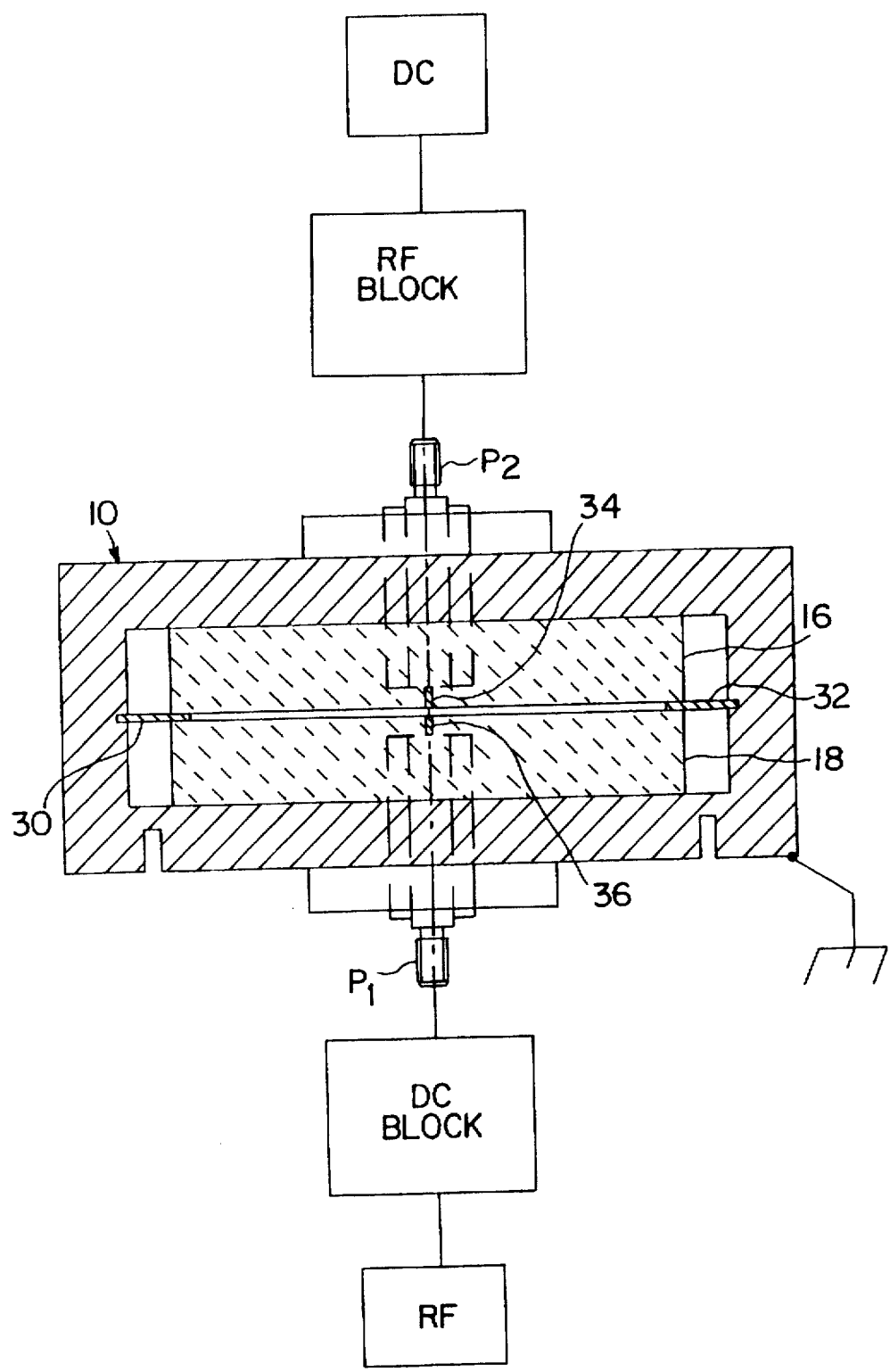
FIG. 8 is a schematic, cross-sectional end elevation view of a rectangular discharge laser in accordance a fourth embodiment of the invention showing the use of RF-DC excitation.

Turning to FIG. 8, there is illustrated schematically the application of a dc power or energy source to augment the operation of a singly split RF discharge embodiment similar to that of FIG. 7. In the FIG. 8 embodiment, the ceramic spacers 16, 18 that confine the discharge therebetween, and act as waveguiding surfaces, are identical and have a spacing therebetween of W in which electrodes of spacing D>>W are held. If an energy storage capacitor, charged to a potential lower in value than that necessary to cause dc breakdown of the laser gas, is preconnected to the central dc electrode 34, then, as taught by U.S. Pat. No 5,097,472 in relation to the excitation scheme in FIG. 4 hereof, this energy will be commuted into the RF discharge upon the initiation of the RF discharge by application of RF power to electrode 36. In the embodiment of FIG. 8, accordingly, RF at a power level $P_1$ can be coapplied with dc at one central electrode while non-simultaneously RF at another power level $P_2$ can be applied at the other central electrode 36. As will be recognized by those skilled in the art of lasers with pulsed RF discharges, the embodiment of FIG. 8 permits the medium to be pumped at three widely different power levels (and pulsewidths) from only two separate power input ports, i.e., $P_1$, $P_2$ and $P_2$+dc. This type of excitation arrangement eliminates the necessity of dynamically adjusting the matching network to accommodate the three different RF power levels which, if not done correctly, can result in injury to the RF source by RF power reflected from the discharge. Dynamic impedance matching to the discharge impedance with widely different input powers has previously been recognized by those skilled in the art of transverse RF excited $CO_2$ lasers to be very difficult to accomplish.

Figure 9:
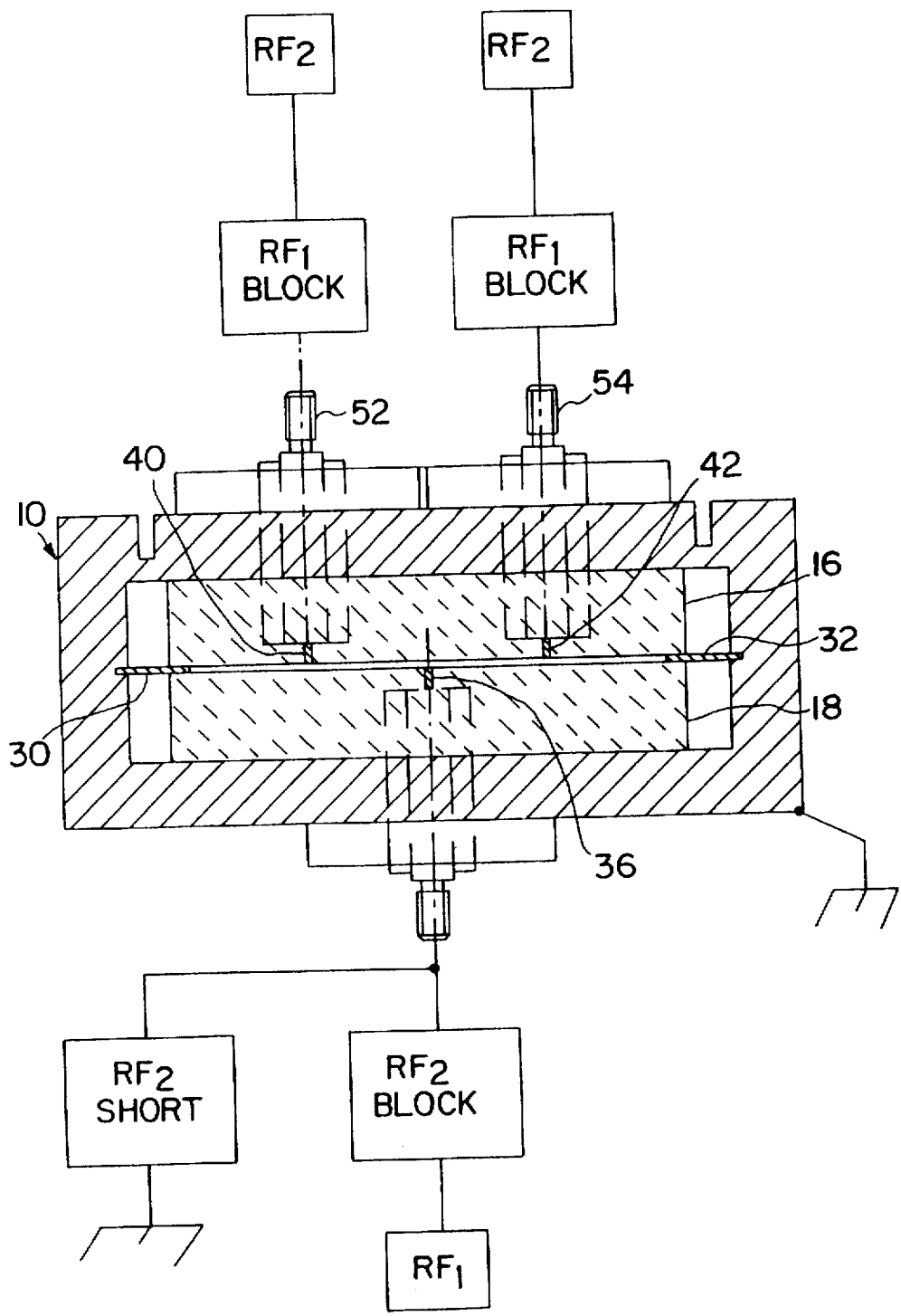
FIG. 9 is a schematic, cross-sectional elevation view of a rectangular discharge laser in accordance with a fifth embodiment of a laser showing schematically the use of RF excitation at two different frequencies

A doubly split discharge implementation of the embodiment of FIG. 8 is shown in FIG. 9. As previously taught the ceramic spacers are separated by a distance W and the electrodes equally spaced by distance D wherein D>>W. In this embodiment, there is illustrated schematically RF excitation at two separate RF frequencies, $RF_1$ and $RF_2$, whose power levels may be different. Prior experiments with two electrode RF devices wherein dc is used to augment RF laser operation, as taught in U.S. Pat. No 5,097,472, reveals that the addition of dc to an RF discharge will cause the plasma sheath region adjacent to one RF electrode to contract while the sheath region at the opposing electrode will be elongated. A reversal of dc polarity causes the formerly contracted sheath region to be elongated and the formerly elongated region to be contracted. With 27 MHz excitation, the apparent induced elongation and contraction of the sheath thickness due to the coapplication of dc, based on discharge luminosity near the electrodes, is less than 100%. From these observations, it will be appreciated that while the plasma sheath thickness in a self-sustained RF discharge may be inversely proportional to the excitation frequency, the addition of RF at a separate second lower frequency to a discharge already initiated and maintained by an RF source at a first higher frequency will not necessarily cause the plasma sheath thickness in the coexcited RF discharge to increase inversely with the frequency of the second discharge source. Thus, in FIG. 9, RF at a higher frequency $RF_2$ may be used to initiate a first series of discharges between electrodes 40 and 30, 40 and 36, 42 and 32, and 42 and 36. A second source of power $RF_2$ supplies additional power to all the discharge segments via a centrally positioned lower electrode 36. Alternatively, RF at one frequency $F_2$ may be used to initiate a pair of discharges in the two outer discharge segments, i.e., between electrode pairs 30, 40 and 32, 42 and RF at another frequency $F_1$ will be used to initiate the two inner discharge segments, i.e., between electrode pairs 36,40 and 36,42. A further variation of a multi-frequency excitation scheme could employ 3 separate RF excitation frequencies to energize separate transverse sections to obtain aperture diversity and to scan the laser output.

Figure 10:
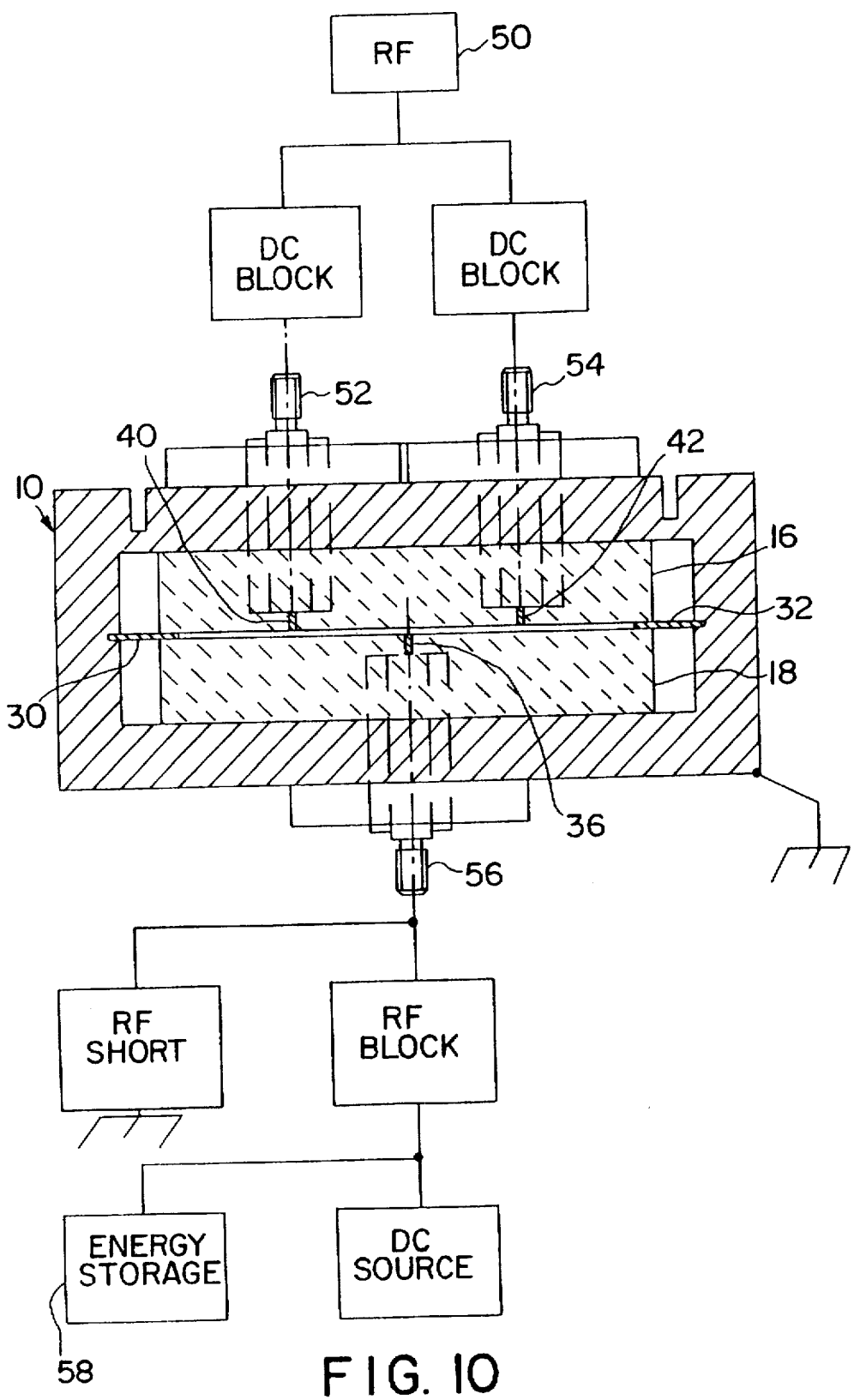
FIG. 10 is a schematic, cross-sectional end elevation view of a rectangular discharge laser in accordance with the fifth embodiment of a laser showing schematically the use of RF-DC excitation.

Referring to FIG. 10, the embodiment of FIG. 9 is shown adapted for RF-DC operation. In this embodiment, RF from a single source 50 is applied to the two upper vacuum feedthru connectors 52,54 to initiate all four discharge segments. Upon initiation, the dc preapplied through the lower vacuum power connector 56 will flow into each of the two discharge segments from the energy storage means 58 (i.e., a capacitor) to ground. As can be appreciated, this configuration uses the highest dc voltage to pulse excite the medium while at the same time RF is used to effectively energize four RF discharges operating electrically in parallel. Use of a relatively high dc voltage across a split discharge pair of widely separated electrodes 36,30 and 36,32 favors use of a relatively low value of storage capacitance for a given stored energy, and this in turn favors a faster discharge pulse and higher peak laser output. It will be appreciated that if addition of dc to rectangular cross section RF slab discharges of the prior art is desired, the level of dc that can be accommodated before one of the plasma sheaths is unavoidably contracted and causes discharge instability will be very limited. Furthermore, for a given energy storage, the capacitance required will be relatively large and thus not favor a fast discharge pulse. It will also be appreciated by those skilled in the art of transverse RF excited $CO_2$ lasers that the electrode separation and the number of discharge segments can be used to tailor the composite discharge impedance in a laser made in accordance the present embodiment to a level which is optimum for certain types of matching circuits by means of employing broadband toroidal RF transformers. In this regard, it will be appreciated by those skilled in the art of RF discharges that the function of an RF short circuit connected between ground and the dc input port is to RF ground the dc port. Such an RF short circuit may be comprised of a series LC circuit which is resonant at the RF excitation frequency.

Figure 11:
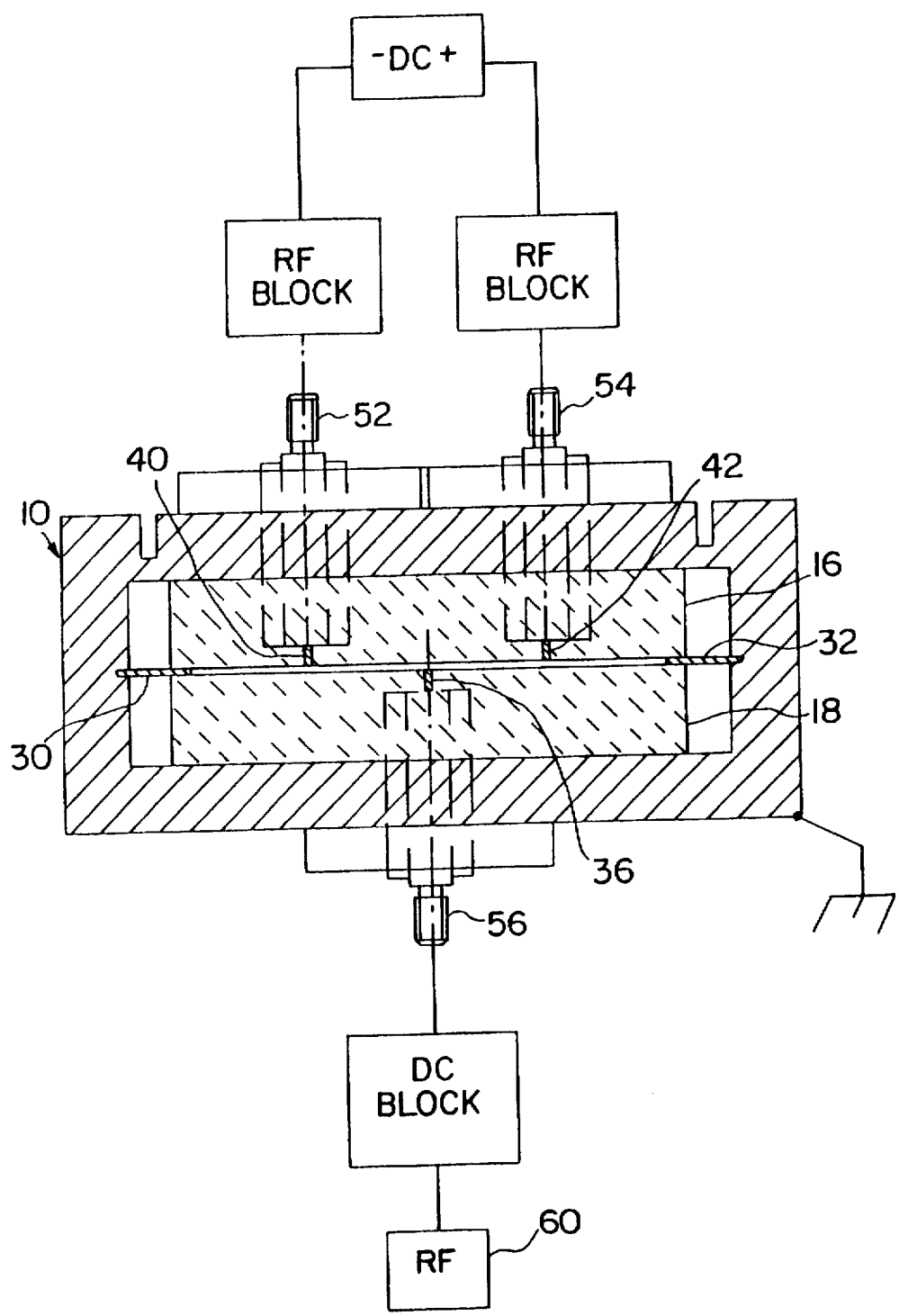
FIG. 11 is a schematic, cross-sectional end elevation view of a rectangular discharge laser in accordance with the fifth embodiment of a laser showing schematically another means of RF-DC excitation.

Referring to FIG. 11, the embodiment of FIG. 9 is shown adapted for DC augmented operation wherein a repetitively pulsed RF power source 60 is applied to the single central electrode 36 to initiate two long discharges that couple to the entire aperture of laser defined between the two outer grounded electrodes 30,32. At a selected and predetermined time between RF pulses, a preconnected energy storage capacitor can be command charged to a desired voltage so that dc is commuted only into a single central discharge that couples to the center of the laser aperture i.e., between electrodes 40 and 42. Such an aperture diversity scheme would be usefully applied to a laser wherein the divergence of the laser is desired to be changed without changing the angular pointing of the laser.

It will be appreciated that the multiple electrode schemes as embodied in FIGS. 9, 10 or 11 can be used to generate a medium that couples only to part of the total resonator aperture and may be employed to vary the laser's output power, vary the laser's output Fresnel number, vary the laser's output divergence, or scan the output of the laser in angle. It will also be recognized that such multiplexing schemes may also be used to avoid the power losses associated with RF power combining circuits.

Figure 12:
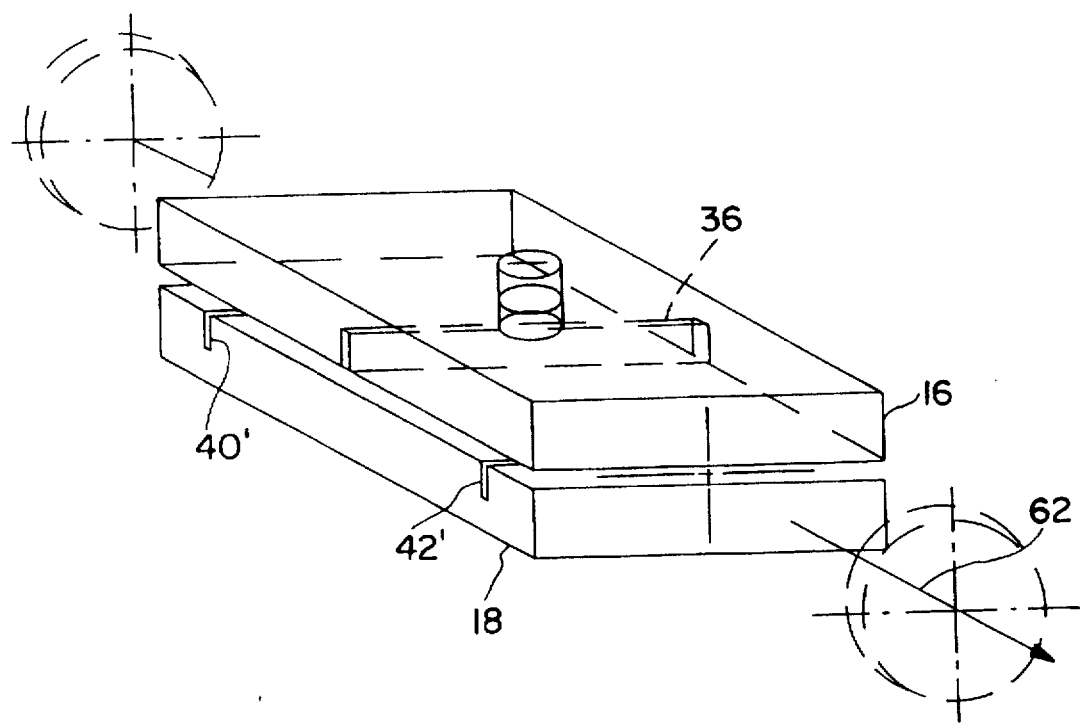
FIG. 12 is a schematic, fragmentary perspective view of a rectangular discharge laser, without the thermally and electrically conductive vacuum envelope, in accordance with a sixth embodiment of the invention, the embodiment of FIG. 12 incorporating a split discharge arranged for longitudinal rectangular cross-section RF excitation.

A configuration for generating a rectangular cross-section discharge is illustrated in FIG. 12 without a metal vacuum envelope and with the two outer electrodes 40, 42 not being connected to ground. In this embodiment, the optical axis 62 of the cavity is shown schematically as running perpendicular to, rather than parallel to, the thin electrodes as shown in the embodiments of FIGS. 7–11. In this embodiment, a discharge with a rectangular cross-section transverse to the cavity optical axis is generated, said discharge having a shorter and a longer side. The shorter side of said discharge is denoted by W is preferably in the range of 1 to 4 mm and defined by the spacing of the ceramic sidewall spacers which serve both as the walls of the optical waveguide structure and also as the means by which the discharge is area cooled. The spacing D between the electrodes 36,40' and 36,42' are equal and are maintained by the ceramic sidewall spacers such that D>>W. This configuration, like all the above-described embodiments, generates a discharge electric field that is parallel to the sidewalls. The longer side of the said rectangular cross-section discharge, mutually perpendicular to said shorter discharge side and the axis of the optical cavity, is determined substantially by the length of the electrodes and would have a dimension suitable to support either a stable freespace Gaussian mode or an unstable resonator mode in this dimension. In accordance with the teachings herein, the discharge generated by energizing the central electrode 36 and grounding the two outer electrodes 40,42 would be confined between the ceramic sidewalls and be established between electrodes of spacing D and thus a discharge electric field parallel to the sidewalls would be generated.

To those skilled in the art of transverse RF excited gas lasers, the laser embodiment of FIG. 12 has a longitudinal optical axis with a discharge space excited by a RF Electric field, said discharge space having a cross-section to which the longitudinal optical axis is perpendicular. The said discharge space comprising a pair of spaced apart non-conductive sidewalls having the discharge electric field established substantially parallel to said non-conductive sidewalls, said discharge space having a cross-section characterized by an average shorter dimension and an average longer dimension which is transverse to said shorter dimension. In addition, the shorter dimension, being between the said sidewalls and the said longer dimension being in a direction parallel to the transverse axis of either an unstable resonator mode or a transverse axis of a Gaussian freespace resonator mode. The shorter dimension is further described as being in a direction parallel to a transverse axis of a waveguide mode or a freespace Gaussian mode. Accordingly, the types of resonators preferred for the rectangular cross-section discharge space taught herein, designated first in the longer cross-section dimension and second in the shorter cross-section dimension are: unstable, waveguide; unstable, freespace Gaussian; freespace Gaussian, waveguide; and freespace Gaussian, freespace Gaussian.

It will also be recognized by those skilled in the art that the discharge region of the embodiment of FIG. 12 can be made to appear substantially identical to the embodiments of FIGS. 7–11 by fixing the optical axis of the resonator and rotating the discharge structure 90° about an axis passing perpendicular to the waveguiding surfaces that area cool the discharge. It will also be appreciated by those skilled in the art of rectangular cross-section discharges and waveguide-unstable or waveguide-stable resonator geometries that both the intracavity mode and the output mode of these two preferred resonator types will pass through 100% of the plasma sheath regions formed near the low area electrodes. However, at the same time it will also be appreciated by those so skilled that the total volume of the plasma sheaths through which the circulating flux of the cavity passes can be made very small by a judicious choice of the RF excitation frequency if an area cooled laser is made in accordance with the embodiment of FIG. 12. It will also be appreciated that the geometry of the FIG. 12 device will enjoy the benefits derived from decoupling the fD, pD product relationship of the prior art slab discharge devices. It will be additionally appreciated that another advantage offered by the geometry of FIG. 12 is that the distance between the typically grounded cavity mirror mounts and the elevated potential RF electrode can be maximized.

In contradistinction to the embodiments herein disclosed, it will be appreciated there is no axis about which the prior art RF excited slab discharge geometries can be rotated analytically or experimentally that can generate a representation of a discharge region that models or preserves the unique features of the rectangular cross-section discharge regions made in accordance with the present invention.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An RF excited gas laser having an optical axis, said laser comprising:
   at least first and second spacially displaced electrodes;
   a pair of spacially displaced nonconductive spacers, said spacers in part defining an elongated gaseous discharge region having a generally rectangular cross-section, said discharge region cross-section being perpendicular to said optical axis and being characterized by an average longer dimension and an average shorter dimension which is transverse to said longer dimension, the longer dimension being measured between the most widely spaced of said electrodes and the shorter dimension being between said spacers, the shorter dimension being sufficiently small to insure a rate of heat transfer from the discharge region to said spacers which will maintain a stable discharge;
   a laser gas mixture at a pressure p disposed in said discharge region; and
   means for applying RF power at an excitation frequency f to at least a first one of said electrodes to thereby establish an excitation electric field which is oriented generally transversely with respect to said shorter dimension whereby a plasma is created in said discharge region.

2. The laser of claim 1 wherein said longer dimension defines a discharge aperture dimension for laser light having a Fresnel number greater than unity.

3. The laser of claim 2 further comprising:
   a vacuum envelope, said electrodes and said spacers being disposed in said envelope.

4. The laser of claim 3 further comprising:
   a mirror disposed adjacent to each end of said discharge region, said mirrors defining the optical axis of the laser.

5. The laser of claim 4 wherein the surfaces of said spacers which define walls of said discharge region are parallel whereby said wall surfaces guide intracavity laser light.

6. The laser of claim 5 further comprising:
   heat sink means in abutting contact with surfaces of said spacers which are disposed oppositely with respect to said discharge region defining wall surfaces.

7. The laser of claim 1, wherein said electrodes are continuous and wherein said longer dimension is substantially independent of pressure p.

8. The laser of claim 7, wherein said longer dimension is commensurate with frequency f.

9. The laser of claim 1, wherein said longer dimension is commensurate with frequency f.

10. An RF excited gas laser comprising:
    first and second spacially displaced electrodes;
    a pair of spacially displaced non-conductive spacers, said spacers in part defining an elongated gas discharge region having an optical axis and a predetermined cross-section, said discharge region cross-section being characterized by an average longer dimension and an average shorter dimension which is transverse to said longer dimension, said longer dimension being measured between said electrodes, said shorter dimension forming a light guide between said spacers, said shorter dimension being sufficiently small to achieve a rate of transfer of heat from the discharge region to the spacers whereby said spacers will area cool a plasma discharge established in said discharge region to thereby maintain a stable laser discharge;
    a laser gas at a pressure p disposed in said discharge region; and
    means for establishing an alternating electric field at a frequency f in said discharge region to establish a laser-exciting plasma discharge in said laser gas, said field establishing means supplying RF power to at least one of said electrodes.

11. The laser of claim 10 wherein the ratio of said longer dimension to said shorter dimension is greater than 1.5.

12. The laser of claim 10 wherein said longer dimension defines a discharge aperture dimension for laser light having a Fresnel number greater than unity.

13. The laser of claim 12 further comprising:
    a mirror disposed adjacent each end of said discharge region, said mirrors defining the optical axis of the laser.

14. The laser of claim 13 further comprising:
    a vacuum envelope, said gaseous discharge region and said mirrors being disposed in said envelope.

15. The laser of claim 10 wherein said longer dimension defines a discharge aperture dimension for an unstable resonator mode.

16. The laser of claim 10 wherein said longer dimension is commensurate with the RF excitation frequency f of the laser and is substantially independent of pressure p.

17. The laser of claim 10 wherein the excitation field is oriented generally transversely with respect to said shorter dimension.

18. The laser of claim 17 wherein said excitation frequency f is chosen substantially independently of pressure p.

19. The laser of claim 18 wherein said longer dimension defines a discharge aperture dimension for laser light having a Fresnel number greater than unity.

20. An RF excited gas laser device comprising:
    a pair of spaced apart non-conductive sidewalls, said sidewalls in part defining an elongated gas discharge space having a volume and a longitudinal optical axis, said discharge space having oppositely disposed ends and a generally rectangular cross-section which is perpendicular to said longitudinal axis, said discharge space cross-section being in part defined by said sidewalls and being characterized by an average-shorter dimension and an average longer dimension which is transverse to said shorter dimension, said shorter dimension being between said non-conductive sidewalls and being suitable for guiding laser light, said longer dimension being in a direction parallel to an axis of an unstable resonator mode of operation of said device;
    a laser resonator mirror disposed adjacent each end of said discharge space, said mirrors cooperating to define said longitudinal optical axis;
    a laser gas disposed in said discharge space; and
    means for establishing an electric field in said discharge space to establish a laser-exciting plasma discharge in said laser gas, said field establishing means including a source of RF power having a frequency of at least 10 kHz and at least first and second spaced electrodes, said RF power source being coupled to said electrodes, said field being oriented generally transversely with respect to said shorter dimension, said plasma discharge being characterized by sheath regions at the terminal ends of said field, the fraction of said volume of said discharge space which is occupied by said plasma sheath regions being substantially dependent only on said longer dimension.

21. A laser device according to claim 20 wherein said field establishing means electrodes are elongated.

22. A laser device according to claim 21 wherein said field establishing means further includes at least a third electrode disposed intermediate said first and second electrodes, the spacing between the most distant of said electrodes supporting said unstable resonator operational mode.

23. A laser device according to claim 22 wherein said source of RF power is connected between each adjacent pair of said electrodes to thereby produce a split plasma discharge in said discharge space.

24. A laser device according to claim 23 wherein said field establishing means further includes a second source of electrical power for augmenting said split plasma discharge, said second power source being connected to at least one of said electrodes.

25. A laser device according to claim 20 wherein said field establishing means further comprises:
a second source of electrical power, said second power source being connected between a pair of said electrodes.

26. A laser device according to claim 20 wherein said unstable resonator mode is a negative branch.

27. A laser device according to claim 26 wherein said laser device produces an output beam and wherein said output beam is taken from at least one end of said discharge space cross-section.

28. A laser device according to claim 26 wherein said laser device produces an output beam and wherein said output beam from said laser device will pass through a central area of one of said mirrors.

29. A laser device according to claim 26 wherein one of said mirrors is partially reflecting and wherein an output beam of said laser device will pass through said partially reflecting mirror.

30. A laser device accordingly to claim 20 wherein said unstable resonator is a positive branch.

31. A laser device according to claim 30 wherein said laser device produces an output beam and wherein said output beam is taken from at least one end of said discharge space cross-section.

32. A laser device according to claim 30 wherein said laser device produces an output beam and wherein said output beam from said laser device will pass through a central area of one of said mirrors.

33. A laser device according to claim 30 wherein one of said mirrors is partially reflecting and wherein an output beam of said laser device will pass through said partially reflecting mirror.

34. An RF excited gas laser device comprising:
a pair of spaced apart non-conductive sidewalls, said sidewalls in part defining a gas discharge space having a volume and a longitudinal optical axis, said discharge space having opposite ends and a cross-section which is perpendicular to said longitudinal axis, said discharge space cross-section being in part defined by said sidewalls and being characterized by an average shorter dimension and an average longer dimension which is transverse to said shorter dimension, said shorter dimension being between said non-conductive sidewalls and being suitable for guiding laser light, the surfaces of said sidewalls adjoining said gas discharge space being waveguide surfaces, said shorter dimension being in a direction parallel to a transverse axis of a resonator mode with a Fresnel number less than unity;
a laser resonator mirror disposed adjacent each end of said discharge space, said mirrors cooperating to define said longitudinal optical axis;
a laser gas disposed in said discharge space; and
means for establishing an alternating electric field in said discharge space to establish a laser-exciting plasma discharge in said laser gas, said field establishing means including a source of RF power having a frequency of at least 10 kHz, said plasma discharge having sheath regions at the terminal ends of said field, the fraction of said volume of said discharge space occupied by said plasma sheath regions being substantially dependent only on said longer dimension.

35. An RF excited gas laser device comprising:
at least first and second spaced apart elongated electrodes;
a pair of spaced apart non-conductive sidewalls, said sidewalls at least in part defining an elongated gas discharge space with a cross-section having a generally rectangular shape, said discharge space having opposite ends and a longitudinal optical axis, said discharge space cross-section being perpendicular to said longitudinal optical axis, said discharge space cross-section being characterized by an average shorter dimension and an average longer dimension which is transverse to said shorter dimension, said shorter dimension being between and substantially transverse to said sidewalls and being suitable for guiding laser light, the surfaces of said sidewalls adjoining said discharge space being waveguide surfaces, said longer dimension being parallel to an axis of an unstable resonator mode of operation of said laser device;
a resonator mirror disposed adjacent each end of said discharge region, said mirrors cooperating to define said longitudinal optical axis;
a laser gas disposed in said discharge region; and
means delivering RF power at a frequency of at least 10 kHz to at least one of said elongated electrodes for establishing an alternating electric field in said discharge space to establish a laser-exciting plasma discharge in said discharge space, the excitation electric field being established generally transversely with respect to said shorter dimension.

36. A laser device according to claim 35 wherein said unstable resonator mode is a negative branch.

37. A laser device according to claim 36 wherein the laser device produces an output beam and wherein said output beam is taken from at least one end of said longer side of said discharge space cross-section.

38. The laser according to claim 36 wherein an output beam produced by said laser device passes through a central region of one of said mirrors.

39. A laser device according to claim 36 wherein one of said mirrors is partially reflecting and wherein an output beam of said laser device will pass through said partially reflecting mirror.

40. A laser device accordingly to claim 35 wherein said unstable resonator is a positive branch.

41. A laser device according to claim 40 wherein the laser device produces an output beam and wherein said output beam is taken from at least one end of said discharge space cross-section.

42. A laser device according to claim 40 wherein an output beam produced by said laser device will pass through a central region of of said mirrors.

43. A laser device according to claim 41 wherein one of said mirrors is partially reflecting and wherein an output beam of said laser device will pass through said partially reflecting mirror.

44. An RF excited gas laser device comprising:

at least first and second spaced apart elongated electrodes;

a pair of spaced apart non-conductive sidewalls, said sidewalls combining to in part define therebetween a gas discharge region with a cross-section having a generally rectangular shape, said discharge region having opposite ends and a resonator longitudinal optical axis, said discharge region cross-section being perpendicular to said longitudinal optical axis and being characterized by an average shorter dimension and an average longer dimension which is transverse to said shorter dimension, said shorter dimension being between and generally transverse to said sidewalls and being suitable for guiding laser light, the surfaces of said sidewalls adjoining said discharge region being waveguide surfaces, said sidewalls being spaced to area cool a discharge established in said discharge region, said longer dimension of said discharge region cross-section having a resonator Fresnel number greater than unity;

a resonator mirror disposed adjacent to each end of said discharge region, said mirrors defining said optical axis;

a laser gas disposed in said discharge region; and means applying RF power to at least one of said elongated electrodes for establishing an alternating electric field in said discharge region to establish a laser-exciting plasma discharge, said field being oriented generally transversely with respect to said shorter dimension and having a frequency of at least 10 kHz, the stability of said plasma discharge being maintained by the transfer of heat to said sidewalls whereby said sidewalls accomplish said area cooling.

45. An RF excited gas laser device comprising:

a pair of spaced apart non-conductive sidewalls, said sidewalls in part defining a gas discharge space having opposite ends and a longitudinal optical axis, said discharge space having a cross-section which is perpendicular to said optical longitudinal axis, said discharge space cross-section being characterized by an average shorter dimension and an average longer dimension which is transverse to said shorter dimension, said shorter dimension being between said sidewalls, said shorter dimension being suitable for guiding laser light, the surfaces of said sidewalls adjoining said discharge space being waveguide surfaces, said shorter dimension being sufficiently small to achieve a rate of heat transfer from said discharge space to maintain a stable laser discharge therein by area cooling a plasma discharge established in said discharge space;

a mirror disposed adjacent at least one end of said discharge space, said mirror surface normal being aligned perpendicular to said shorter dimension of said discharge space cross-section;

a laser gas at pressure p disposed in said discharge space, said longer dimension being substantially independent of pressure p; and means establishing an alternating electric field in said discharge space to establish a laser-exciting plasma discharge in said laser gas, said field establishing means supplying RF power at a frequency of at least 10 kHz to said device to establish said field, said field being established generally transverse to said discharge space shorter dimension.

46. The laser device of claim 45 wherein said longer dimension is commensurate with the frequency of said electric field and substantially independent of pressure p.

47. An RF excited gas laser device with a longitudinal optical axis and a discharge space, said discharge space having a cross-section which is generally rectangular and oriented perpendicular to said longitudinal optical axis, said device comprising:

a pair of spaced apart non-conductive sidewalls, said discharge space cross-section in part being defined by said sidewalls and being characterized by an average shorter dimension and an average longer dimension which is transverse to said shorter dimension, said shorter dimension being between said non-conductive sidewalls, said shorter dimension being suitable for guiding laser light, the surfaces of said sidewalls which adjoin said discharge space being waveguide surfaces, said shorter dimension being sufficiently small to achieve a rate of transfer of thermal energy from a plasma discharge created in said discharge space to said sidewalls which will maintain a stable discharge;

a laser resonator mirror disposed adjacent each end of said discharge space;

a laser gas disposed in said discharge space; and means for establishing an alternating electric field having a frequency of at least 10 kHz in said discharge space to establish a laser-exciting plasma discharge in said laser gas, said field establishing means causing said electric field to be established in an even number of segments, said field segments being oriented substantially perpendicular to said shorter dimension of said discharge space cross-section.

48. A laser device according to claim 47 wherein said field establishing means comprises at least three spaced electrodes, said electrodes being elongated and oriented substantially transverse to said shorter side of said discharge space cross-section.

49. A laser device according to claim 48 wherein said field establishing means includes at least two sources of electrical energy, one of said sources providing an RF voltage at a frequency of at least 10 kHz.

50. The gas laser device of claim 47 wherein the excitation frequency of the laser device is chosen substantially independently of the pressure of the laser gas in said discharge space.

51. The laser device of claim 50 wherein said longer dimension is in a direction parallel to an axis of a resonator mode of operation of said device and defines a discharge aperture dimension for laser light having a Fresnel number greater than unity.

52. The laser device of claim 47 wherein said longer dimension is in a direction parallel to an axis of a resonator mode of operation of said device and defines a discharge aperture dimension for laser light having a Fresnel number greater than unity.

53. An RF excited gas laser device comprising:

at least first, second and third spaced apart elongated electrodes;

a pair of spaced apart non-conductive sidewalls, said sidewalls in part defining a gas discharge space having opposite ends and a longitudinal optical axis, said discharge space having a cross-section which is perpendicular to said longitudinal optical axis, said discharge space cross-section being characterized by an average shorter dimension and an average longer dimension, said longer dimension being transverse to said shorter dimension, said shorter dimension being between and substantially transverse to said sidewalls;

a laser resonator mirror disposed adjacent each end of said discharge space, said mirrors cooperating to define said longitudinal optical axis;

a laser gas at pressure p disposed in said discharge space; and means for establishing first and second electric fields in said discharge space to establish a laser-exciting plasma discharge in said laser gas, said fields being established generally transversely with respect to said shorter dimension, said field establishing means including a source of RF power having a frequency of at least 10 kHz and means for supplying RF power from said RF power source to at least one of said electrodes;

whereby said first electric field is an alternating field established between said electrodes with the smallest spacing therebetween and said second electric field is established between said third electrode and at least any other of said electrodes.

54. The gas laser device of claim 53 wherein said shorter dimension is sufficiently small to achieve a rate of transfer of thermal energy from said plasma discharge to said sidewalls to area cool said discharge and thereby maintain a stable plasma discharge.

55. The gas laser device of claim 53 wherein said shorter dimension is suitable for guiding laser light and the surfaces of said sidewalls which adjoin said discharge space are waveguide surfaces.

56. The gas laser device of claim 55 wherein said shorter dimension is sufficiently small to achieve a rate of transfer of thermal energy from said plasma discharge to said sidewalls to area cool said discharge and thereby maintain a stable plasma discharge.

57. The gas laser device of claim 56 wherein said longer dimension is commensurate with the output frequency of said source of RF energy.

58. The gas laser device of claim 57 wherein said longer dimension defines a discharge aperture dimension for laser light having a Fresnel number greater than unity.

59. The gas laser device of claim 53 wherein said longer dimension is in a direction parallel to an axis of a resonator mode of operation of the device.

60. The gas laser device of claim 53 wherein said longer dimension is commensurate with the output frequency of said source of RF energy.

61. A method of generating a generally uniform electric discharge comprising the steps of:

forming a discharge space having a generally rectangular cross-section, said discharge space having a longitudinal axis, said discharge space being bounded on a first pair of opposite sides by non-conductive spacers, the distance between said spacers comprising a first dimension of said discharge space, said discharge space having a second dimension which is transverse to said first dimension, said second dimension being measured between a pair of spaced electrodes, said second dimension being greater than the distance between said spacers, the spacing between said spacers being chosen to obtain sufficient transfer of thermal energy from a plasma established in said discharge space to said spacers to maintain a stable uniform discharge;

confining a gas mixture at a pressure p in said discharge space; and establishing an electric field at a radio frequency f between the electrodes to excite the gas.

62. The method of claim 50 wherein the step of confining the gas includes selecting the average spacing between the electrodes to obtain a Fresnel number of greater than unity.

63. The method of claim 51 wherein the average spacing between the electrodes is selected to be at least 1.5 times the width of the electrodes.

64. The method of claim 50 wherein the surfaces of the spacers which define walls of the chamber are selected to be parallel whereby said walls function to guide intracavity laser light.

65. The method of claim 61 wherein the second dimension is chosen to be commensurate with frequency f and independently of the pressure p.

66. The method of claim 65 wherein the said first dimension is chosen as function of the pressure p.

67. The method of claim 61 wherein the said first dimension is chosen as function of the pressure p.

68. An RF excited gas laser device comprising:

a pair of spaced apart non-conductive sidewalls, said sidewalls in part defining a gas discharge space having opposite ends and a longitudinal optical axis, said discharge space having a generally rectangular cross-section which is perpendicular to said longitudinal axis, said discharge space being characterized by an average shorter dimension and an average longer dimension which is transverse to said shorter dimension, said shorter dimension being between said non-conductive sidewalls and being substantially independent of the excitation frequency, said longer dimension being in a direction parallel to an axis of an unstable resonator mode of operation of said device;

a laser resonator mirror disposed adjacent each end of said discharge space, said mirrors cooperating to define said longitudinal optical axis;

a laser gas disposed in said discharge space; and means for establishing an alternating electric field in said discharge space to establish a laser-exciting plasma discharge in said laser gas, said field establishing means including a source of RF power and at least first and second spaced electrodes, RF power being coupled to at least one of said electrodes from said power source, said excitation field being established generally transversely with respect to said shorter dimension.

69. An RF excited gas laser device comprising:

a pair of spaced apart non-conductive sidewalls, said sidewalls in part defining a gas discharge space having opposite ends and a longitudinal optical axis, said discharge space having a generally rectangular cross-section which is perpendicular to said longitudinal axis, said discharge space cross-section being characterized by an average shorter dimension and an average longer dimension which is transverse to said shorter dimension, said shorter dimension being between said non-conductive sidewalls, said longer dimension being in a direction parallel to an axis of an unstable resonator mode of operation of said device;

a laser resonator mirror disposed adjacent each end of said discharge space, said mirrors cooperating to define said longitudinal optical axis;

a laser gas at pressure p disposed in said discharge space, said pressure p being chosen substantially independently of said longer dimension; and means for establishing an alternating electric field in said discharge space to establish a laser-exciting plasma discharge in said laser gas, said field being established in a direction generally transverse to said shorter dimension, said field establishing means including a source of RF power at an excitation frequency f of at least 10 kHz, said frequency f being chosen substantially independently of pressure p.

70. An RF excited gas laser device comprising:

at least first and second spaced apart elongated electrodes, a pair of spaced apart non-conductive sidewalls, said sidewalls at least in part defining an elongated gas discharge space with a cross-section having a generally rectangular shape, said discharge space having opposite ends and a longitudinal optical axis, said discharge space cross-section being perpendicular to said longitudinal optical axis, said discharge space cross-section being characterized by an average shorter dimension and an average longer dimension which is transverse to said shorter dimension, said shorter dimension being between and substantially transverse to said sidewalls and being substantially independent of the excitation frequency of said laser device, said longer dimension being parallel to an axis of an unstable resonator mode of operation of said laser device;

a resonator mirror disposed adjacent each end of said discharge region, said mirrors defining said optical axis;

a laser gas disposed in said discharge region; and means for establishing an alternating electric field in said discharge space to establish a laser-exciting plasma discharge in said laser gas, said field being oriented in a direction which is generally transverse with respect to said shorter dimension and having a frequency of at least 10 kHz, said field establishing means including a source of RF power and means for coupling power from said source to at least one of said elongated electrodes.

71. An RF excited gas laser device comprising:

at least first and second spaced apart electrodes;

a pair of spaced apart non-conductive sidewalls, said sidewalls in part defining a gas discharge space having opposite ends and a longitudinal optical axis, said discharge space having a cross-section which is perpendicular to said longitudinal axis, said discharge space cross-section having a generally rectangular shape, said discharge space cross-section being characterized by an average shorter dimension and an average longer dimension which is transverse to said shorter dimension, said shorter dimension being between and generally transverse to said sidewalls and being substantially independent of the excitation frequency, said sidewalls being spaced to area cool a discharge established in said discharge space, said longer dimension being chosen substantially independently of the pressure in said discharge space;

a resonator mirror disposed adjacent each end of said discharge space, said mirrors defining said optical axis;

a laser gas disposed in said discharge space; and means for establishing an alternating electric field in said discharge space to establish a laser-exciting plasma discharge in said laser gas, said field being oriented generally transversely with respect to said shorter dimension and having a frequency of at least 10 kHz, said field establishing means including a source of RF power and means for coupling RF power from said source to at least one of said electrodes.

72. An RF excited gas laser device with a longitudinal optical axis and a discharge space, said discharge space having a cross-section which is generally rectangular and oriented perpendicular to said longitudinal optical axis, said device comprising:

a pair of spaced apart non-conductive sidewalls, said discharge cross-section in part being defined by said sidewalls and being characterized by an average shorter dimension and an average longer dimension which is transverse to said shorter dimension, said shorter dimension being between said non-conductive sidewalls, said longer dimension being commensurate with the excitation frequency of the laser device;

a laser resonator mirror disposed at each end of said discharge space;

a laser gas at pressure p disposed in said discharge space, said pressure p being selected substantially independently of said longer dimension; and means for establishing an excitation electric field having a frequency of at least 10 kHz in said discharge space, said field establishing means causing said excitation electric field to be established in an even number of segments, said excitation electric field segments being oriented substantially perpendicular to said shorter dimension of said discharge space cross-section.

73. The gas laser device of claim 72 wherein said shorter dimension provides a rate of transfer of thermal energy from a plasma created in said discharge space to said sidewalls which will maintain a stable discharge.

74. An RF excited gas laser comprising:

at least first and second spacially displaced electrodes;

a pair of spacially displaced non-conductive spacers, said spacers in part defining therebetween an elongated gas discharge region having an optical axis and a predetermined cross-section, said discharge region cross-section being perpendicular to said optical axis and being characterized by an average longer dimension and an average shorter dimension which is transverse to said longer dimension, said longer dimension being measured between the most widely spaced of said electrodes, said shorter dimension being between said spacers;

a laser gas mixture at a pressure p disposed in said discharge region, said pressure p being chosen substantially independently of said longer dimension; and means for establishing an alternating electric field in said discharge region to establish a laser-exciting plasma discharge in said laser gas, said field establishing means coupling RF power at a frequency f to at least a first one of said electrodes, said field being oriented generally transversely with respect to said shorter dimension, said pressure p being chosen substantially independently of said excitation frequency f and said excitation frequency f being at least 10 kHz.

75. The laser of claim 74, wherein the pressure p is commensurate with said shorter dimension.

76. The laser of claim 74 wherein said longer dimension defines a discharge aperture dimension for laser light having a Fresnel number greater than unity.

77. The laser of claim 76 wherein said shorter dimension is suitable for guiding laser light and the surfaces of said spacers which adjoin said discharge region are waveguide surfaces.

78. The laser of claim 7, wherein the pressure p is commensurate with said shorter dimension.

* * * * *

UNITED STATES PATENT AND TRADEMARK OFFICE
CERTIFICATE OF CORRECTION

PATENT NO. : 5,748,663
DATED : May 5, 1998
INVENTOR(S) : Peter Chenausky

It is certified that error appears in the above-identified patent and that said Letters Patent is hereby corrected as shown below:

On the Title page, and in Col. 1, line 2, "RETANGULAR" should read --RECTANGULAR--.

Column 53, line 1, change "41" to --40--.

Column 58, line 63, change "7" to --77--.

Signed and Sealed this

Fourth Day of August, 1998

Attest:

BRUCE LEHMAN

*Attesting Officer*     *Commissioner of Patents and Trademarks*